(12) United States Patent
Adjaoute

(10) Patent No.: US 11,948,048 B2
(45) Date of Patent: Apr. 2, 2024

(54) ARTIFICIAL INTELLIGENCE FOR CONTEXT CLASSIFIER

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 1184 days.

(21) Appl. No.: 16/299,998

(22) Filed: Mar. 12, 2019

(65) Prior Publication Data

US 2019/0213498 A1 Jul. 11, 2019

Related U.S. Application Data

(63) Continuation of application No. 14/613,383, filed on Feb. 4, 2015, now abandoned, which is a
(Continued)

(51) Int. Cl.
*G06N 20/00* (2019.01)
*G06N 3/02* (2006.01)
(Continued)

(52) U.S. Cl.
CPC ............... *G06N 20/00* (2019.01); *G06N 3/02* (2013.01); *G06N 3/126* (2013.01); *G06N 7/01* (2023.01);
(Continued)

(58) Field of Classification Search
CPC .......... G06N 20/00; G06N 3/02; G06N 3/126; G06N 7/005; G06Q 20/4016; G06Q 2/405; G06Q 30/0201
See application file for complete search history.

(56) References Cited

U.S. PATENT DOCUMENTS 5,377,354 A 12/1994 Scannell et al.
5,692,107 A 11/1997 Simoudis et al.
(Continued)

FOREIGN PATENT DOCUMENTS

DE 4230419 3/1994
EP 0647903 4/1995
(Continued)

OTHER PUBLICATIONS

Office Action From U.S. Appl. No. 14/525,273 (dated Jun. 26, 2018).
(Continued)

*Primary Examiner* — Kevin W Figueroa
(74) *Attorney, Agent, or Firm* — Hovey Williams LLP

(57) ABSTRACT

An artificial intelligence system comprises a computer network server connected to receive and analyze millions of simultaneous text and/or voice messages written by humans to be read and understood by humans. Key, or otherwise important words in sentences are recognized and arrayed. Each such word is contributed to a qualia generator that spawns the word into its possible contexts, themes, or other reasonable ambiguities that can exist at the level of sentences, paragraphs, and missives. A thesaurus-like table is employed to expand each word into a spread of discrete definitions. Several such spreads are used as templates on the others to find petals that exhibit a convergence of meaning. Once the context of a whole missive has been predicted, each paragraph is deconstructed into sub-contexts that are appropriate within the overall theme. Particular contexts identified are then useful to trigger an actionable output.

20 Claims, 20 Drawing Sheets

Related U.S. Application Data continuation-in-part of application No. 14/522,463, filed on Oct. 23, 2014, now Pat. No. 10,896,421, which is a continuation-in-part of application No. 14/243,097, filed on Apr. 2, 2014, now abandoned.

(51) Int. Cl.

| | | |
|---|---|---|
| *G06N 3/126* | (2023.01) | |
| *G06N 7/01* | (2023.01) | |
| *G06Q 20/40* | (2012.01) | |
| *G06Q 30/0201* | (2023.01) | |

(52) U.S. Cl.
CPC ....... *G06Q 20/4016* (2013.01); *G06Q 20/405* (2013.01); *G06Q 30/0201* (2013.01)

(56) References Cited

U.S. PATENT DOCUMENTS

| | | | |
|---|---|---|---|
| 5,819,226 A | 10/1998 | Gopinathan et al. | |
| 5,822,741 A | 10/1998 | Fischthal | |
| 6,009,199 A | 12/1999 | Ho | |
| 6,026,397 A | 2/2000 | Sheppard | |
| 6,029,154 A | 2/2000 | Pettitt | |
| 6,122,624 A | 9/2000 | Tetro et al. | |
| 6,161,130 A | 12/2000 | Horvitz et al. | |
| 6,254,000 B1 | 7/2001 | Degen et al. | |
| 6,272,479 B1 | 8/2001 | Farry et al. | |
| 6,330,546 B1 | 12/2001 | Gopinathan et al. | |
| 6,347,374 B1 | 2/2002 | Drake et al. | |
| 6,424,997 B1 | 7/2002 | Buskirk, Jr. et al. | |
| 6,453,246 B1 | 9/2002 | Agrafiotis et al. | |
| 6,535,728 B1 | 3/2003 | Perfit et al. | |
| 6,601,048 B1 | 7/2003 | Gavan et al. | |
| 6,647,379 B2 | 11/2003 | Howard et al. | |
| 6,711,615 B2 | 3/2004 | Porras et al. | |
| 6,782,375 B2 | 8/2004 | Abdel-Moneim et al. | |
| 6,889,207 B2 | 5/2005 | Slemmer et al. | |
| 7,007,067 B1 * | 2/2006 | Azvine .................. G06F 3/033 709/224 | |
| 7,036,146 B1 | 4/2006 | Goldsmith | |
| 7,089,592 B2 | 8/2006 | Adjaoute | |
| 7,159,208 B2 | 1/2007 | Keeley | |
| 7,165,037 B2 | 1/2007 | Lazarus et al. | |
| 7,251,624 B1 | 7/2007 | Lee et al. | |
| 7,403,922 B1 | 7/2008 | Lewis et al. | |
| 7,406,502 B1 | 7/2008 | Oliver et al. | |
| 7,433,960 B1 | 10/2008 | Dube et al. | |
| 7,457,401 B2 | 11/2008 | Lawyer et al. | |
| 7,464,264 B2 | 12/2008 | Goodman et al. | |
| 7,483,947 B2 | 1/2009 | Starbuck et al. | |
| 7,562,122 B2 | 7/2009 | Oliver et al. | |
| 7,590,970 B2 | 9/2009 | Bromley | |
| 7,630,956 B2 | 12/2009 | Wyatt et al. | |
| 7,631,362 B2 | 12/2009 | Ramsey | |
| 7,668,769 B2 | 2/2010 | Baker et al. | |
| 7,685,083 B2 | 3/2010 | Fairweather | |
| 7,813,937 B1 | 10/2010 | Pathria et al. | |
| 7,835,919 B1 | 11/2010 | Bradley et al. | |
| 7,853,469 B2 | 12/2010 | Maitland et al. | |
| 7,877,421 B2 | 1/2011 | Berger et al. | |
| 8,015,108 B2 | 9/2011 | Haggerty et al. | |
| 8,027,439 B2 | 9/2011 | Zoldi et al. | |
| 8,036,981 B2 | 10/2011 | Shirey et al. | |
| 8,041,597 B2 | 10/2011 | Li et al. | |
| 8,090,648 B2 | 1/2012 | Zoldi et al. | |
| 8,401,990 B2 | 3/2013 | Silsby | |
| 8,458,069 B2 | 6/2013 | Adjaoute | |
| 8,484,301 B2 | 7/2013 | Wilson et al. | |
| 8,548,137 B2 | 10/2013 | Zoldi et al. | |
| 8,555,077 B2 | 10/2013 | Davis et al. | |
| 8,561,007 B2 | 10/2013 | Challenger et al. | |
| 8,572,736 B2 | 10/2013 | Lin | |
| 8,744,979 B2 | 6/2014 | Sundelin et al. | |
| 8,805,737 B1 | 8/2014 | Chen et al. | |
| 9,069,737 B1 | 6/2015 | Kimotho et al. | |
| 9,134,215 B1 * | 9/2015 | Vignisson ................ G06N 5/04 | |
| 9,264,442 B2 | 2/2016 | Bart et al. | |
| 9,400,879 B2 | 7/2016 | Tredoux et al. | |
| 9,721,296 B1 | 8/2017 | Chrapko | |
| 9,898,741 B2 | 2/2018 | Siegel et al. | |
| 9,996,694 B2 | 6/2018 | Sethumadhavan et al. | |
| 10,339,606 B2 | 7/2019 | Gupta et al. | |
| 10,817,530 B2 | 10/2020 | Siebel et al. | |
| 2002/0147754 A1 | 10/2002 | Dempsey et al. | |
| 2002/0188533 A1 | 12/2002 | Sanchez et al. | |
| 2002/0194119 A1 | 12/2002 | Wright et al. | |
| 2003/0009495 A1 | 1/2003 | Adjaoute | |
| 2003/0084449 A1 | 5/2003 | Chane et al. | |
| 2003/0158751 A1 | 8/2003 | Suresh et al. | |
| 2004/0073634 A1 | 4/2004 | Haghpassand | |
| 2004/0111363 A1 | 6/2004 | Trench et al. | |
| 2004/0153555 A1 | 8/2004 | Haverinen et al. | |
| 2004/0225473 A1 | 11/2004 | Aoki et al. | |
| 2006/0041464 A1 | 2/2006 | Powers et al. | |
| 2006/0149674 A1 | 7/2006 | Cook et al. | |
| 2006/0171509 A1 | 8/2006 | Berthaud et al. | |
| 2006/0212350 A1 | 9/2006 | Ellis et al. | |
| 2007/0067853 A1 | 3/2007 | Ramsey | |
| 2007/0112667 A1 | 5/2007 | Rucker | |
| 2007/0124246 A1 | 5/2007 | Lawyer et al. | |
| 2007/0174164 A1 | 7/2007 | Biffle et al. | |
| 2007/0174214 A1 | 7/2007 | Welsh et al. | |
| 2007/0239604 A1 | 10/2007 | O'Connell et al. | |
| 2007/0239936 A1 | 10/2007 | Gluhovsky | |
| 2008/0086365 A1 | 4/2008 | Zollino et al. | |
| 2008/0104101 A1 | 5/2008 | Kirshenbaum et al. | |
| 2008/0162259 A1 | 7/2008 | Patil et al. | |
| 2008/0281743 A1 | 11/2008 | Pettit | |
| 2009/0307028 A1 | 12/2009 | Eldon et al. | |
| 2010/0027527 A1 | 2/2010 | Higgins et al. | |
| 2010/0082751 A1 | 4/2010 | Meijer et al. | |
| 2010/0115610 A1 | 5/2010 | Tredouex et al. | |
| 2010/0125470 A1 | 5/2010 | Chisholm | |
| 2010/0191634 A1 | 7/2010 | Macy et al. | |
| 2010/0228656 A1 | 9/2010 | Wasserblat et al. | |
| 2010/0305993 A1 | 12/2010 | Fisher | |
| 2011/0016041 A1 | 1/2011 | Scragg | |
| 2011/0035440 A1 | 2/2011 | Henkin et al. | |
| 2011/0055196 A1 | 3/2011 | Sundelin et al. | |
| 2011/0055264 A1 | 3/2011 | Sundelin et al. | |
| 2011/0238566 A1 | 9/2011 | Santos | |
| 2011/0258049 A1 | 10/2011 | Ramer et al. | |
| 2011/0276468 A1 | 11/2011 | Lewis et al. | |
| 2011/0307382 A1 | 12/2011 | Siegel et al. | |
| 2012/0047072 A1 | 2/2012 | Larkin | |
| 2012/0137367 A1 | 5/2012 | Dupont et al. | |
| 2012/0203698 A1 | 8/2012 | Duncan et al. | |
| 2012/0226613 A1 | 9/2012 | Adjaoute | |
| 2013/0018796 A1 | 1/2013 | Kolhatkar et al. | |
| 2013/0204755 A1 | 8/2013 | Zoldi et al. | |
| 2013/0290317 A1 * | 10/2013 | Spivack ................ G06N 20/00 707/723 | |
| 2013/0305357 A1 | 11/2013 | Ayyagari et al. | |
| 2014/0058914 A1 | 2/2014 | Song et al. | |
| 2014/0082434 A1 | 3/2014 | Knight et al. | |
| 2014/0149128 A1 | 5/2014 | Getchius | |
| 2014/0180974 A1 | 6/2014 | Kennel et al. | |
| 2014/0279803 A1 | 9/2014 | Burbank et al. | |
| 2015/0046224 A1 | 2/2015 | Adjaoute | |
| 2015/0100568 A1 * | 4/2015 | Golden ............... G06F 16/3328 707/722 | |
| 2015/0161609 A1 | 6/2015 | Christner | |
| 2015/0193263 A1 | 7/2015 | Nayyar et al. | |
| 2015/0279155 A1 | 10/2015 | Chun et al. | |
| 2015/0348042 A1 | 12/2015 | Jivraj et al. | |
| 2016/0260102 A1 | 9/2016 | Nightengale et al. | |
| 2017/0006135 A1 | 1/2017 | Siebel et al. | |
| 2017/0006141 A1 | 1/2017 | Bhadra | |
| 2017/0083386 A1 | 3/2017 | Wing et al. | |
| 2017/0270534 A1 | 9/2017 | Zoldi et al. | |
| 2017/0289176 A1 | 10/2017 | Chen et al. | |
| 2017/0347283 A1 | 11/2017 | Kodaypak | |
| 2018/0032723 A1 | 2/2018 | Danger et al. | |

(56) References Cited

U.S. PATENT DOCUMENTS

| | | | |
|---|---|---|---|
| 2018/0040064 | A1 | 2/2018 | Grigg et al. |
| 2018/0048710 | A1 | 2/2018 | Altin |
| 2018/0151045 | A1 | 5/2018 | Kim et al. |
| 2018/0182029 | A1 | 6/2018 | Vinay |
| 2018/0208448 | A1 | 7/2018 | Zimmerman et al. |
| 2018/0253657 | A1 | 9/2018 | Zhao et al. |
| 2019/0007517 | A1 | 1/2019 | Jagannath et al. |
| 2019/0156417 | A1 | 5/2019 | Zhao et al. |
| 2019/0213498 | A1 | 7/2019 | Adjaoute |
| 2019/0236695 | A1 | 8/2019 | McKenna et al. |
| 2019/0250899 | A1 | 8/2019 | Riedl et al. |
| 2019/0265971 | A1 | 8/2019 | Behzadi et al. |
| 2019/0278777 | A1 | 9/2019 | Malik et al. |

FOREIGN PATENT DOCUMENTS

| | | |
|---|---|---|
| EP | 0631453 | 7/1995 |
| WO | 9406103 | 3/1994 |
| WO | 9501707 | 1/1995 |
| WO | 9628948 | 9/1996 |
| WO | 9703533 | 1/1997 |
| WO | 98/32086 | 7/1998 |

OTHER PUBLICATIONS

Office Action From U.S. Appl. No. 14/454,749 (dated Feb. 3, 2017).
Office Action From U.S. Appl. No. 14/514,381 (dated Apr. 2, 2018).
Office Action From U.S. Appl. No. 14/514,381 (dated Dec. 31, 2014).
Office Action From U.S. Appl. No. 14/514,381 (dated Jan. 10, 2018).
Office Action From U.S. Appl. No. 14/514,381 (dated May 13, 2015).
Office Action From U.S. Appl. No. 14/517,771 (dated Dec. 31, 2015).
Office Action From U.S. Appl. No. 14/517,771 (dated Jul. 15, 2015).
Office Action From U.S. Appl. No. 14/517,771 (dated Sep. 20, 2018).
Office Action From U.S. Appl. No. 14/517,771 (dated Sep. 8, 2016).
Office Action From U.S. Appl. No. 14/517,863 (dated Feb. 5, 2015).
Office Action From U.S. Appl. No. 14/517,863 (datedAug. 10, 2015).
Office Action From U.S. Appl. No. 14/517,872 (dated Jan. 14, 2015).
Office Action From U.S. Appl. No. 14/517,872 (dated Jul. 31, 2015).
Office Action From U.S. Appl. No. 14/520,361 (dated Feb. 2, 2015).
Office Action From U.S. Appl. No. 14/520,361 (dated Jul. 11, 2018).
Office Action From U.S. Appl. No. 14/520,361 (dated Jul. 17, 2015).
Office Action From U.S. Appl. No. 14/521,386 (dated Jan. 29, 2015).
Office Action From U.S. Appl. No. 14/521,386 (dated Nov. 1, 2018).
Office Action From U.S. Appl. No. 14/521,667 (dated Jan. 2, 2015).
Office Action From U.S. Appl. No. 14/521,667 (dated Jun. 26, 2015).
Office Action From U.S. Appl. No. 14/525,273 (dated Feb. 9, 2015).
Office Action From U.S. Appl. No. 14/525,273 (dated May 19, 2015).
Office Action From U.S. Appl. No. 14/634,786 (dated Oct. 2, 2015).
Office Action From U.S. Appl. No. 14/673,895 (dated Feb. 12, 2016).
Office Action From U.S. Appl. No. 14/673,895 (dated Jul. 14, 2017).
Office Action From U.S. Appl. No. 14/673,895 (dated Oct. 2, 2017).
Office Action From U.S. Appl. No. 14/673,895 (dated Oct. 30, 2015).
Office Action From U.S. Appl. No. 14/675,453 (dated Jun. 9, 2015).
Office Action From U.S. Appl. No. 14/690,380 (dated Dec. 3, 2015).
Office Action From U.S. Appl. No. 14/690,380 (dated Jul. 15, 2015).
Office Action From U.S. Appl. No. 14/690,380 (dated Jun. 27, 2017).
Office Action From U.S. Appl. No. 14/690,380 (dated Jun. 30, 2016).
Office Action From U.S. Appl. No. 14/690,380 (dated Nov. 17, 2016).
Office Action From U.S. Appl. No. 14/690,380 (dated Nov. 20, 2017).
Office Action From U.S. Appl. No. 14/815,848 (dated Mar. 14, 2016).
Office Action From U.S. Appl. No. 14/815,848 (dated Sep. 30, 2015).
Office Action From U.S. Appl. No. 14/815,934 (dated Apr. 7, 2017).
Office Action From U.S. Appl. No. 14/815,934 (dated Feb. 11, 2016).
Office Action From U.S. Appl. No. 14/815,934 (dated Sep. 23, 2016).
Office Action From U.S. Appl. No. 14/815,934 (dated Sep. 30, 2015).
Office Action From U.S. Appl. No. 14/815,940 (dated Dec. 28, 2017).
Office Action From U.S. Appl. No. 14/815,940 (dated Oct. 1, 2015).
Office Action From U.S. Appl. No. 14/929,341 (dated Aug. 19, 2016).
Office Action From U.S. Appl. No. 14/929,341 (dated Dec. 22, 2015).
Office Action From U.S. Appl. No. 14/929,341 (dated Feb. 4, 2016).
Office Action From U.S. Appl. No. 14/929,341 (dated Jul. 31, 2018).
Office Action From U.S. Appl. No. 14/935,742 (dated Mar. 2, 2016).
Office Action From U.S. Appl. No. 14/935,742 (dated Mar. 29, 2017).
Office Action From U.S. Appl. No. 14/935,742 (dated May 31, 2017).
Office Action From Serial No. 16/424,187 (dated Apr. 26, 2022).
Office Action From Serial No. 16/264,144 (dated Apr. 13, 2022).
Office Action from U.S. Appl. No. 16/168,566 (dated Jul. 21, 2021).
Office Action from Serial No. 16/264,144 (dated Sep. 22, 2021).
Office Action from Serial No. 16/424,187 (dated Sep. 1, 2021).
Office Action from U.S. Appl. No. 16/663,452 (dated Aug. 17, 2021).
Office Action from U.S. Appl. No. 16/743,009 (dated Sep. 10, 2021).
Office Action from U.S. Appl. No. 16/168,566 (dated Mar. 23, 2021).
Office Action from U.S. Appl. No. 16/226,246 (dated Apr. 26, 2021).
Office Action from U.S. Appl. No. 16/264,144 (dated Apr. 23, 2021).
Office Action from U.S. Appl. No. 16/663,452 (dated Mar. 12, 2021).
Office Action from U.S. Appl. No. 16/743,009 (dated Mar. 24, 2021).
Need Endless Rolling List, 2007, QuinStreet, Inc. (Year: 2007).
Data Warehousing—Metadata Concepts, Mar. 24, 2014, TutorialsPoint, printed through www.archive.org (Date is in the URP in YYYMMDD format) (Year:2014).
Data Consolidation, 2014, Techopedia, printed through www.archive.org (date is in the URL in YYYYMMDD format) (Year:2014).
Data Compaction, 2013, Wikipedia, printed through www.archive.org (date is in the URL in YYYYMMDD format) (Year:2013).
Clarke et al., Dynamic Forecasting Behavior by Analysts Theory and Evidence, 2005, Journal of Financial Economics (Year:2005).
Office Action from U.S. Appl. No. 14/522,463 (dated Jul. 18, 2019).
Office Action from U.S. Appl. No. 14/522,463 (dated Oct. 3, 2019).
"10 Popular health care provider fraud schemes" by Charles Piper, Jan./Feb. 2013, Fraud Magazine, www.fraud-magazine.com.
"2000 Internet Fraud Statistics," National Fraud Information Center web site, http://www.fraud.org, 2001.
"Agent-Based modeling: Methods and Techniques for Simulating Human Systems", Eric Bonabeau, Icosystem Corporation, 545 Concord Avenue, Cambridge, MA 02138, 7280-7287; PNAS; May 14, 2002; vol. 99; suppl. 3; www.pnas.org/cgi/doi/10.1073/pnas.082080899.
"Axent Technologies' NetProwlerTM and Intruder AlertTM", Hurwitz Report, Hurwitz Group, Inc., Sep. 2000.

(56) References Cited

OTHER PUBLICATIONS

"CBA 1994 Fraud Survey," California Bankers Association web site, http://www.calbankers.com/legal/fraud.html, Jun. 1996.
"Check Fraud Against Businesses Proliferates," Better Business Bureau web site, http://www.bbb.org/library/checkfraud.asp, 2000.
"Check Fraud Statistics," National Check Fraud Center web site, http://www.ckfraud.org/statistics.html, Date Unkonwn.
"Consumers and Business Beware of Advance Fee Loan and Credit Card Fraud," Better Business Bureau web site, http://www.bbb.org/library/feeloan.asp, 20003.
"CyberSource Fraud Survey," CyberSource, Inc., web site, http://www.cybersource.com/solutions/risk_management/us_fraud_survey.xml, Date Unknown.
"EFalcon Helps E-Merchants Control Online Fraud," Financial Technology Insights Newsletter, HNC Software, Inc., Aug. 2000.
"Guidelines to Healthcare Fraud," National health care Anti-Fraud Association web site, http://www.nhcaa.org/factsheet_guideline.html, Nov. 19, 1991.
"Health Insurance Fraud," http://www.helpstopcrime.org, Date Unknown.
"HIPPA Solutions: Waste, Fraud, and Abuse," ViPS, Inc., web site, http://www.vips.com/hippa/combatwaste.html, 2001.
"HNC Insurance Solutions Introduces Spyder Software for Healthcare Fraud and Abuse Containment," HNC Software, Inc., press release, Dec. 4, 1998.
"Homeowners Insurance Fraud," http://www.helpstopcrime.org, Date Unknown.
"Insurance Fraud: The Crime You Pay For," http://www.insurancefraud.org/facts.html, Date Unknown.
"Prism FAQ", Nestor, Inc., www.nestor.com, Date Unknown.
"SET Secure Electronic Transaction Sepcification," Book 1: Business Description, May 1997.
"Telemarketing Fraud Revisited," Better Business Bureau web site, http://www.bbb.org/library/tele.asp, 2000.
"The Impact of Insurance Fraud," Chapter 5, Ohio Insurance Facts, Ohio Insurance Institute, 2000.
"VeriCompTM Claimant," HNC Software, Inc., web site, 2001.
"What is Insurance Fraud?," http://www.helpstopcrime.rog, Date Unkonwn.
"Wireless Fraud FAQ," World of Wireless Communications web site, http://www.wow-com/consumer/faq/articles.cfm?textonly=1&ID=96, Date Unknown.
"Workers Compensation Fraud," http://www.helpstopcrime.org, Date Unknown.
A. Aadjaoute, "Responding to the e-Commerce Promise with Non-Algorithmic Technology," Handbook of E-Business, Chapter F2, edited by J. Keyes, Jul. 2000.
A. Valdes and H. Javitz, "The SRI IDES Statistical Anomaly Detector," May 1991.
Big Data Developments in Transaction Analytics, Scott Zoldi, Credit Scoring and Credit Control XIII Aug. 28-30, 2013 Fair Isaacs Corporation (FICO).
Credit card fraud detection using artificial neural networks tuned by genetic algorithms, Dissertation: Carsten A. W. Paasch, Copyright 2013 Proquest, LLC.
D. Anderson, T. Frivold, and A. Valdes, "NExt-Generation intrusion Detection Expert System (NIDES): A Summary," SRI Computer Science Laboratory technical report SRI-CSL-95-07, May 1995.
Debar et al., " Neural network Component for an Intrusion Detection System", Proceedings for the Computer Society Symposium on Research in Security and Privacy, vol. SYMP.13, May 4, 1992, 240-250.
Denault et al., "Intrusion Detection: approach and performance issues of the Securenet system", Computers and Security, 13 (1994), 495-508.
Fraud Detection of Credit Card Payment System by Genetic Algorithm, K.RamaKalyani, D. UmaDevi Department of Computer Science, Sri Mittapalli College of Engineering, Guntur, AP, India., International Journal of Scientific & Engineering Research vol. 3, Issue 7, Jul. 1, 2012, ISSN 2229-5518.

Fraud Detection Using Data Analytics in the Healthcare Industry, Discussion Whitepaper, ACL Services Ltd., (c) 2014, 8pp.
Healthcare Fraud Detection, http://IJINIIW.21ct.com/solutions/healthcare-fraud detection/, (c) 2013 21CT, Inc.
Prevent Real-time fraud prevention, brochure, Brighterion, Inc. San Francisco, CA.
John J. Xenakis, 1990, InformationWeek, 1990. n296,22.
K. G. DeMarrais, "Old-fashioned check fraud still in vogue," Bergen record Corp. web site, http://www.bergen.com/biz/savvy24200009242.htm, Sep. 24, 2000.
M. B. Guard, "Calling Card Fraud—Travelers Beward!," http://www.bankinfo.com/security/scallingcardhtml, Jun. 11, 1998.
Maria Seminerio, Dec. 13, 1999, PC week, 99.
Office Action from U.S. Appl. No. 09/810,313 (dated Jun. 22, 2005).
Office Action from U.S. Appl. No. 09/810,313 (dated Mar. 24, 2006).
Office Action from U.S. Appl. No. 09/810,313 (dated Nov. 23, 2004).
Office Action from U.S. Appl. No. 11/455,146 (dated Sep. 29, 2009).
Office Action From U.S. Appl. No. 16/424,187 (dated Dec. 9, 2021).
Office Action From U.S. Appl. No. 16/743,009 (dated Jan. 28, 2022).
Office Action from U.S. Appl. No. 16/424,187 (dated Feb. 26, 2021).
Office Action from U.S. Appl. No. 16/226,246 (dated Dec. 15, 2020).
Ex Parte Quayle Action from U.S. Appl. No. 16/369,626 (dated Jan. 7, 2021).
Office Action From U.S. Appl. No. 16/168,566 (dated Sep. 9, 2020).
Office Action From U.S. Appl. No. 16/226,246 (dated Aug. 4, 2020).
Office Action From U.S. Appl. No. 16/184,894 (dated Sep. 21, 2020).
Office Action From U.S. Appl. No. 16/592,249 (dated Sep. 14, 2020).
Office Action From U.S. Appl. No. 16/601,226 (dated Sep. 2, 2020).
Office Action From U.S. Appl. No. 16/674,980 (dated Sep. 3, 2020).
Office Action From U.S. Appl. No. 16/856,131 (dated Sep. 24, 2020).
Office Action From U.S. Appl. No. 16/679,819 (dated Sep. 25, 2020).
Office Action From U.S. Appl. No. 16/677,458 (dated Sep. 24, 2020).
Office Action From U.S. Appl. No. 16/168.566 (dated Mar. 4, 2020).
Office Action From U.S. Appl. No. 14/522,463 (dated Mar. 24, 2020).
Office Action From U.S. Appl. No. 16/205,909 (dated Apr. 22, 2020).
Office Action From U.S. Appl. No. 16/398,917 (dated Mar. 11, 2020).
Office Action From U.S. Appl. No. 16/369,626 (dated Jun. 2, 2020).
Raid, Feb. 28, 2014, www.prepressure.com, printed through www.archive.org (Year: 2014).
Office Action From U.S. Appl. No. 14/243,097 (dated Jun. 16, 2015).
Office Action From U.S. Appl. No. 14/243,097 (dated Nov. 5, 2018).
Office Action From U.S. Appl. No. 14/522,463 (dated Jun. 5, 2015).
Office Action From U.S. Appl. No. 14/522,463 (dated Dec. 1, 2015).
Office Action From U.S. Appl. No. 14/522,463 (dated Jun. 20, 2018).
Office Action From U.S. Appl. No. 14/522,463 (dated Oct. 10, 2018).
Office Action From U.S. Appl. No. 14/522,463 (dated Feb. 11, 2019).
Office Action From U.S. Appl. No. 14/613,383 (dated Aug. 14, 2015).
Office Action From U.S. Appl. No. 14/613,383 (dated Apr. 23, 2018).
Office Action From U.S. Appl. No. 14/613,383 (dated Dec. 13, 2018).
Yang, Yiming. "Expert network: Effective and efficient learning from human decisions in text categorization and retrieval." Pro-

(56) References Cited

OTHER PUBLICATIONS ceedings of the 17th annual international ACM SIGIR conference on Research and development in information retrieval Springer-Verlag New York, Inc., 1994.

Dave, Kushal, Steve Lawrence, and David M. Pennock. "Mining the peanut gallery: Opinion extration and semantic classification of product reviews." Proceedings of the 12th international conference on WorldWide Web. ACM. 2003.

Data Mining Mar. 31, 2014. Wikipedia, Printed through www.archive.org, date is in the URL in YYYMMDD format (Year:2014)(Currently not included in IDS on CPI—Mar. 6, 2019).

Office Action From U.S. Appl. No. 14/935,742 (dated Sep. 22, 2016).
Office Action From U.S. Appl. No. 14/938,844 (dated Apr. 11, 2016).
Office Action From U.S. Appl. No. 14/938,844 (dated Aug. 23, 2017).
Office Action From U.S. Appl. No. 14/938,844 (dated Jan. 25, 2017).
Office Action From U.S. Appl. No. 14/938,844 (dated May 1, 2017).
Office Action From U.S. Appl. No. 14/941,586 (dated Jan. 5, 2017).
Office Action From U.S. Appl. No. 14/941,586 (dated May 2, 2017).
Office Action From U.S. Appl. No. 14/956,392 (dated Feb. 2, 2016).
Office Action From U.S. Appl. No. 14/956,392 (dated Mar. 28, 2016).
Office Action From U.S. Appl. No. 14/956,392 (dated May 3, 2017).
Office Action From U.S. Appl. No. 14/956,392 (dated Nov. 3, 2016).
Office Action From U.S. Appl. No. 14/986,534 (dated May 20, 2016).
Office Action From U.S. Appl. No. 14/986,534 (dated Sep. 7, 2017).
Office Action From U.S. Appl. No. 15/947,790 (dated Nov. 18, 2019).
Office Action From U.S. Appl. No. 15/961,752 (dated Oct. 3, 2019).
Office Action From U.S. Appl. No. 15/968,568 (dated Sep. 16, 2019).
Office Action From U.S. Appl. No. 16/205,909 (dated Dec. 27, 2019).
Office Action From U.S. Appl. No. 16/205,909 (dated Sep. 27, 2019).
Office Action From U.S. Appl. No. 16/398,917 (dated Sep. 26, 2019).

P.A. Porras and P.G. Neumann, "Emerald: Event Monitoring Enabling Responses to Anomalous Live Disturbances," National Information Systems Security Conference, Oct. 1997.

P.E. Proctor, "Computer Misuse Detection System (CMDSTM) Concpets," SAIC Science and technology Trends, pp. 137-145, Dec. 1996.

Report to the Nations on Occupational Fraud and Abuse, 2012 Global Fraud Study, copyright 2012, 76 pp., Association of Certified Fraud Examiners, Austin, TX.

S. Abu-Hakima, M. ToLoo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.

Teng et al., "Adaptive real-time anomaly detection using inductively generated sequential patterns", Proceedings of the Computer Society Symposium on research in Security and Privacy, vol. SYMP. 11, May 7, 1990, 278-284.

Office Action From U.S. Appl. No. 16/264,144 (dated Oct. 16, 2020).
Office Action From U.S. Appl. No. 16/168,566 (dated Dec. 18, 2020).
Office Action From U.S. Appl. No. 15/866,563 (dated Nov. 27, 2020).
Office Action From U.S. Appl. No. 16/424,187 dated Sep. 2, 2022.
Office Action From U.S. Appl. No. 17/341,459 dated Jul. 22, 2022.
Office Action From U.S. Appl. No. 16/264,144 dated Aug. 25, 2022.
Office Action From U.S. Appl. No. 17/198,473 dated Feb. 15, 2023.
Office Action From U.S. Appl. No. 17/200,997 dated Feb. 2, 2023.
Office Action From U.S. Appl. No. 17/085,109 dated Dec. 8, 2022.
Office Action From U.S. Appl. No. 16/424,187 dated Feb. 24, 2023.
Office Action From U.S. Appl. No. 17/153,013 dated Mar. 2, 2023.
Office Action From U.S. Appl. No. 17/364,319 dated Mar. 9, 2023.
Office Action From U.S. Appl. No. 17/992,672 dated Mar. 10, 2023.
Office Action From U.S. Appl. No. 17/364,450 dated Mar. 31, 2023.

\* cited by examiner

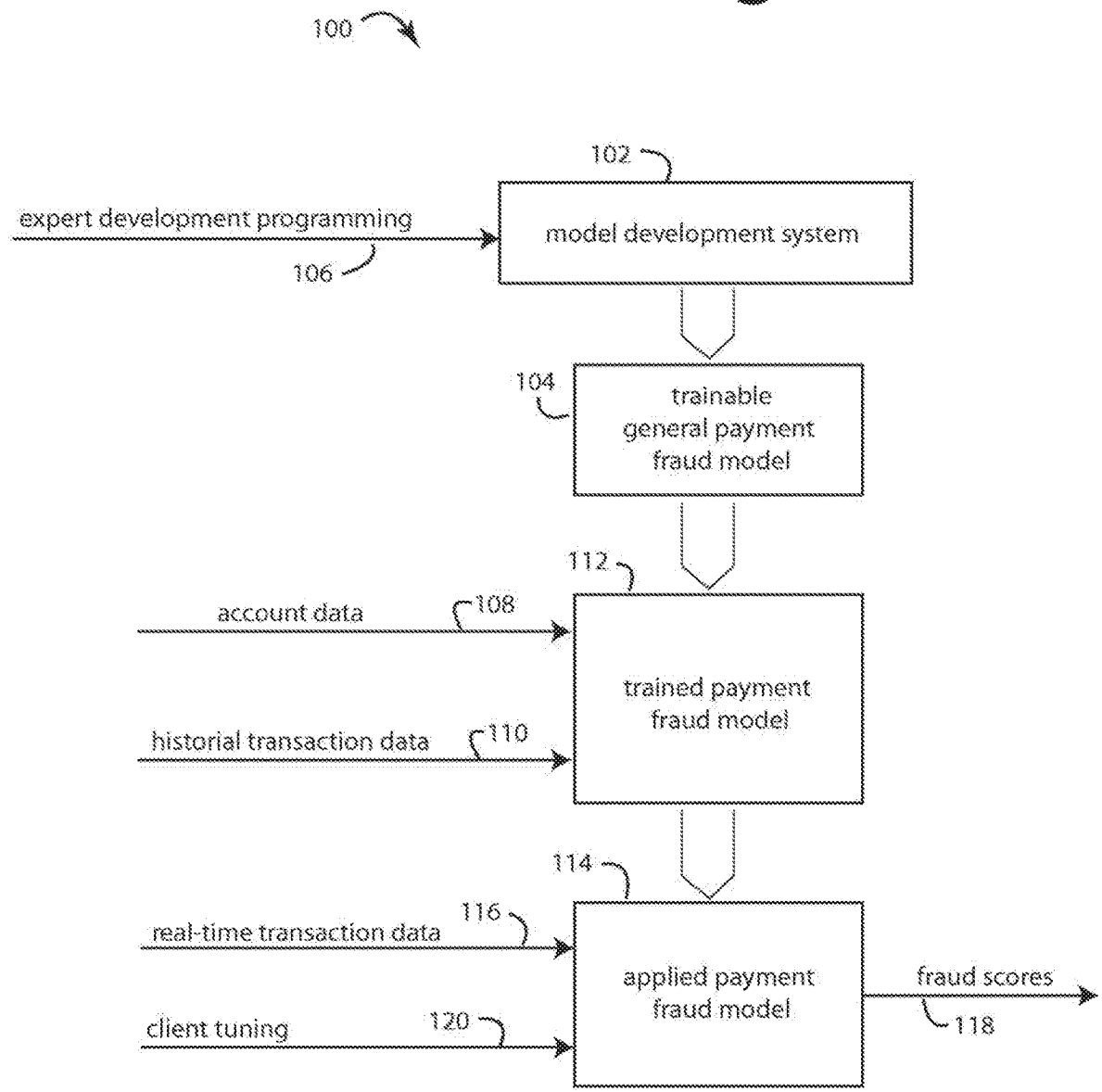

Fig. 2A

| | smart agent long term profile recursive profile real time profiling 201 | constraint-based programming tool 202 | fuzzy logic tool 203 |
|---|---|---|---|
| user interface 218 | advanced neural network algorithms 204 | genetic algorithms 205 | simulation & planning tool 206 |
| | rules & constraints 207 | case-based reasoning & learning 208 | language interpretation & compilation 209 |
| | C++ code generator 210 | data compression algorithms 211 | database connectivity 212 | graphic 214 →
text 216 → declarative application 220

↓ general payment fraud model 220

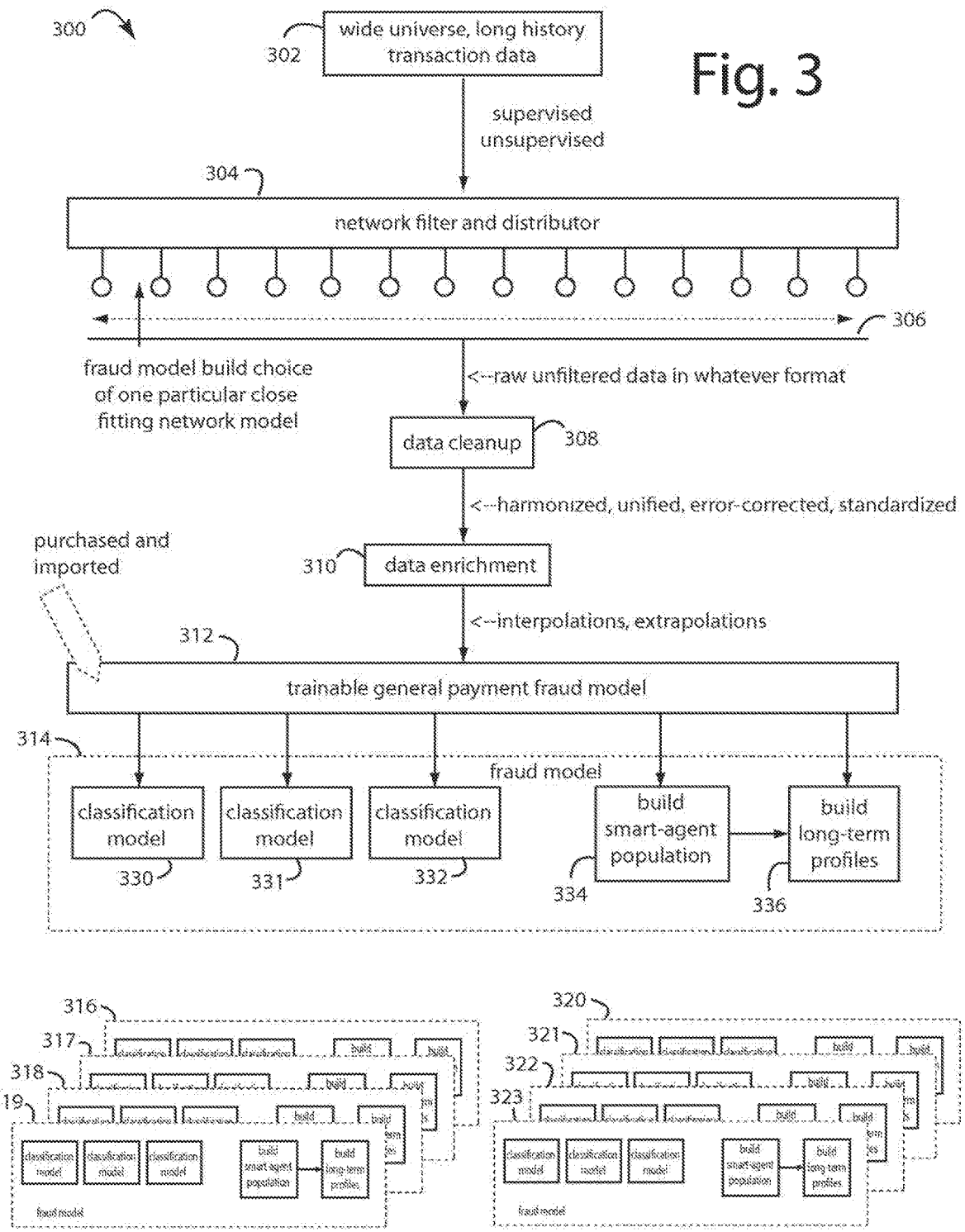

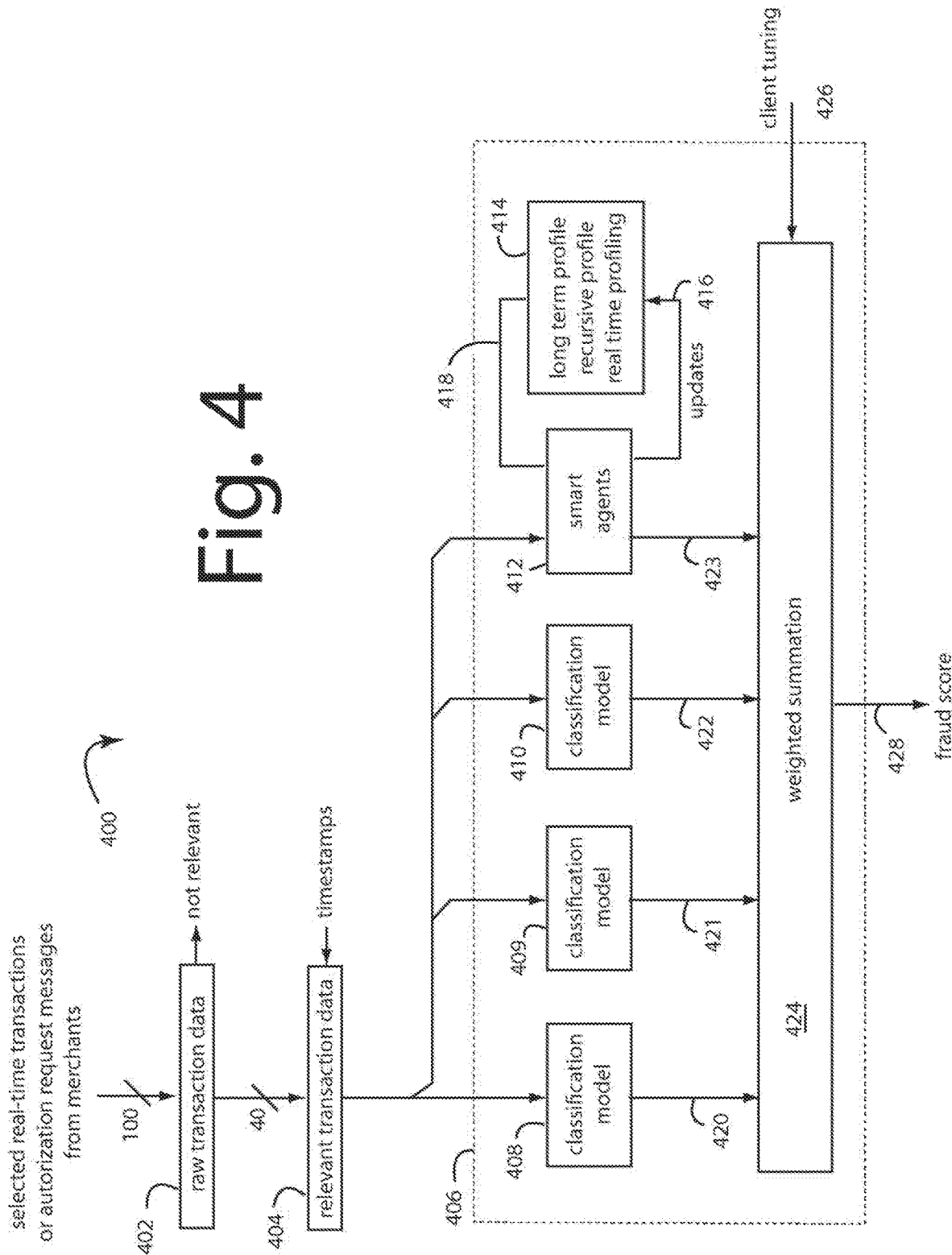

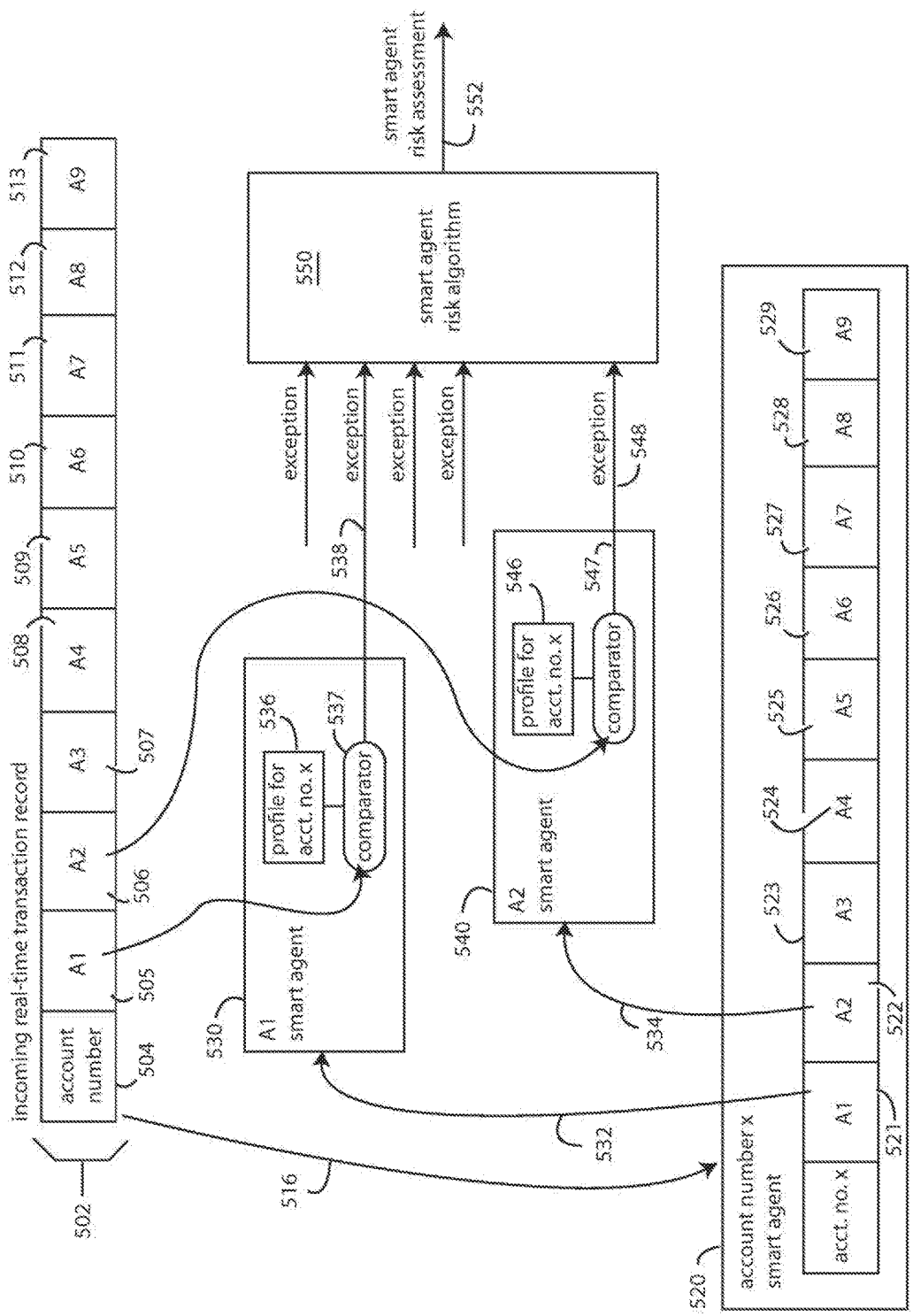

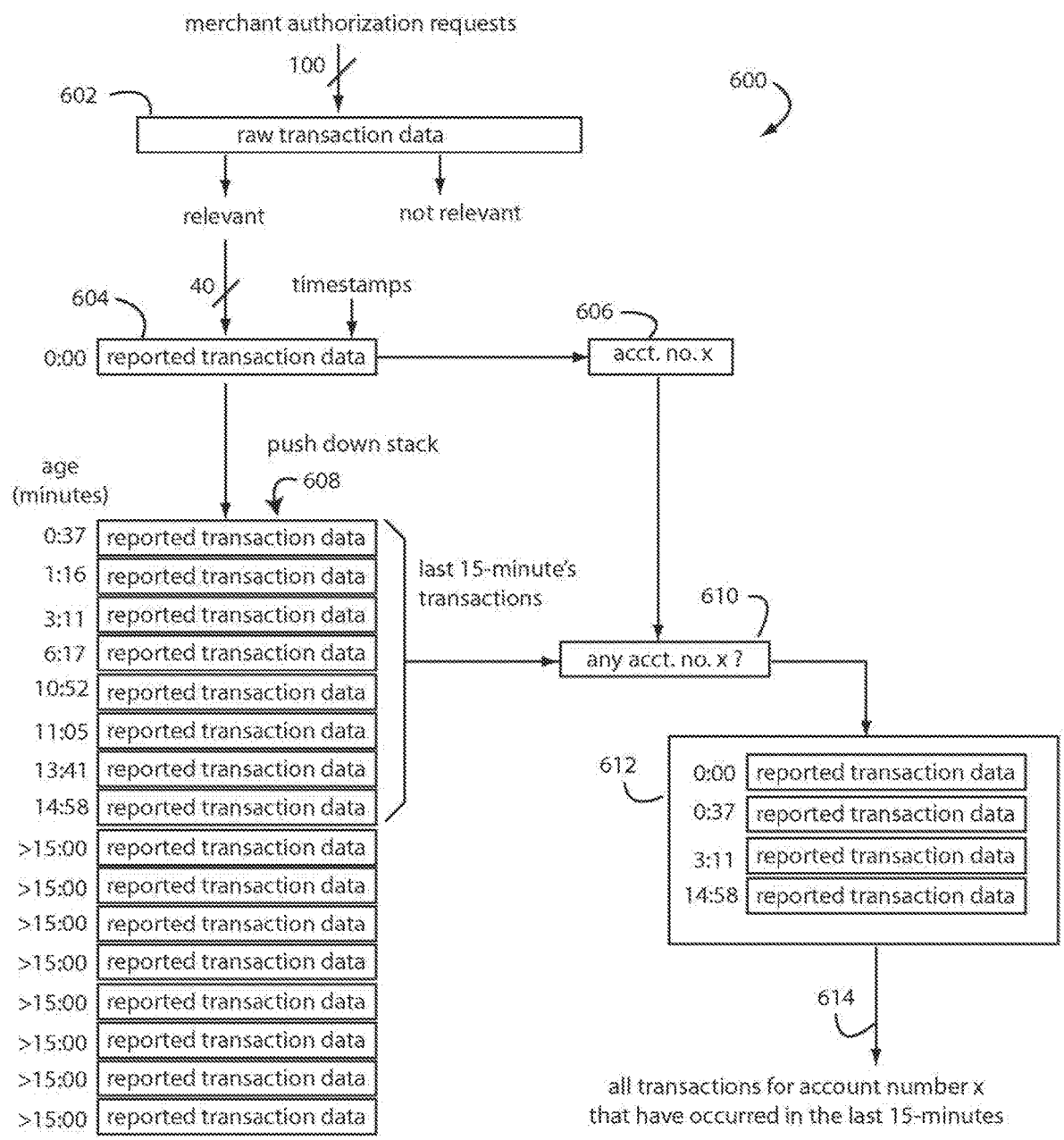

Fig. 13

ARTIFICIAL INTELLIGENCE FOR CONTEXT CLASSIFIER

RELATED APPLICATIONS

The current patent application is a continuation patent application which claims priority benefit with regard to all common subject matter to identically-titled (as originally filed) U.S. patent application Ser. No. 14/613,383, filed Feb. 4, 2015, which, itself, is a continuation-in-part application of and claims priority benefit with regard to all common subject matter to U.S. patent application Ser. No. 14/522,463, filed Oct. 23, 2014, entitled SMART RETAIL ANALYTICS AND COMMERCIAL MESSAGING, which, itself, is a continuation-in-part application of and claims priority benefit with regard to all common subject matter to U.S. patent application Ser. No. 14/243,097, filed Apr. 2, 2014, entitled SMART ANALYTICS FOR AUDIENCE-APPROPRIATE COMMERCIAL MESSAGING. The listed earlier-filed non-provisional applications are hereby incorporated by reference in their entireties into the current patent application.

BACKGROUND OF THE INVENTION

Field of the Invention

The present invention relates to artificial intelligence and machine learning systems for analyzing data, both open source (e.g., social media, blogs, chats, audio and video) and providing smart, targeted analysis services (e.g., alerting, trending, and temporal analysis) and performing analysis on the data (e.g., entity extraction, location, relationship identification, name/entity resolution, etc.) to machine understanding that warrant closer human scrutiny for economic or security reasons and predicting future events.

Background

Billions of people are now sending electronic messages daily to each other in various electronic forms, formats, medias, and languages spoken and written in hundreds of different human languages. These messages are generally fashioned by the senders to convey some underlying thought, information, or feeling that will fit into some context mutually understood or understandable by those involved. But, poetry, intentional deception, and psychotic motives behind particular messages can render the underlying thoughts, information, or feelings hard to decipher. That is even in spite of the use of good grammar and correct spellings in the messages.

Translations in which the underlying thoughts, information, or feelings do not survive the translation or transcription are of little value and sometimes the misunderstandings can be costly, dangerous, or harmful. Realtime failures of human or machine readers to correctly perceive the underlying thoughts, information, or feelings in messages they read are similarly treacherous.

Humans pretty naturally use their perceptions of their environment and people contacts to reduce the confusion of ambiguities always present in words, sentences, paragraphs, missives, thoughts, information, and feelings. Conventional machine readers have always taken each word at face value and operate blind as to why that word was chosen and not another. The results can be funny or bizarre at times. For humans, a word like "wine" can have qualia of taste, smell, color, age, proximity, temperature, availability, and cost. So a message sentence including the word "wine" can be immediately classified as to which qualia is afoot by hints or outright flags and arrows pointing to the taste, smell, color, age, proximity, temperature, availability, and cost. A conventional machine reader will just dumbly log in the word "wine" and move on to other instances of the same word without requiring any adherence to a theme.

Experience and breadth of contact helps educate humans and machines alike when trying to discern the thoughts, information, and feelings conveyed by messages. The previous or parallel contacts help define the themes of the messages. Humans can use these to avoid commercial messages they have no interest in, or just the opposite, to bring focus and attention to something that would otherwise merely skip-by unnoticed.

Commercial messages that have no relevance or importance to a consumer are easy for them to ignore and dismiss. Do it enough, and the consumers will get annoyed by the noise. Consumers have learned to tune out when they have been bombarded with rudderless billboards, letters, radio and TV spots, and now emails and pop ups on webpages. Very rarely does something interesting or relevant present itself, and those that do get tossed out with the ad hoc spam filters we all create.

People generally behave in consistent ways that make their future behaviors predictable, at least to some extent. Consumer behavior and predictions are bit easier to observe and to forecast because sales data is very objective. Messages generated from these observations and forecasts would also be better received since they would be more business-like and less personal. Insulting, embarrassing, and intimidating messages will, of course, completely turn off anyone, so messages that could have these affects are to be scrupulously avoided if one hopes to succeed in a line of business.

We have used the term "smart agent" to describe our own unique constructs in fraud detection systems. Intelligent agents, software agents, and smart agents described in the prior art and used in conventional applications are not-at-all the same.

Sometimes all we know about someone is what can be inferred by the silhouettes and shadows they cast and the footprints they leave. Who is behind a credit card or payment transaction is a lot like that. We can only know and understand them by the behaviors that can be gleaned from the who, what, when, where, and (maybe) why of each transaction and series of them over time.

Cardholders will each individually settle into routine behaviors, and therefore their payment card transactions will follow those routines. All cardholders, as a group, are roughly the same and produce roughly the same sorts of transactions. But on closer inspection the general population of cardholders can cluster into various subgroups as manifested in the transactions they generate.

Card issuers want to encourage cardholders to use their cards, and want to stop and completely eliminate fraudsters from being able to pose as legitimate cardholders and get away with running transactions through to payment. So card issuers are challenged with being able to discern who is legitimate, authorized, and presenting a genuine transaction, from the clever and aggressive assaults of fraudsters who learn and adapt all too quickly. All the card issuers have before them are the millions of innocuous transactions flowing in every day.

An artificial intelligence system that can correctly perceive and classify the underlying thoughts, information, and feelings inherent in every human generated message can have tremendous economic and security value to individuals, governments, and business alike. Especially if that artificial intelligence system is able to inspect billions of messages in realtime and then able to provide some desirable, useful, or otherwise actionable outputs.

The sort of activities we have already identified as being able to benefit handsomely from useful actionable outputs include: (1) Realtime one-to-one advertising, (2) Social Media like Facebook in understanding the sentiment of chats, (3) Search engines like Google to provide a better search engine, (4) Adult Content Protections, (6) Reputations of companies, businesses, industries and individuals, (6) Assigning sentiments to themes, (7) determining the meaning of a document and to match the document to its content, (8) to classify text communications, (9) fine tuning of natural language interaction applications and voice recognition, (10) Protecting against the theft and communication of important documents, (11) Detecting spam e-mail, (12) thematic clustering, (13) semantic processing of text, (14) Text segmentation, (15) Audience Clustering, (16) Deep understanding and learning of actors and participants, (17) Predictive marketing, (18) Brand sentiment analyses and (19) threat (terrorism) detection.

Different users would, of course, have different needs and requirements for artificial intelligence systems that can correctly perceive and classify the inherent in human generated messages. Some users will have specific interests and abilities to respond. Others will not know ahead of time what it is they want in particular, like in impulse buying. The message flows themselves will limit and constrain what is possible by the simple absence of messages having the targeted kinds of underlying thoughts, information, and feelings.

SUMMARY OF THE INVENTION

Briefly, an artificial intelligence and machine learning system embodiment of the present invention comprises a computer network server connected to receive and analyze millions of simultaneous text and/or voice messages written by humans to be read and understood by humans. Key, or otherwise important words in sentences are identified and collected. Each such word is input to a qualia generator that parses the word into the possible contexts, themes, or other reasonable ambiguities that can exist at the level of sentences, paragraphs, and missives. A thesaurus-like table is employed to fan out each word into a discrete spread. Several such spreads are used as templates on the others to find petals that exhibit a convergence of meaning. Once the context of a whole missive has been predicted, each paragraph is deconstructed into sub-contexts that are appropriate within the overall theme. Particular contexts identified are then useful to trigger an actionable output.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 1 is functional block diagram of an artificial intelligence fraud management solution embodiment of the present invention;

FIG. 2A is functional block diagram of an application development system (ADS) embodiment of the present invention for fraud-based target applications;

FIG. 3 is functional block diagram of a model training embodiment of the present invention;

FIG. 4 is functional block diagram of a real-time payment fraud management system like that illustrated in FIG. 1 as applied payment fraud model;

FIG. 5 is functional block diagram of a smart agent process embodiment of the present invention;

FIG. 6 is functional block diagram of a most recent fifteen-minute transaction velocity counter;

FIG. 13 is a diagram representing a simplified smart agent profile and how individual constituent datapoints are compared to running norms and are accumulated into an overall risk score;

DETAILED DESCRIPTION OF THE INVENTION

Figure 2B:
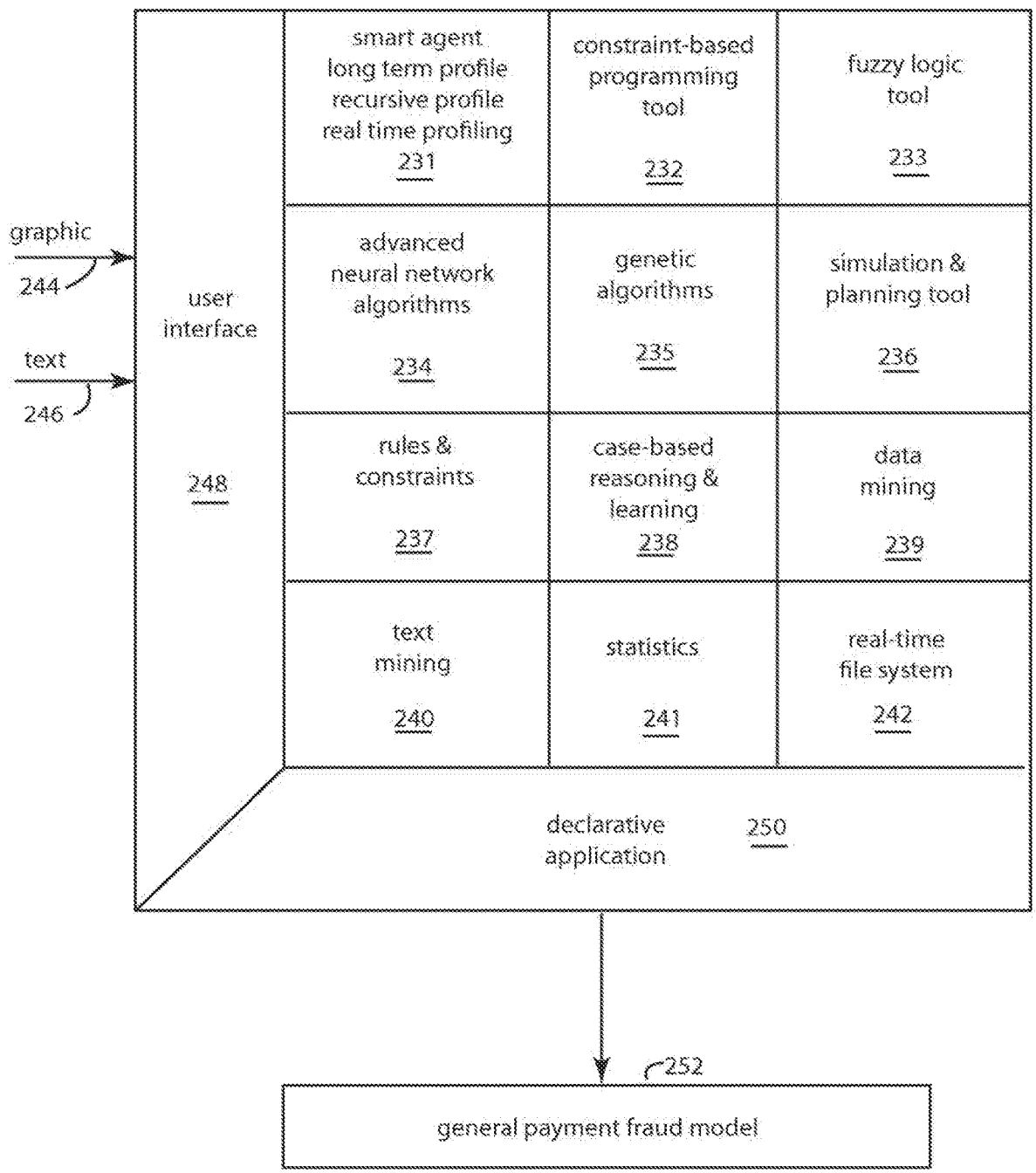
FIG. 2B is functional block diagram of an improved and updated application development system (ADS) embodiment of the present invention for fraud-based target applications.

Smart agent embodiments of the present invention recognize that the actors and entities behind transactions can be fully understood in their essential aspects by way of the attributes inherent in each transaction. Nothing else is of much importance, and very little more is usually unavailable anyway.

In payment system fraud, a legitimate cardholder and a fraudster can be in actuality two different people, and will therefor naturally behave in two different ways. They each will manifest transactions that will often reflect those differences. Fraudsters have far different agendas and purposes in their transactions than do legitimate cardholders, and so that can difference can be used to cast "spotlights".

Sometimes legitimate cardholders innocently generate transactions that look like a fraudster was responsible, and sometimes fraudsters succeed at being a wolf-in-sheep's-clothing. When a machine gets that that wrong, it will issue false positives and false negatives in an otherwise well performing fraud management payment system.

In the vast majority of cases, the legitimate cardholders will be completely unknown and anonymous to the fraudster and bits of knowledge about their particular social security numbers, CVV numbers, phone numbers, zipcodes, and passwords will be impossible or expensive to obtain. And so they will be effective as a security factor that will stop fraud. But fraudsters that are socially close to the legitimate cardholder can have those bits within easy reach.

Occasionally each legitimate cardholder will step way out-of-character and generate a transaction that looks suspicious or downright fraudulent. Often such transactions can be forecast by previous such outbursts that they or their peers engaged in.

Embodiments of the present invention generate a population of virtual smart agents corresponding to every cardholder, merchant, and device ID that hinted at during modeling and training. Each smart agent is nothing more than a pigeonhole and summation of various aspects of every transaction in a real-time profile of less than ninety days and a long-term profile of transactions older than ninety days. Actors and entities are built of no more than the attributes the express in each transaction. In fact, smart agents themselves take no action on their own and are not capable. They are merely attributes, descriptors, what can be seen on the surface.

In this description here, smart agent embodiments of the present invention are nothing like the smart agents, intelligent agents, or software agents described by artificial intelligence researchers in the Literature.

The collecting, storing, and accessing of the transactional attributes of millions of smart agents engaging in billions of transactions is a challenge for conventional hardware platforms. Our earlier filed United States patent applications provide practical details on how a working system platform to host our smart agents can be built and programmed. For example, U.S. patent application Ser. No. 14/521,386, filed 22 Oct. 2014, and titled, Reducing False Positives with Transaction Behavior Forecasting; and also Ser. No. 14/520, 361, filed 22 Oct. 2014, and titled Fast Access Vectors In Real-Time Behavioral Profiling.

At the most elementary level, each smart agent begins as a list of transactions for the corresponding actor or entity that were sorted from the general inflow of transactions. Each list becomes a profile and various velocity counts are pre-computed to make later real-time access more efficient and less burdensome. For example, a running total of the transactions is maintained as an attribute datapoint, as are the minimums, maximums, and averages of the dollar amounts of all long term or short term transactions. The frequency of those transactions per atomic time interval is also preprocessed and instantly available in any time interval. The frequencies of zipcodes involved in transactions is another velocity count. The radius of those zipcodes around the cardholders home zipcode can be another velocity count from a pre-computation.

So, each smart agent is a two-dimensional thing in virtual memory expressing attributes and velocity counts in its width and time intervals and constituent transactions in its length. As time moves to the next interval, the time intervals in every smart agent are effectively shift registered ad pushed down.

The smart agent profiles can be data mined for purchasing patterns, e.g., airline ticket purchases are always associated with car rentals and hotel charges. Concert ticket venues are associated with high end restaurants and bar bills. These patterns can form behavioral clusters useful in forecasting.

FIG. 1 represents an artificial intelligence fraud management solution embodiment of the present invention, and is referred to herein by the general reference numeral 100. Such solution 100 comprises an expert programmer development system 102 for building trainable general payment fraud models 104 that integrate several, but otherwise blank artificial intelligence classifiers, e.g., neural networks, case based reasoning, decision trees, genetic algorithms, fuzzy logic, and rules and constraints. These are further integrated by the expert programmers inputs 106 and development system 102 to include smart agents and associated real-time profiling, recursive profiles, and long-term profiles.

The trainable general payment fraud models 104 are trained with supervised and unsupervised data 108 and 110 to produce a trained payment fraud model 112. For example, accountholder and historical transaction data. This trained payment fraud model 112 can then be sold as a computer program library or a software-as-a-service applied payment fraud model. This then is applied by a commercial client in an applied payment fraud model 114 to process real-time transactions and authorization requests 116 for fraud scores. The applied payment fraud model 114 is further able to accept a client tuning input 120.

FIG. 2A represents an application development system (ADS) embodiment of the present invention for fraud-based target applications, and is referred to herein by the general reference numeral 200. Such is the equivalent of development system 102 in FIG. 1. ADS 200 comprises a number of computer program development libraries and tools that highly skilled artificial intelligence scientists and artisans can manipulate into a novel combination of complementary technologies. In an early embodiment of ADS 200 we combined a goal-oriented multi-agent technology 201 for building run-time smart agents, a constraint-based programming tool 202, a fuzzy logic tool 203, a library of genetic algorithms 205, a simulation and planning tool 206, a library of business rules and constraints 207, case-based reasoning and learning tools 208, a real-time interpreted language compiler 209, a C++ code generator 210, a library of data compression algorithms 211, and a database connectivity tool 212.

The highly skilled artificial intelligence scientists and artisans provide graphical and textual inputs 214 and 216 to a user interface (UI) 218 to manipulate the novel combinations of complementary technologies into a declarative application 220.

Declarative application 214 is molded, modeled, simulated, tested, corrected, massaged, and unified into a fully functional hybrid combination that is eventually output as a trainable general payment fraud model 222. Such is the equivalent of trainable general payment fraud model 104 in FIG. 1.

It was discovered by the present inventor that the highly skilled artificial intelligence scientists and artisans that could manipulate the complementary technologies mentioned into specific novel combinations required exceedingly talented individuals that were in short supply.

It was, however, possible to build and to prove out that ADS 200 as a compiler would produce trainable general payment fraud models 220, and these were more commercially attractive and viable.

After many years of experimental use and trials, ADS 200 was constantly improved and updated. Database connectivity tool 212, for example, tried to press conventional databases into service during run-time to receive and supply datapoints in real-time transaction service. It turned out no conventional databases were up to it.

At the present, an updated and improved ADS shown with general reference numeral 230 in FIG. 2B is providing better and more useful trainable general payment fraud models.

ADS 230 is the most recent equivalent of development system 102 in FIG. 1. ADS 230 assembles together a different mix of computer program development libraries and tools for the highly skilled artificial intelligence scientists and artisans to manipulate into a new hybrid of still complementary technologies.

In this later embodiment, ADS 230, we combined an improved smart-agent technology 231 for building run-time smart agents that are essentially only silhouettes of their constituent attributes. These attributes are themselves smart-agents with second level attributes and values that are able to "call" on real-time profilers, recursive profilers, and long term profilers. Such profilers can provide comparative assessments of each datapoint with the new information flowing in during run-time. In general, "real-time" profiles include transactions less than ninety days old. Long-term profiles accumulate transactions over ninety days old. In some applications, the line of demarcation was forty-five days, due to data storage concerns. Recursive profiles are those that inspect what an entity's peers have done in comparison.

The three profilers can thereafter throw exceptions in each datapoint category, and the number and quality of exceptions thrown across the breadth of the attributes then incoming will produce a fraud risk score that generally raises exponentially with that number of exceptions thrown. Oracle explains in C++ programming that exceptions provide a way to react to exceptional circumstances (like fraud suspected) in programs by transferring control to special functions called "handlers".

At the top level of a hierarchy of smart agents linked by their attributes are the smart agents for the independent actors who can engage in fraud. In a payment fraud model, that top level will be the cardholders as tracked by the cardholder account numbers reported in transaction data.

These top level smart agents can call on a moving 15-minute window file that has all the transactions reported to the system in the last 15-minutes. Too much activity in 15-minutes by any one actor is cause for further inspection and analysis.

ADS 230 further comprises a constraint-based programming tool 232, a fuzzy logic tool 233, a library of advanced neural network algorithms 234, a library of genetic algorithms 235, a simulation and planning tool 236, a library of business rules and constraints 237, case-based reasoning and learning tools 238, a data mining tool 239, a text mining tool 240, a statistical tool 241 and a real-time file system 242.

The real-time file system 242 is a simple organization of attribute values for smart agent profilers that allow quick, direct file access.

The highly skilled artificial intelligence scientists and artisans provide graphical and textual inputs 244 and 246 to a user interface (UI) 248 to manipulate the novel combinations of complementary technologies into a declarative application 250.

Declarative application 250 is also molded, modeled, simulated, tested, corrected, massaged, and unified into a fully functional hybrid combination that is eventually output as a trainable general payment fraud model 252. Such is also the more improved equivalent of trainable general payment fraud model 104 in FIG. 1.

The constraint-based programming tools 202 and 232 limit the number of possible solutions. Complex conditions with complex constraints can create an exponential number of possibilities. Fixed constraints, fuzzy constraints, and polynomials are combined in cases where no exact solution exists. New constraints can be added or deleted at any time. The dynamic nature of the tool makes possible real-time simulations of complex plans, schedules, and diagnostics.

The constraint-based programming tools are written as a very complete language in its own right. It can integrate a variety of variables and constraints, as in the following Table.

---

Variables: Real, with integer values, enumerated, sets, matrices and vectors, intervals, fuzzy subsets, and more.
Arithmetic Constraints: =, +, −, *, /, /=, >, <, >=, <=, interval addition, interval subtraction, interval multiplication and interval division, max, min, intersection, union, exponential, modulo, logarithm, and more.
Temporal (Allen) Constraints: Control allows you to write any temporal constraints including Equal, N-equal, Before, After, Meets, Overlaps, Starts, Finishes, and personal temporal operators such as Disjoint, Started-by, Overlapped-by, Met-by, Finished-by, and more.
Boolean Constraints: Or, And, Not, XOR, Implication, Equivalence
Symbolic Constraints: Inclusion, Union, Intersection, Cardinality, Belonging, and more.

---

The constraint-based programming tools 202 and 232 include a library of ways to arrange subsystems, constraints and variables. Control strategies and operators can be defined within or outside using traditional languages such as C, C++, FORTRAN, etc. Programmers do not have to learn a new language, and provides an easy-to-master programming interface by providing an in-depth library and traditional tools.

Fuzzy logic tools 203 and 233 recognize many of the largest problems in organizations cannot be solved by simple yes/no or black/white answers. Sometimes the answers need to be rendered in shades of gray. This is where fuzzy logic proves useful. Fuzzy logic handles imprecision or uncertainty by attaching various measures of credibility to propositions. Such technology enables clear definitions of problems where only imperfect or partial knowledge exists, such as when a goal is approximate, or between all and nothing. In fraud applications, this can equate to the answer being "maybe" fraud is present, and the circumstances warrant further investigation.

Tools 204 and 234 provides twelve different neural network algorithms, including Back propagation, Kohonen, Art, Fuzzy ART, RBF and others, in an easy-to-implement C++ library. Neural networks are algorithmic systems that interpret historical data to identify trends and patterns against which to compare subject cases. The libraries of advanced neural network algorithms can be used to translate databases to neurons without user intervention, and can significantly accelerate the speed of convergence over conventional back propagation, and other neural network algorithms. The present invention's neural net is incremental and adaptive, allowing the size of the output classes to change dynamically. An expert mode in the advanced application development tool suite provides a library of twelve different neural network models for use in customization.

Neural networks can detect trends and patterns other computer techniques are unable to. Neurons work collaboratively to solve the defined problem. Neural networks are adept in areas that resemble human reasoning, making them well suited to solve problems that involve pattern recognition and forecasting. Thus, neural networks can solve problems that are too complex to solve with conventional technologies.

Libraries 205 and 235 include genetic algorithms to initialize a population of elements where each element represents one possible set of initial attributes. Once the models are designed based on these elements, a blind test performance is used as the evaluation function. The genetic algorithm will be then used to select the attributes that will be used in the design of the final models. The component particularly helps when multiple outcomes may achieve the same predefined goal. For instance, if a problem can be solved profitably in any number of ways, genetic algorithms can determine the most profitable way.

Simulation and planning tool 206 can be used during model designs to check the performances of the models.

Business rules and constraints 207 provides a central storage of best practices and know how that can be applied to current situations. Rules and constraints can continue to be captured over the course of years, applying them to the resolution of current problems.

Case-based reasoning 208 uses past experiences in solving similar problems to solve new problems. Each case is a history outlined by its descriptors and the steps that lead to a particular outcome. Previous cases and outcomes are stored and organized in a database. When a similar situation presents itself again later, a number of solutions that can be tried, or should be avoided, will present immediately. Solutions to complex problems can avoid delays in calculations and processing, and be offered very quickly.

Language interpretation tool 209 provides a constant feedback and evaluation loop. Intermediary Code generator 210 translates Declarative Applications 214 designed by any expert into a faster program 230 for a target host 232.

During run-time, real time transaction data 234 can be received and processed according to declarative application 214 by target host 232 with the objective of producing run-time fraud detections 236. For example, in a payments application card payments transaction requests from merchants can be analyzed for fraud activity. In healthcare applications the reports and compensation demands of providers can be scanned for fraud. And in insider trader applications individual traders can be scrutinized for special knowledge that could have illegally helped them profit from stock market moves.

File compression algorithms library 211 helps preserve network bandwidth by compressing data at the user's discretion.

FIG. 3 represents a model training embodiment of the present invention, and is referred to herein by the general reference numeral 300. Model trainer 300 can be fed a very complete, comprehensive transaction history 302 that can include both supervised and unsupervised data. A filter 304 actually comprises many individual filters that can be selected by a switch 306. Each filter can separate the supervised and unsupervised data from comprehensive transaction history 302 into a stream correlated by some factor in each transaction.

The resulting filtered training data will produce a trained model that will be highly specific and sensitive to fraud in the filtered category. When two or more of these specialized trained models used in parallel are combined in other embodiments of the present invention they will excel in real-time cross-channel fraud prevention.

In a payment card fraud embodiment of the present invention, during model training, the filters 304 are selected by switch 306 to filter through dozens of different channels, one-at-a-time for each real-time, risk-scoring channel model that will be needed and later run together in parallel. For example, such channels can include channel transactions and authorization requests for card-not-present, card-present, high risk merchant category code (MCC), micro-merchant, small and medium sized enterprise (SME) finance, international, domestic, debit card, credit card, contactless, or other groupings or financial networks.

The objective here is to detect a first hint of fraud in any channel for a particular accountholder, and to "warn" all the other real-time, risk-scoring channel models that something suspicious is occurring with this accountholder. In one embodiment, the warning comprises an update in the nature of feedback to the real-time, long-term, and recursive profiles for that accountholder so that all the real-time, risk-scoring channel models step up together increment the risk thresholds that accountholder will be permitted. More hits in more channels should translate to an immediate alert and shutdown of all the affected accountholders accounts.

Competitive prior art products make themselves immediately unattractive and difficult to use by insisting that training data suit some particular format. In reality, training data will come from multiple, disparate, dissimilar, incongruent, proprietary data sources simultaneously. A data cleanup process 308 is therefore important to include here to do coherence analysis, and to harmonize, unify, error-correct, and otherwise standardize the heterogeneous data coming from transaction data history 302. The commercial advantage of that is a wide range of clients with many different channels can provide their transaction data histories 302 in whatever formats and file structures are natural to the provider. It is expected that embodiments of the present invention will find applications in financial services, defense and cyber security, health and public service, technology, mobile payments, retail and e-commerce, marketing and social networking, and others.

A data enrichment process 310 computes interpolations and extrapolations of the training data, and expands it out to as many as two-hundred and fifty datapoints from the forty or so relevant datapoints originally provided by transaction data history 302.

A trainable fraud model 312 (like that illustrated in FIG. 1 as trainable general payment fraud model 104) is trained into a channel specialized fraud model 314, and each are the equivalent of the applied fraud model 114 illustrated in FIG. 1. The selected training results from the switch 306 setting and the filters 304 then existing.

Channel specialized fraud models 314 can be sold individually or in assorted varieties to clients, and then imported by them as a commercial software app, product, or library.

A variety of selected applied fraud models 316-323 represent the applied fraud models 114 that result with different settings of filter switch 306. Each selected applied fraud model 314 will include a hybrid of artificial intelligence classification models represented by models 330-332 and a smart-agent population build 334 with a corresponding set of real-time, recursive, and long-term profilers 336. The enriched data from data enrichment process 310 is fully represented in the smart-agent population build 334 and profilers 336.

FIG. 4 represents a real-time payment fraud management system 400 like that illustrated in FIG. 1 as applied payment fraud model 114. A raw transaction separator 402 filters through the forty or so data items that are relevant to the computing of a fraud score. A process 404 adds timestamps to these relevant datapoints and passes them in parallel to a selected applied fraud model 406. This is equivalent to a selected one of applied fraud models 316-323 in FIG. 3 and applied payment fraud model 114 in FIG. 1.

During a session in which the time-stamped relevant transaction data flows in, a set of classification models 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided to the population of smart agents 412.

The classification models 408-410 and population of smart agents 412 and profilers 414 all each produce an independent and separate vote or fraud score 420-423 on the same line of time-stamped relevant transaction data. A weighted summation processor 424 responds to client tunings 426 to output a final fraud score 428.

FIG. 5 represents a smart agent process 500 in an embodiment of the present invention. For example, these would include the smart agent population build 334 and profiles 336 in FIG. 3 and smart agents 412 and profiles 414 in FIG. 4. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include datapoints for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A9 and numbered 521-529 in FIG. 5. These attributes A1-A9 521-529 are merely pointers to attribute smart agents. Two of these, one for A1 and one for A2, are represented in FIG. 5. Here, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 5 that would otherwise result.

Each attribute smart agent like 530 and 540 will include or access a corresponding profile datapoint 536 and 546. This is actually a simplification of the three kinds of profiles 336 (FIG. 3) that were originally built during training and updated in update 416 (FIG. 4). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Home Depot and Costco that average $100-$300, then an instantaneous incoming real-time transaction record 502 that reports another $200 purchase at the local Costco will raise no alarms. But a sudden, unique, inexplicable purchase for $1250 at a New York Jeweler will and should throw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 547 should accept some slack, but not too much. Each can throw an exception 538 and 548, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings 426 in FIG. 4.

These exceptions are collected by a smart agent risk algorithm 550. One deviation or exception thrown on any one attribute being "abnormal" can be tolerated if not too egregious. But two or more should be weighted more than just the simple sum, e.g., $(1+1)''=2''$ instead of simply $1+1=2$. The product is output as a smart agent risk assessment 552. This output is the equivalent of independent and separate vote or fraud score 423 in FIG. 4.

FIG. 6 represents a most recent 15-minute transaction velocity counter 600, in an embodiment of the present invention. It receives the same kind of real-time transaction data inputs as were described in connection with FIG. 4 as raw transaction data 402 and FIG. 5 as records 502. A raw transaction record 602 includes a hundred or so datapoints. About forty of those datapoints are relevant to fraud detection an identified in FIG. 6 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 6 arbitrarily identifies the respective ages of members of transaction time-series stack 608 with example ages 0:73, 1:16, 3:11, 6:17, 10:52, 11:05, 13:41, and 14:58. Those aged more than 15-minutes are simply identified with ages ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search process 610 accepts a search key from register 606 and reports any matches in the most 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 5.

Figure 7:
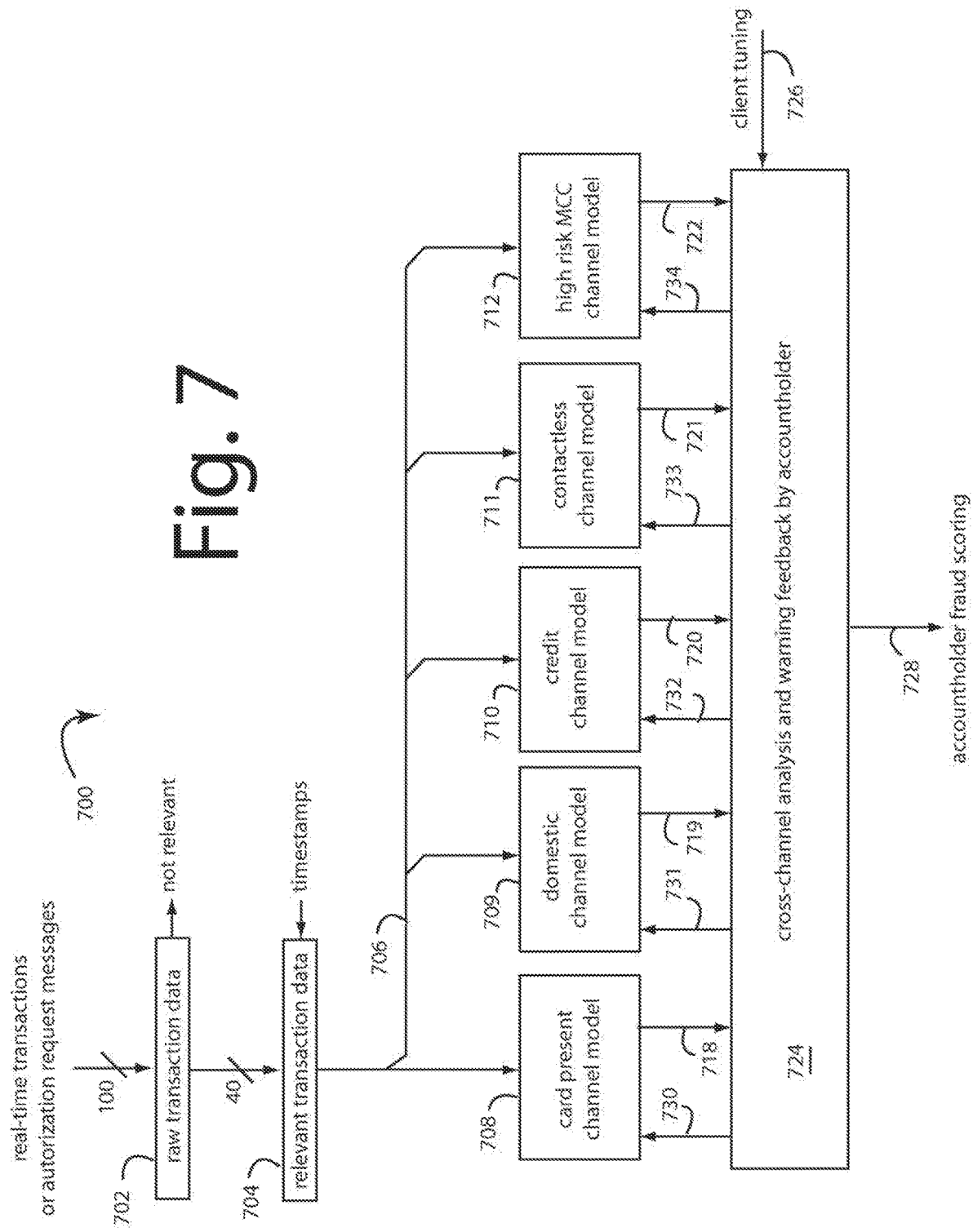
FIG. 7 is functional block diagram of a cross-channel payment fraud management embodiment of the present invention.

FIG. 7 represents a cross-channel payment fraud management embodiment of the present invention, and is referred to herein by general reference numeral 700.

Real-time cross-channel monitoring uses track cross channel and cross product patterns to cross pollinate information for more accurate decisions. Such track not only the channel where the fraud ends but also the initiating channel to deliver a holistic fraud monitoring. A standalone internet banking fraud solution will allow a transaction if it is within its limits, however if core banking is in picture, then it will stop this transaction, as we additionally know the source of funding of this account (which mostly in missing in internet banking).

In FIG. 3, a variety of selected applied fraud models 316-323 represent the applied fraud models 114 that result with different settings of filter switch 306. A real-time cross-channel monitoring payment network server can be constructed by running several of these selected applied fraud models 316-323 in parallel.

FIG. 7 represents a real-time cross-channel monitoring payment network server 700, in an embodiment of the present invention. Each customer or accountholder of a financial institution can have several very different kinds of accounts and use them in very different transactional channels. For example, card-present, domestic, credit card, contactless, and high risk MCC channels. So in order for a cross-channel fraud detection system to work at its best, all the transaction data from all the channels is funneled into one pipe for analysis.

Real-time transactions and authorization requests data is input and stripped of irrelevant datapoints by a process 702. The resulting relevant data is time-stamped in a process 704. The 15-minute vector process of FIG. 6 may be engaged at this point in background. A bus 706 feeds the data in parallel line-by-line, e.g., to a selected applied fraud channel model for card present 708, domestic 709, credit 710, contactless 711, and high risk MCC 712. Each can pop an exception to the current line input data with an evaluation flag or score 718-722. The involved accountholder is understood.

These exceptions are collected and analyzed by a process 724 that can issue warning feedback for the profiles maintained for each accountholder. Each selected applied fraud channel model 708-712 shares risk information about particular accountholders with the other selected applied fraud models 708-712. A suspicious or outright fraudulent transaction detected by a first selected applied fraud channel model 708-712 for a particular customer in one channel is cause for a risk adjustment for that same customer in all the other applied fraud models for the other channels.

Exceptions 718-722 to an instant transactions on bus 706 trigger an automated examination of the customer or accountholder involved in a profiling process 724, especially with respect to the 15-minute vectors and activity in the other channels for the instant accountholder. A client tuning input 726 will affect an ultimate accountholder fraud scoring output 728, e.g., by changing the respective risk thresholds for genuine-suspicious-fraudulent.

A corresponding set of warning triggers 73-734 is fed back to all the applied fraud channel models 708-712. The compromised accountholder result 728 can be expected to be a highly accurate and early protection warning.

In general, a process for cross-channel financial fraud protection comprises training a variety of real-time, risk-scoring fraud models with training data selected for each from a common transaction history to specialize each member in the monitoring of a selected channel. Then arranging the variety of real-time, risk-scoring fraud models after the training into a parallel arrangement so that all receive a mixed channel flow of real-time transaction data or authorization requests. The parallel arrangement of diversity trained real-time, risk-scoring fraud models is hosted on a network server platform for real-time risk scoring of the mixed channel flow of real-time transaction data or authorization requests. Risk thresholds are immediately updated for particular accountholders in every member of the parallel arrangement of diversity trained real-time, risk-scoring fraud models when any one of them detects a suspicious or outright fraudulent transaction data or authorization request for the accountholder. So, a compromise, takeover, or suspicious activity of the accountholder's account in any one channel is thereafter prevented from being employed to perpetrate a fraud in any of the other channels.

Such process for cross-channel financial fraud protection can further comprise steps for building a population of real-time and a long-term and a recursive profile for each the accountholder in each the real-time, risk-scoring fraud models. Then during real-time use, maintaining and updating the real-time, long-term, and recursive profiles for each accountholder in each and all of the real-time, risk-scoring fraud models with newly arriving data. If during real-time use a compromise, takeover, or suspicious activity of the accountholder's account in any one channel is detected, then updating the real-time, long-term, and recursive profiles for each accountholder in each and all of the other real-time, risk-scoring fraud models to further include an elevated risk flag. The elevated risk flags are included in a final risk score calculation 728 for the current transaction or authorization request.

The 15-minute vectors described in FIG. 6 are a way to cross pollenate risks calculated in one channel with the others. The 15-minute vectors can represent an amalgamation of transactions in all channels, or channel-by channel. Once a 15-minute vector has aged, it can be shifted into a 30-minute vector, a one-hour vector, and a whole day vector by a simple shift register means. These vectors represent velocity counts that can be very effective in catching fraud as it is occurring in real time.

In every case, embodiments of the present invention include adaptive learning that combines three learning techniques to evolve the artificial intelligence classifiers, e.g., 408-414. First is the automatic creation of profiles, or smart-agents, from historical data, e.g., long-term profiling. See FIG. 3. The second is real-time learning, e.g., enrichment of the smart-agents based on real-time activities. See FIG. 4. The third is adaptive learning carried by incremental learning algorithms. See FIG. 7.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays, Card not present (CNP) versus card present (CP), domestic versus cross-border, etc. this profile will highlights all the normal activities of the smart-agent (specific card).

Smart-agent technology has been observed to outperform conventional artificial and machine learning technologies. For example, data mining technology creates a decision tree from historical data. When historical data is applied to data mining algorithms, the result is a decision tree. Decision tree logic can be used to detect fraud in credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which requires actual business experts to write the rules, e.g., if-then-else logic. The most important limitations here are that the business rules require writing rules that are supposed to work for whole categories of customers. This requires the population to be sliced into many categories (students, seniors, zip codes, etc.) and asks the experts to provide rules that apply to all the cardholders of a category.

How could the US population be sliced? Even worse, why would all the cardholders in a category all have the same behavior? It is plain that business rules logic has built-in limits, and poor detection rates with high false positives. What should also be obvious is the rules are outdated as soon as they are written because conventionally they don't adapt at all to new fraud schemes or data shifts.

Neural network technology also limits, it uses historical data to create a matrix weights for future data classification. The Neural network will use as input (first layer) the historical transactions and the classification for fraud or not as an output). Neural Networks only learn from past transactions and cannot detect any new fraud schemes (that arise daily) if the neural network was not re-trained with this type of fraud. Same as data mining and business rules the classification logic learned from the historical data will be applied to all the cardholders even though each merchant has a unique activity pattern and each cardholder has a unique spending pattern.

Another limit is the classification logic learned from historical data is outdated the same day of its use because the fraud schemes changes but since the neural network did not learn with examples that contain this new type of fraud schemes, it will fail to detect this new type of fraud it lacks the ability to adapt to new fraud schemes and do not have the ability to respond to the highly volatile nature of fraud.

Contrary to previous technologies, smart-agent technology learns the specific behaviors of each cardholder and create a smart-agent that follow the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say twenty-seven terabytes of historical data is transformed into smart-agents, only 200-gigabytes is needed to represent twenty-seven million distinct smart-agents corresponding to all the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

In real-time behavioral profiling by the smart-agents, both the real-time and long-term engines require high speed transfers and lots of processor attention. Conventional database systems cannot provide the transfer speeds necessary, and the processing burdens cannot be tolerated.

Embodiments of the present invention include a fast, low overhead, custom file format and storage engine designed to retrieve profiles in real-time with a constant low load and save time. For example, the profiles 336 built in FIG. 3, and long-term, recursive, and real-time profiles 414 in FIG. 4.

Figure 8:
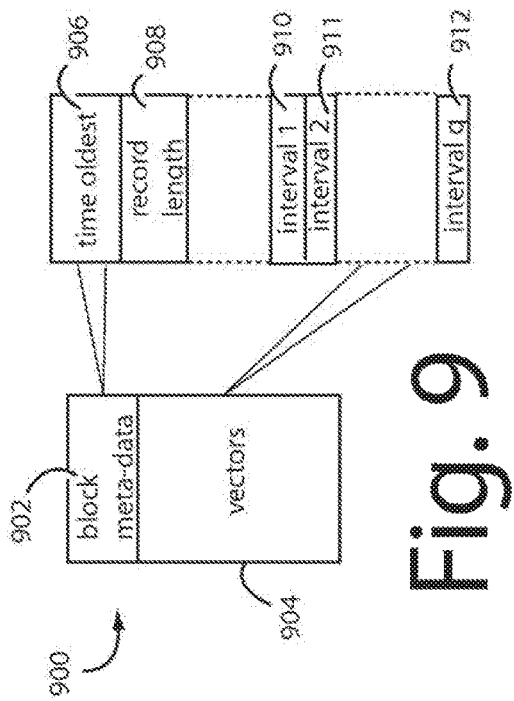
FIG. 8 is a diagram of a group of smart agent profiles stored in a custom binary file.

Referring now to FIG. 8, a group of smart agent profiles is stored in a custom binary file 800 which starts with a meta-data section 802 containing a profile definition, and a number of fixed size profile blocks, e.g., 804, 805, . . . 806 each containing the respective profiles. Such profiles are individually reserved to and used by a corresponding smart agent, e.g., profile 536 and smart agent 530 in FIG. 5. Fast file access to the profiles is needed on the arrival of every transaction 502. In FIG. 5, account number 504 signals the particular smart agents and profiles to access and that are required to provide a smart agent risk assessment 552 in real-time. For example, an approval or a denial in response to an authorization request message.

Figure 9:
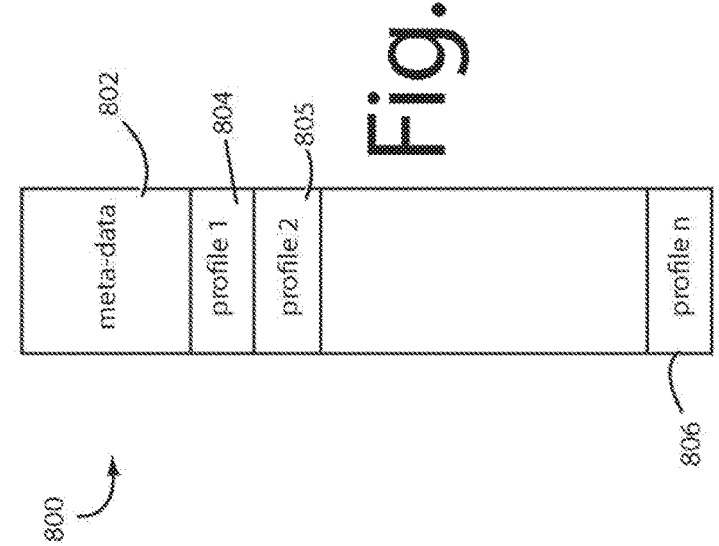
FIG. 9 is a diagram of the file contents of an exemplary smart agent profile.

FIG. 9 represents what's inside each such profile, e.g., a profile 900 includes a meta-data 902 and a rolling list of vectors 904. The meta-data 902 comprises the oldest one's time field 906, and a record length field 908. Transaction events are timestamped, recorded, and indexed by a specified atomic interval, e.g., ten minute intervals are typical, which is six hundred seconds. Each vector points to a run of profile datapoints that all share the same time interval, e.g., intervals 910-912. Some intervals will have no events, and therefor no vectors 904. Here, all the time intervals less than ninety days old are considered by the real-time (RT) profiles. Ones older than that are amalgamated into the respective long-term (LT) profiles.

What was purchased and how long ago a transaction for a particular accountholder occurred, and when their other recent transactions occurred can provide valuable insights into whether the transactions the accountholder is presently engaging in are normal and in character, or deviating. Forcing a fraud management and protection system to hunt a conventional database for every transaction a particular random accountholder engaged in is not practical. The accountholders' transactions must be pre-organized into their respective profiles so they are always randomly available for instant calculations. How that is made possible in embodiments of the present invention is illustrated here in FIGS. 5, 6, and 8-10.

Figure 10:
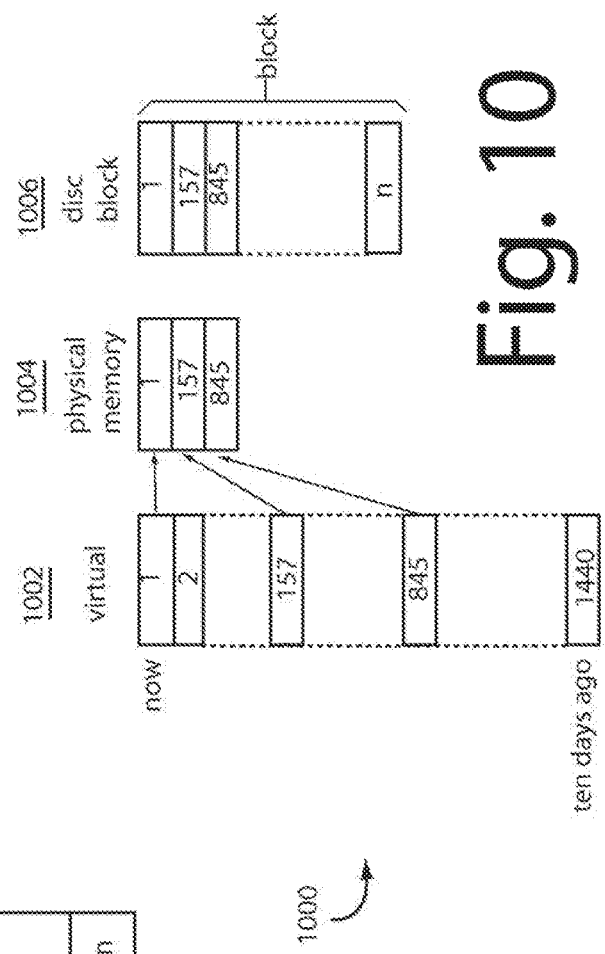
FIG. 10 is a diagram of a virtual addressing scheme used to access transactions in atomic time intervals by their smart agent profile vectors.

FIG. 10 illustrates a virtual memory system 1000 in which a virtual address representation 1002 is translated into a physical memory address 1004, and/or a disk block address 1006.

Profiling herein looks at events that occurred over a specific span of time. Any vectors that were assigned to events older than that are retired and made available for re-assignment to new events as they are added to the beginning of the list.

The following pseudo-code examples represent how smart agents (e.g., 412, 550) lookup profiles and make behavior deviation computations. A first step when a new transaction (e.g., 502) arrives is to find the one profile it should be directed to in the memory or filing system.

```
find_profile ( T: transaction, PT: Profile's Type )
Begin
    Extract the value from T for each key used in the routing logic for PT
    Combine the values from each key into PK
    Search for PK in the in-memory index
    If found, load the profile in the file of type PT based on the indexed
    position.
    Else, this is a new element without a profile of type PT yet.
End
```

If the profile is not a new one, then it can be updated, otherwise a new one has to be created.

```
update_profile ( T: transaction, PT: Profile's Type )
Begin
    find_profile of type PT P associated to T
    Deduce the timestamp t associated to T
    If P is empty, then add a new record based on the atomic interval for t
    Else locate the record to update based on t
        If there is no record associated to t yet,
        Then add a new record based on the atomic interval for t
    For each datapoint in the profile, update the record with the values in T
    (by increasing a count, sum, deducing a new minimum, maximum ...).
    Save the update to disk
End
```

```
        compute_profile ( T: transaction, PT: Profile's Type )
        Begin
            update_profile P of type PT with T
            Deduce the timestamp t associated to T
            For each datapoint DP in the profile,
                Initialize the counter C
                For each record R in the profile P
                    If the timestamp t associated to R belongs to the span
                    of time for DP
                    Then update C with the value of DB in the record R
                    (by increasing a count, sum,
                        deducing a new minimum, maximum ...)
                End For
            End For
            Return the values for each counter C
        End
```

```
        compute_profile ( T: transaction, PT: Profile's Type )
        Begin
            update_profile P of type PT with T
            Deduce the timestamp t associated to T
            For each datapoint DP in the profile,
                Initialize the counter C
                For each record R in the profile P
                    If the timestamp t associated to R belongs to the span
                    of time for DP
                    Then update C with the value of DB in the record R
                    (by increasing a count, sum,
                        deducing a new minimum, maximum ...)
                End For
```

```
            End For
            Return the values for each counter C
        End
```

The entity's behavior in the instant transaction is then analyzed to determine if the real-time (RT) behavior is out of the norm defined in the corresponding long-term (LT) profile. If a threshold (T) is exceeded, the transaction risk score is incremented.

```
analyze_entity_behavior ( T: transaction )
Begin
    Get the real-time profile RT by calling compute_profile( T, real-time )
    Get the long-term profile LT by calling compute_profile( T, long-term )
    Analyze the behavior of the entity by comparing its current behavior
    RT to its past
    behavior LT:
    For each datapoint DP in the profile,
        Compare the current value in RT to the one in LT (by computing the
        ratio or distance between the values).
            If the ratio or distance is greater than the pre-defined threshold,
            Then increase the risk associated to the transaction T
            Else decrease the risk associated to the transaction T
    End For
    Return the global risk associated to the transaction T
End
```

The entity's behavior in the instant transaction can further be analyzed to determine if its real-time (RT) behavior is out of the norm compared to its peer groups. defined in the corresponding long-term (LT) profile. If a threshold (T) is exceeded, the transaction risk score is incremented.

Recursive profiling compares the transaction (T) to the entity's peers one at a time.

```
compare_entity_to_peers ( T: transaction )
Begin
    Get the real-time profile RTe by calling compute_profile( T, real-time )
    Get the long-term profile LTe by calling compute_profile( T, long-term )
    Analyze the behavior of the entity by comparing it to its peer groups:
    For each peer group associated to the entity
        Get the real-time profile RTp of the peer: compute_profile
            ( T, real-time )
        Get the long-term profile LTp of the peer: compute_profile
            ( T, long-term )
        For each datapoint DP in the profile,
        Compare the current value in RTe and LTe to the ones in RTp and
        LTp (by computing the ratio or distance between the values).
            If the ratio or distance is greater than the pre-defined threshold,
            Then increase the risk associated to the transaction T
            Else decrease the risk associated to the transaction T
        End For
    End For
    Return the global risk associated to the transaction T
End
```

Each attribute inspection will either increase or decrease the associated overall transaction risk. For example, a transaction with a zipcode that is highly represented in the long term profile would reduce risk. A transaction amount in line with prior experiences would also be a reason to reduce risk. But an MCC datapoint that has never been seen before for this entity represents a high risk. (Unless it could be forecast or otherwise predicted.)

One or more datapoints in a transaction can be expanded with a velocity count of how-many or how-much of the corresponding attributes have occurred over at least one different span of time intervals. The velocity counts are included in a calculation of the transaction risk.

Transaction risk is calculated datapoint-by-datapoint and includes velocity count expansions. The datapoint values that exceed a normative point by a threshold value increment the transaction risk. Datapoint values that do not exceed the threshold value cause the transaction risk to be decremented. A positive or negative bias value can be added that effectively shifts the threshold values to sensitize or desensitize a particular datapoint for subsequent transactions related to the same entity. For example, when an airline expense is certain to be followed by a rental car or hotel expense in a far away city. The MCC's for rental car and hotel expenses are desensitized, as are datapoints for merchant locations in a corresponding far away city.

Figure 11:
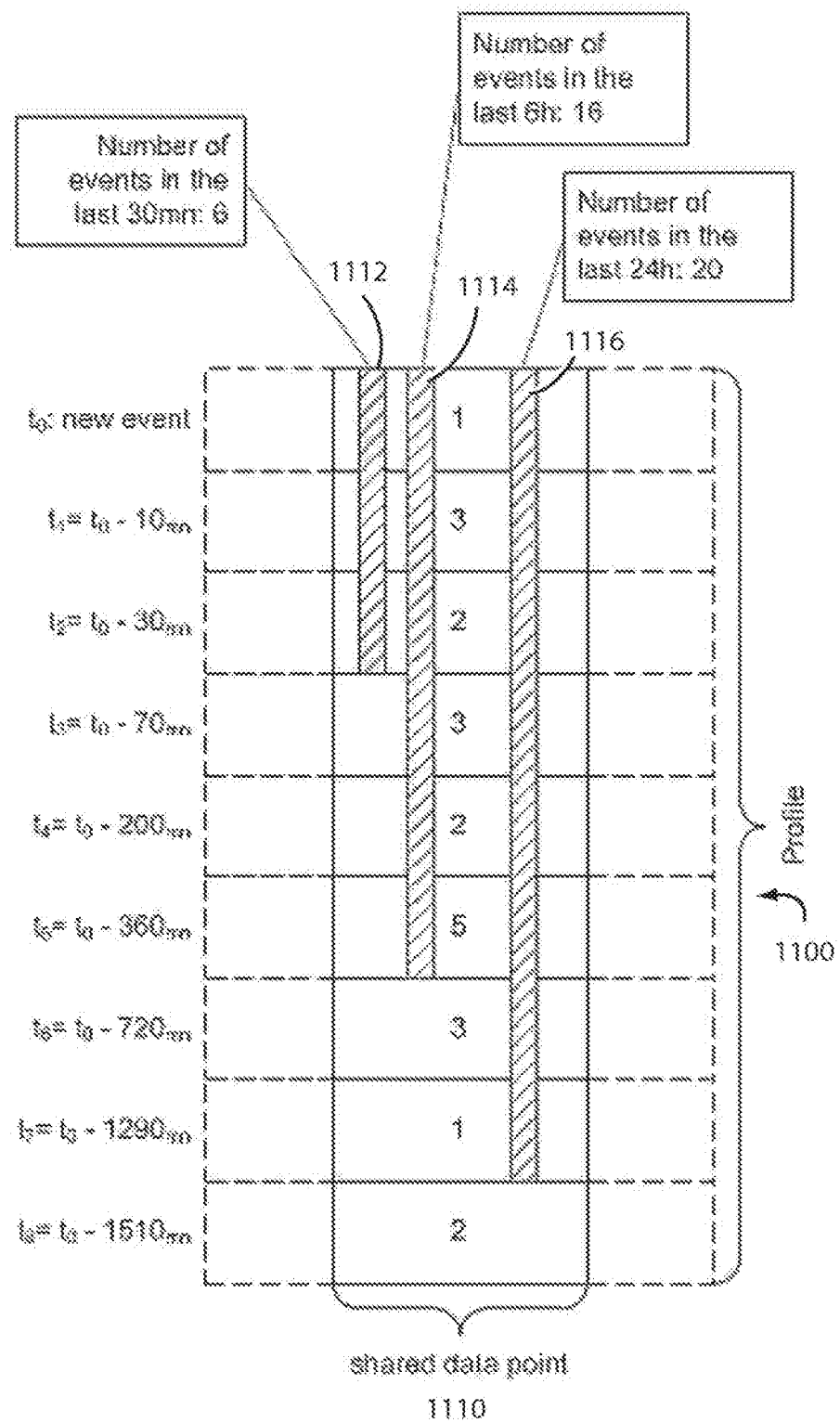
FIG. 11 is a diagram of a small part of an exemplary smart agent profile that spans several time intervals.

FIG. 11 illustrates an example of a profile 1100 that spans a number of time intervals $t_0$ to $t_8$. Transactions, and therefore profiles normally have dozens of datapoints that either come directly from each transaction or that are computed from transactions for a single entity over a series of time intervals. A typical datapoint 1110 velocity counts the number of events that have occurred in the last thirty minutes (count 1112), the last six hours (count 1114), and the last twenty-four hours (count 1116). In this example, $t_0$ had one event, $t_1$ had three events, $t_2$ had two events, $t_3$ had three events, $t_4$ had two events, $t_5$ had five events, $t_6$ had three events, $t_7$ had one event, and $t_8$ had two events; therefore, $t_2$ count 1112=6, $t_5$ count 1114=16, and $t_7$ count 1116=20. These three counts, 1112-1116 provide their velocity count computations in a simple and quick-to-fetch summation.

Figure 12:
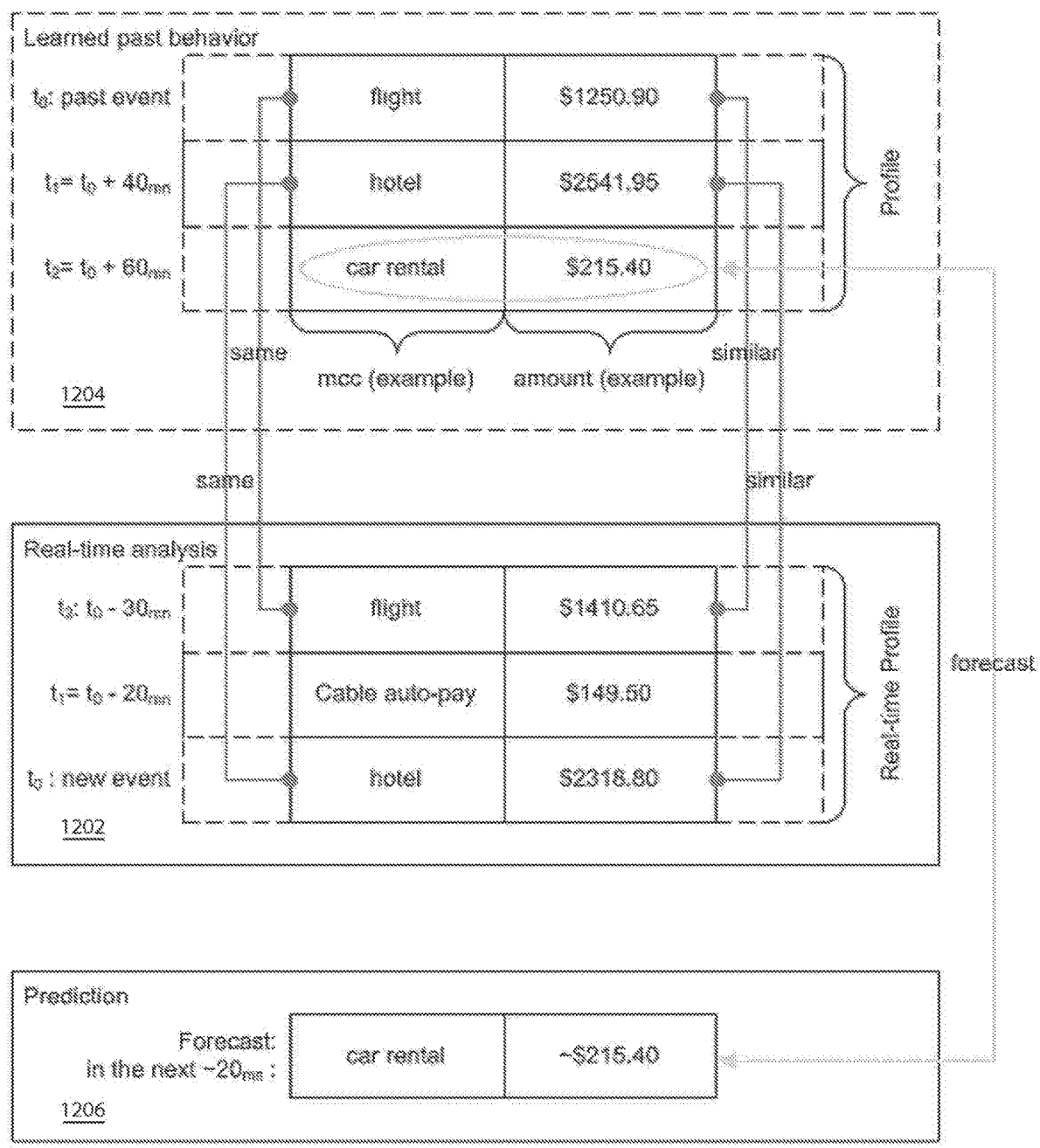
FIG. 12 is a diagram of a behavioral forecasting aspect of the present invention.

FIG. 12 illustrates a behavioral forecasting aspect of the present invention. A forecast model 1200 engages in a real-time analysis 1202, consults a learned past behavior 1204, and then makes a behavioral prediction 1206. For example, the real-time analysis 1202 includes a flight purchase for $1410.65, an auto pay for cable for $149.50, and a hotel for $2318.80 in a most recent event. It makes sense that the booking and payment for a flight would be concomitant with a hotel expense, both represent travel. Consulting the learned past behavior 1204 reveals that transactions for flights and hotels has also been accompanied by a car rental. So an easy forecast for a car rental in the near future is and easy and reasonable assumption to make in behavioral prediction 1206.

Normally, an out-of-character expense for a car rental would carry a certain base level of risk. But if it can be forecast one is coming, and it arrives, then the risk can reduced since it has been forecast and is expected. Embodiments of the present invention therefore temporarily reduce risk assessments in the future transactions whenever particular classes and categories of expenses can be predicted or forecast.

In another example, a transaction to pay tuition at a local college could be expected to result in related expenses. So forecasts for bookstore purchases and ATM cash withdrawals at the college are reasonable. The bottom-line is fewer false positives will result.

Figure 13:
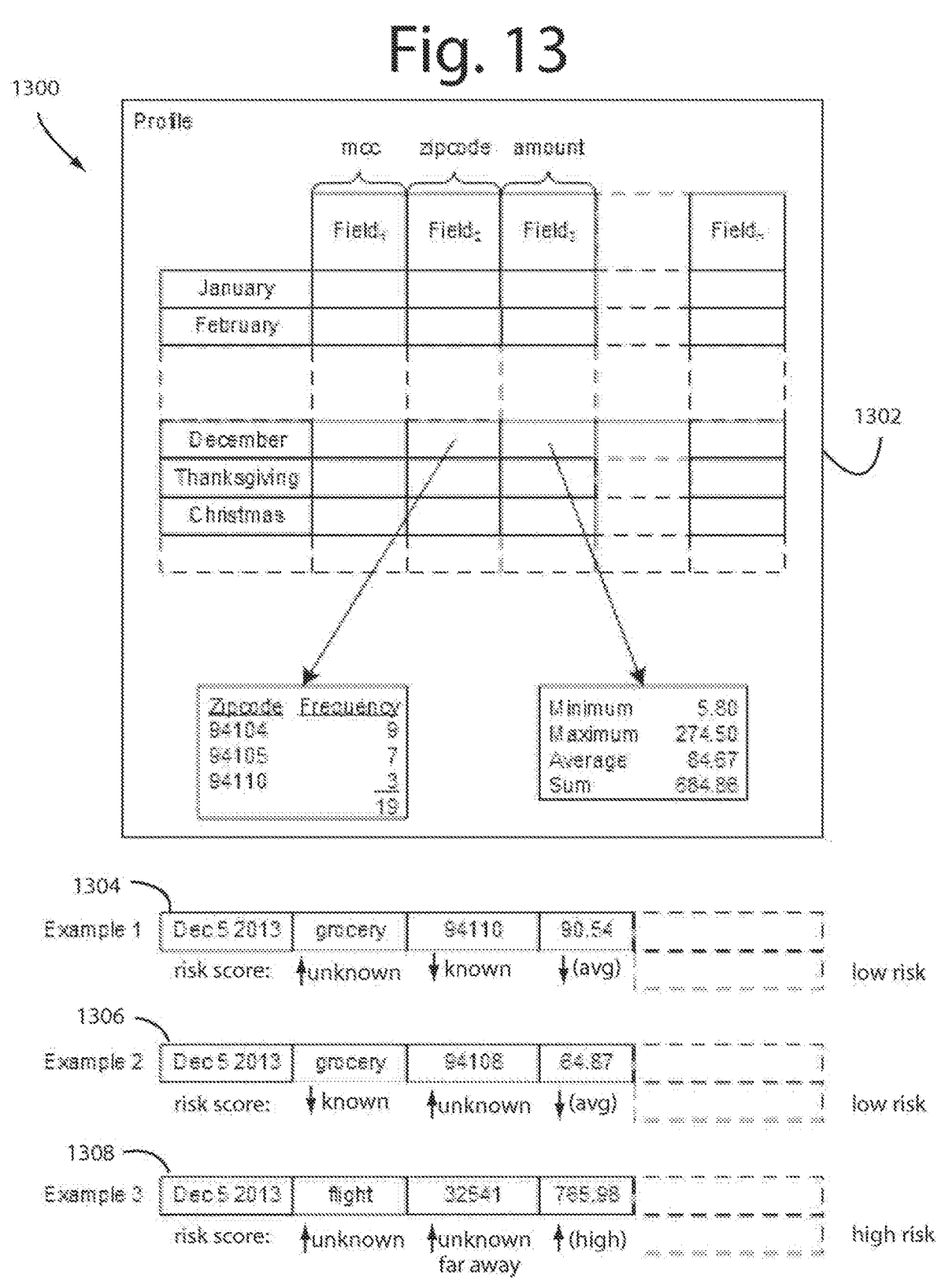

FIG. 13 illustrates a forecasting example 1300. A smart agent profile 1302 has several datapoint fields, $field_1$ through $field_n$. Here we assume the first three datapoint fields are for the MCC, zipcode, and amount reported in a new transaction. Several transaction time intervals spanning the calendar year include the months of January . . . December, and the Thanksgiving and Christmas seasons. In forecasting example 1300 the occurrence of certain zip codes is nine for 94104, seven for 94105, and three for 94110. Transaction amounts range $5.80 to $274.50 with an average of $84.67 and a running total of $684.86.

A first transaction risk example 1304 is timestamped Dec. 5, 2013 and was for an unknown grocery store in a known zipcode and for the average amount. The risk score is thus plus, minus, minus for an overall low-risk.

A second transaction risk example 1306 is also timestamped Dec. 5, 2013 and was for a known grocery store in an unknown zipcode and for about the average amount. The risk score is thus minus, plus, minus for an overall low-risk.

A third transaction risk example 1306 is timestamped Dec. 5, 2013, and was for an airline flight in an unknown, far away zipcode and for almost three times the previous maximum amount. The risk score is thus triple plus for an overall high-risk. But before the transaction is flagged as suspicious or fraudulent, other datapoints can be scrutinized.

Each datapoint field can be given a different weight in the computation in an overall risk score.

In a forecasting embodiment of the present invention, each datapoint field can be loaded during an earlier time interval with a positive or negative bias to either sensitize or desensitize the category to transactions affecting particular datapoint fields in later time intervals. The bias can be permanent, temporary, or decaying to none.

For example, if a customer calls in and gives a heads up they are going to be traveling next month in France, then location datapoint fields that detect locations in France in next month's time intervals can be desensitized so that alone does not trigger a higher risk score. (And maybe a "declined" response.)

Some transactions alone herald other similar or related ones will follow in a time cluster, location cluster, and/or in an MCC category like travel, do-it-yourself, moving, and even maternity. Still other transactions that time cluster, location cluster, and/or share a category are likely to reoccur in the future. So a historical record can provide insights and comfort.

Figure 14:
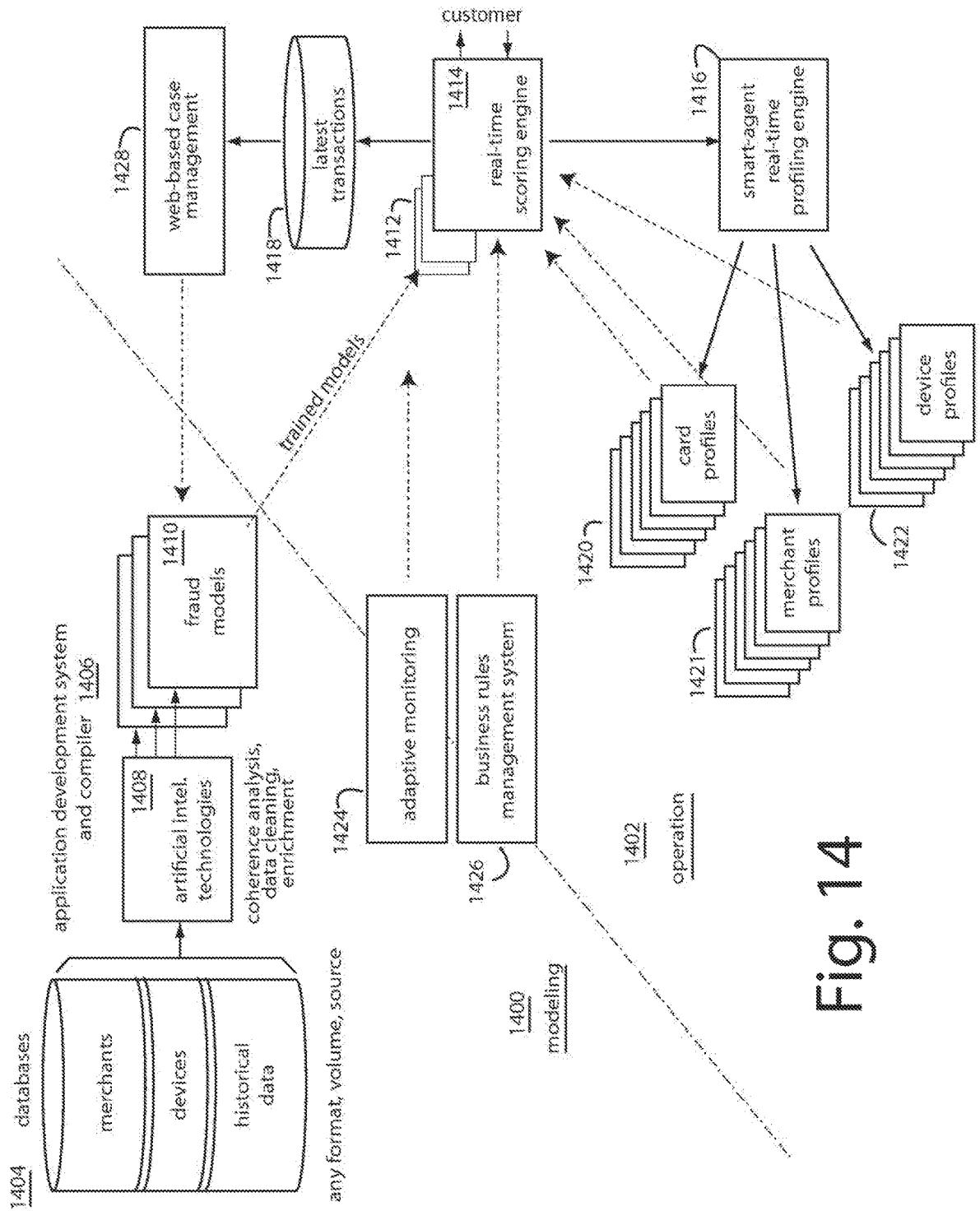
FIG. 14 is a functional block diagram of a modeling and operational environment in which an application development system is used initially to generate, launch, and run millions of smart agents and their profiles.

FIG. 14 represents the development, modeling, and operational aspects of a single-platform risk and compliance embodiment of the present invention that depends on millions of smart agents and their corresponding behavioral profiles. It represents an example of how user device identification (Device ID) and profiling is allied with accountholder profiling and merchant profiling to provide a three-dimensional examination of the behaviors in the penumbra of every transaction and authorization request. The development and modeling aspects are referred to herein by the general reference numeral 1400. The operational aspects are referred to herein by the general reference numeral 1402. In other words, compile-time and run-tine.

The intended customers of embodiments of the present invention are financial institutions who suffer attempts by fraudsters at payment transaction fraud and need fully automated real-time protection. Such customers provide the full database dossiers 1404 that they keep on their authorized merchants, the user devices employed by their accountholders, and historical transaction data. Such data is required to be accommodated in any format, volume, or source by an application development system and compiler (ADSC) 1406. ADSC 1406 assists expert programmers to use a dozen artificial intelligence and classification technologies 1408 they incorporate into a variety of fraud models 1410. This process is more fully described in U.S. patent application Ser. No. 14/514,381, filed Oct. 15, 2014 and titled, ARTIFICIAL INTELLIGENCE FRAUD MANAGEMENT SOLUTION. Such is fully incorporated herein by reference.

One or more trained fraud models 1412 are delivered as a commercial product or service to a single platform risk and compliance server with a real-time scoring engine 1414 for real-time multi-layered risk management. In one perspective, trained models 1412 can be viewed as efficient and compact distillations of databases 1404, e.g., a 100:1 reduction. These distillations are easier to store, deploy, and afford.

During operation, real-time scoring engine 1414 provides device ID and clickstream analytics, real-time smart agent profiling, link analysis and peer comparison for merchant/internal fraud detection, real-time cross-channel fraud prevention, real-time data breach detection and identification device ID and clickstream profiling for network/device protection.

A real-time smart agent profiling engine 1416 receives behavioral digests of the latest transactions 1418 and uses them to update three populations of profiles 1420-1422. Specifically, a population of card profiles 1420, a population of merchant profiles 1421, and a population of device profiles 1422 all originally generated by ADSC 1406 and included in the trained models 1412. These are all randomly and individually consulted in real-time by smart agent profiling engine 1416 to understand what is "normal" for a particular card, merchant, and user device.

Real-time smart agent profiling engine 1416 accepts customer transaction data and scores each line. Such scores are in accordance with business rules provided by a business rules management system (BRMS) 1424 and any adaptive updates 1426 needed to the original set of models 1410 produced by artificial intelligence technologies and classifiers 1408. A web-based case management system 1428 uses false positives and false negatives to tighten up models 1410. These are periodically used to remotely update models 1412.

In general smart agent process embodiments of the present invention generate a population of smart agent profiles by data mining of historical transaction data. A corresponding number of entities responsible for each transaction are sorted and each are paired with a newly minted smart agent profile. Each smart agent profile so generated is modelled to collect and list individual and expanded attributes of said transactions in one column dimension and by time interval series in another row dimension. Each smart agent profile is stored in a file access system of a network server platform.

Each newly arriving transaction record is compared and contrasted attribute-by-attribute with the time interval series of attributes archived in its paired smart agent profile, and each such comparison and contrast incrementally increases or decreases a computed fraud risk score. The computed fraud risk score is thereafter output as a determination of whether the newly arriving transaction record represents a genuine transaction, a suspicious transaction, or a fraudulent transaction. Or maybe just OK-bad, or a fuzzy score between 0 . . . 1.

Each time interval series can be partitioned or divided in its row dimension into a real-time part and a long-term part to separately pre-compute from the real-time part and the long-term part a velocity count and statistics of said individual and expanded attributes. The newly arriving transaction record is then compared item-by-item to relevant items in each said real-time part and long-term part, and thereby determines if each item represents known behavior or unknown behavior.

Each newly arriving transaction record is inspected to see if the entity it represents has not yet been paired to a smart agent profile, and if not then generating and pairing a newly minted smart agent profile for it.

In another embodiment, three populations of smart agent profiles are generated by data mining the historical transaction data. A corresponding number of cardholder, merchant, and identified device entities involved in each transaction are sorted and each are paired with a newly minted smart agent profile. Then, each newly arriving transaction record is compared and contrasted attribute-by-attribute with the time interval series of attributes archived in the smart agent profiles paired with the particular cardholder, and with the particular merchant, and with the particular identified device (Device ID), and each such comparison and contrast incrementally increases or decreases a computed overall fraud risk score. See our U.S. patent application Ser. No. 14/517,863, filed 19 Oct. 2014, and titled User Device Profiling In Transaction Authentications, for details on the Device ID technology we have in mind here.

In general, commercial messaging embodiments of the present invention are implemented as a software-as-a-service (SaaS) applications on network servers. The clickstream behaviors of online consumers are collected in real-time while the consumers are online shopping or surfing. The clickstream behaviors are copied to the SaaS from the visited websites that subscribe to such service.

Figure 15:
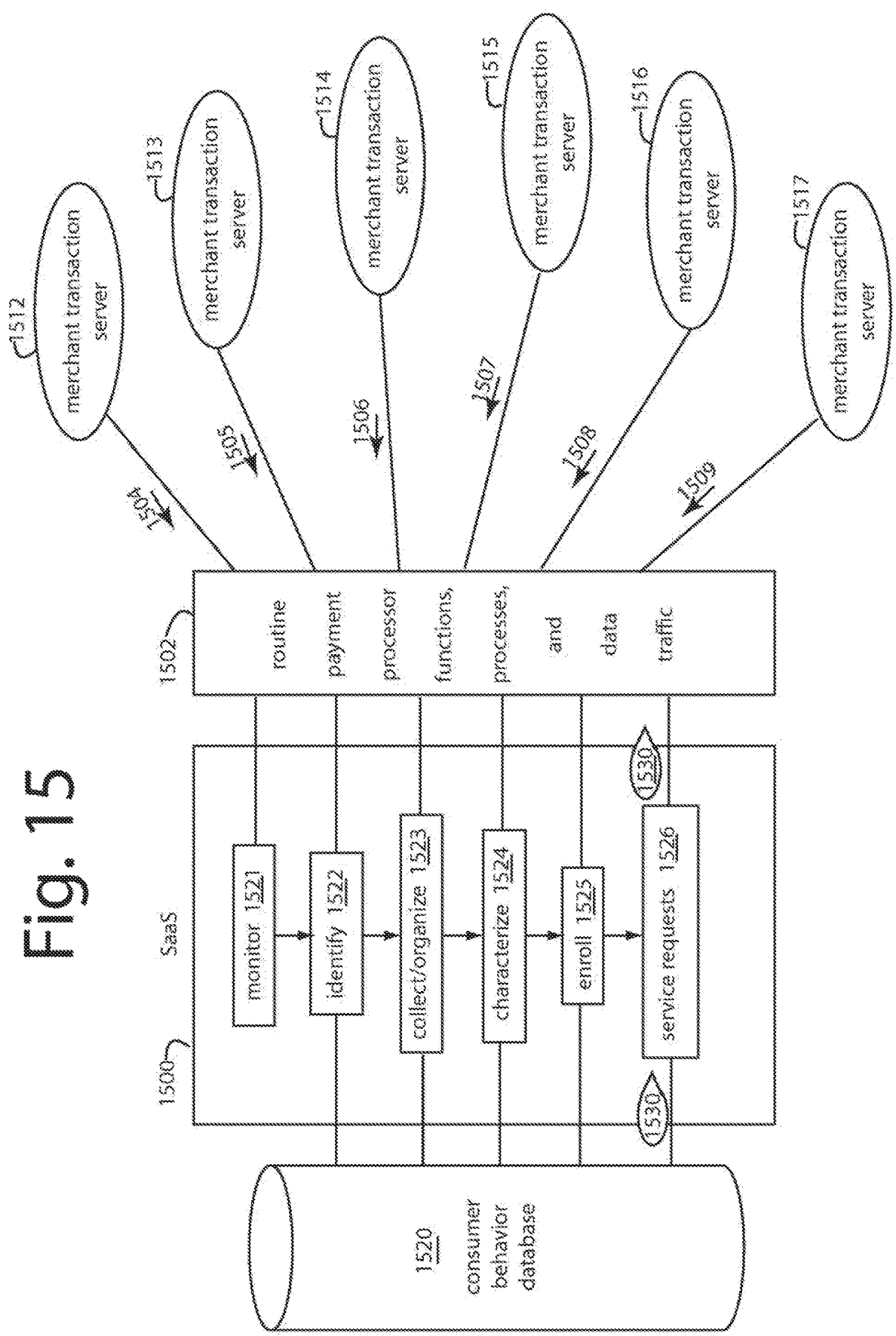
FIG. 15 is functional block diagram of a computer program product for centralized hosting of business applications as a software-as-a-service (SaaS) product installed on a payments processor.

Referring now to FIG. 15, a software-as-a-service (SaaS) 1500 is built to run as an application on a network server 1502. Clickstream behavior data 1504-1509 corresponds to numerous online consumers. The data are collected in real-time while the consumers are online shopping or surfing at a variety of independent and unrelated commercial websites. Each of these commercial websites has its own merchant transaction server 1512-1517 that is extended to accumulate and forward clickstream such behavior data. The clickstream behaviors 1504-1509 are copied to the SaaS 1500 from the visited websites that subscribe to such service.

The context for ads can be used to identify specific audiences. For example, an ad for a hotel can be offered for display if the user context is travel. However, an ad for wine is not appropriate on a website for recovering alcoholics, even though the ad and the content of the website are related to the context, albeit in a negative way. The context and the positive direction of the context is to be understood to make for an effective SaaS service.

A thesaurus-based contextual analysis can be used to filter the content. E.g., extracting the main idea of the content by determining the contexts in which words in the content are used. A thesaurus is built into word-context database and stored in database 1520.

Contextual analysis is used in embodiments of the present invention to evaluate the appropriateness of a particular site, so the main idea of the site's content can be extracted. The information extraction is a text process that locates a specific set of relevant items in the web page document.

Contextual analysis and concept extraction can automate a categorization and cross-referencing of information by using the thesaurus. By using contextual analysis, smart analytics processors can artificially "understand" the main idea of most documents and websites. Smart analytics assigns the highest importance to semantics and each word's context or main idea.

Smart analytical software is best installed on a central server to monitor the activities of a large population of users. The thesaurus database is loaded with an extensive list of words and an comprehensive list of contexts in which such words are typically used. The thesaurus database helps create a list of contexts for the relevant words visited in a document. When the document is an electronic webpage, included software follows any links displayed in the web page to further detail the contexts.

The smart analytical software assigns a "context pertinence value" to each context found in the document. The context pertinence value of a given context determines how many restricted words associated with that context are found in the document. The smart analytical software determines the most important contexts conveyed in the electronic document. Each word is assigned a weight that depends on how the word is displayed in the document. Each context is assigned a weight that depends on the number of words in the document that have the same context, the weight of those words, and the number of contexts for each one of those words. The contexts assigned the highest weight are determined to be the most important contexts. If the most important contexts are among the restricted contexts specified in the contexts database, the user is offered ads specific to that context.

As seen in FIG. 15, SaaS 1500 comprises software instruction sets 1521-1526 for enabling payments processor network server 1502 to additionally provide consumer preferences and forecasts, or even audience-appropriate commercial messages 1530 to what can be thousands of merchant transaction processors 1512-1517. For example, using the contextual analysis detailed herein.

Software instruction set 1521 monitors consumer purchase transaction and payment data independently communicated with individual merchant transaction servers and a payments processor server. Excerpts and abstracts of these are stored in a database 1520.

Software instruction set 1522 identifies individual consumers from many instances of consumer purchase transaction and payment data coming over time over many unrelated connections to independent merchant transaction servers. The identifications are stored in database 1520.

Software instruction set 1523 collects and organizes consumer purchase information derived from the transaction and payment data according to the consumer identities recognized. The organized collections are stored as dossiers in database 1520.

Software instruction set 1524 characterizes what is important to each identified consumer and forecasts what they are likely to buy from intimations obtainable from records of what they did buy, when they bought it, what was bought in combination, where it was bought, what the total purchases were, and any strong correlations to other available data. These conclusions, consumer preferences and forecasts 1510 are kept at-the-ready in database 1520.

Software instruction set 1525 enrolls individual ones of many merchant transaction servers connected to the payments processor server to access conclusions calculated as to what is important to each identified consumer and forecasts of what they are likely to buy. Those enrolled are maintained in database 1520.

Software instruction set 1526 enables payments processor server 1528 to service real-time requests by enrolled ones of the merchant transaction servers for the conclusions that have been calculated. In response, database 1520 supplies individual consumer preferences and forecasts 1510. The enrolled ones of the merchant transaction servers 1512-1517 are enabled by the conclusions to offer messages and incentives of interest to a correspondingly identified consumer at the time of their concluding another transaction with a merchant.

Device identifications that use behavioral data to advance over simple device ID techniques will outperform and provide better results and lowered losses due to fraud. Behaviorally enhanced device ID is therefore a critical part of all embodiments of the present invention. It recognizes individual users will use their tools in repeatable, recognizable ways no matter what devices they are using at the moment.

It is important for merchant companies to constantly evolve their systems to stay in tune with developing standards, rapid technological changes, and keep up with ever more sophisticated and capable fraudsters trying to break in and abuse their systems.

Very few single dimension device ID technologies are effective in being able to uniquely recognize devices when the legitimate devices themselves are changing daily. Multi-layer, multi-dimensional fraud device identification is required now in a world where ever-more clever thieves and surprising new malware behaviors pop up daily.

In general, multi-layer behavioral device identifications can be had by combining multi-agent technology with case-based reasoning, real-time profiling, and long-term profiling. Multi-layer behavioral device identifications can guarantee correct device identifications even when many changes and updates have occurred on the devices. Better device identifications mean e-commerce can be safer and more secure for everyone.

Smart-agents are used in the embodiments of the present invention to create a virtual agent for each user device. Each such virtual agent is configured to observe and learn the behavior of its host user device over time to create a device profile. The ways the user device is used, the frequency of its use, the types of actions taken, e.g., during the last minute, ten minutes, over days/weeks/years are all intelligently aggregated into a profile of what's normal for this user.

Figure 16:
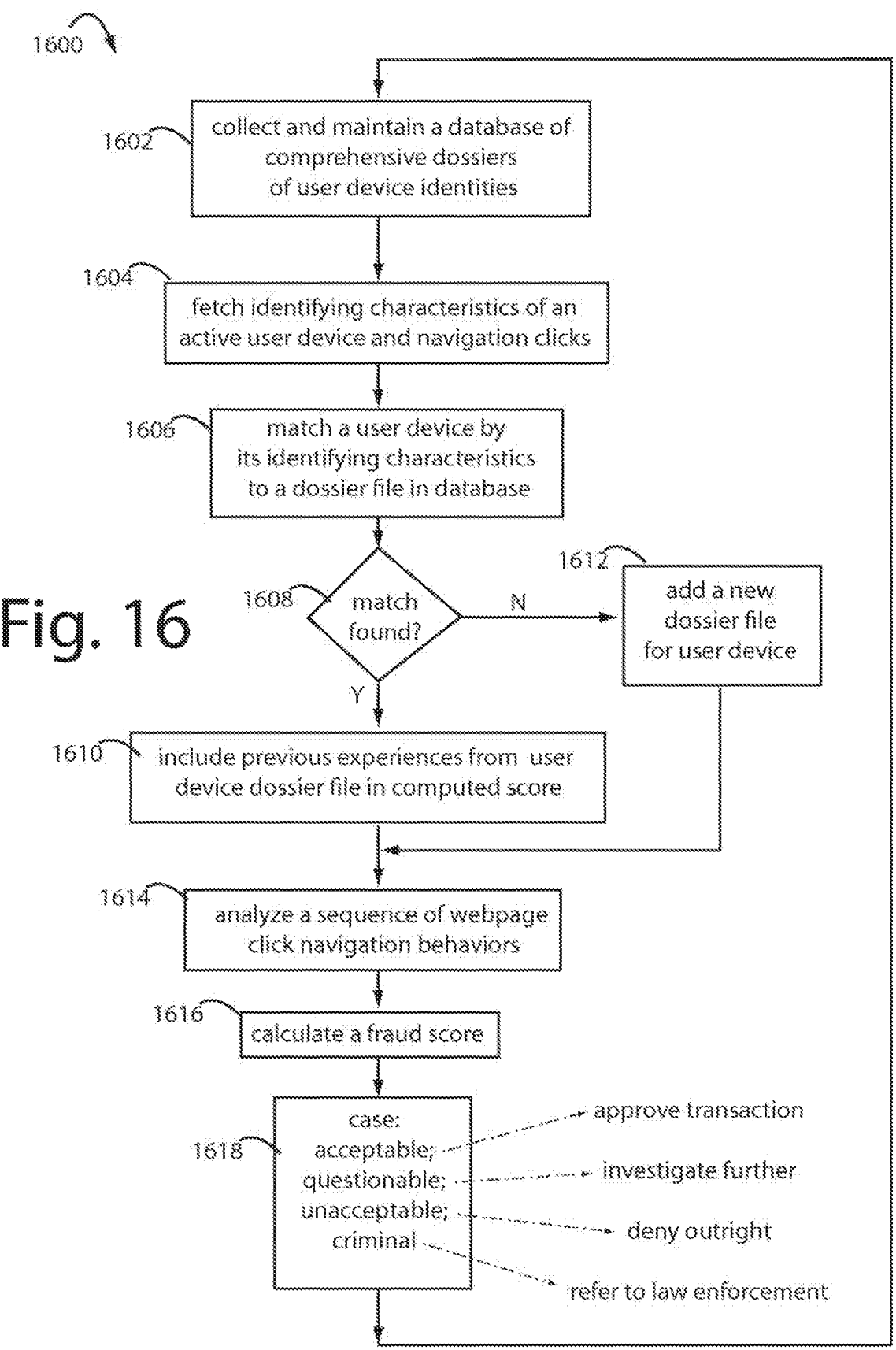
FIG. 16 is a flowchart diagram of a top level computer process useful in the SaaS product of FIG. 15.

FIG. 16 represents a network server method 1600 for protecting websites from fraudsters. Method 1600 includes a step 1602 for accumulating and maintaining a database of comprehensive dossiers of user device identities. These identifying characteristics are fetched in a step 1604 from activity reports about user-device visits to webpages as they are volunteered by the reporting websites. The assemblage and organization of user device identifying characteristics can be carried on over a period of time that can span months or even years. A step 1606 tries to match each newly presenting user device currently visiting a website by its identifying characteristics to a particular user device identity dossier already in the database 120.

If a match is found in a step 1608, any previous experiences with the particular user device by this or other included websites is included in a first part calculation of a fraud score. Such first part of the score is computed in a step 1610. Otherwise, a step 1612 builds and adds a new file to be inserted the database 120 for future use.

A step 1614 analyzes a sequence of webpage click navigation behaviors of each corresponding user device then being employed to visit a particular webpage and website. A real person with a real purpose will navigate around and between webpages in a particular way. Fraudsters and automated crawlers behave very differently. A step 1616 calculates a final or only part of the fraud score in real-time. A step 1618 is configured as an output which useful to assist each website in determining whether to allow a proposed transaction to be concluded by a particular user device. For example, a good score predetermined to be acceptable would trigger an approval of a user transaction. A marginal score could be used to signal a call should be made, or investigated further. A poor score would issue an outright denial. A red-flag score could be used to alert law enforcement.

Whenever a particular user device cannot be matched to any particular dossier file in the database, a new dossier file is opened up for such user device according to the user device identification parameters then obtained. The determination of a fraud score is necessarily limited to what can be surmised by analyzing the sequences of webpage click navigation behaviors that occurred. This limitation is reflected in the fraud score.

An endpoint client can be embedded in a webpage presented on a website and configured to provoke a browser in a user device to report back user device information, capabilities, extensions, add-ons, configurations, user device locations, and other data which are useful to sort through and contribute to corresponding user device dossier files maintained in the database 120. For example, FLASH PLAYER video, ACTIVEX, and JAVASCRIPT objects embedded in webpages all naturally provoke a lot of useful identifying and characterizing information to be reported back from plug-ins and extensions already present each user device.

For example, JavaScript can be used to check various non-universal physical attributes of a particular user device, including its operating system, CPU architecture, video card, screen size, and other items that fluctuate widely in the real-world population. The data that can usually be obtained by JavaScript includes, user agent, Screen resolution, user language, time zone offset, graphics processing unit (GPU) information, list of specific fonts availability, list of plugins, list of MimeTypes, availability of cookies, availability of HTML5 properties and methods, attributes specific to the browser, etc.

If an innocuously small Flash video is included in the webpages, its normal protocols can be appropriated to provide extra information made available to the Flash player, e.g., information describing audio/video codecs, printers, touchscreens, and other peripherals. The physical location of a user device can be discerned from its IP address using a geo-location database to get the city, latitude, and longitude. Overall, two hundred fields can be gathered together and used to identify a single user device with high degree confidence.

A mobile endpoint client is similar to the endpoint clients used for personal computers. It may not always be possible to gather identifying user device information with a browser. So mobile endpoint clients are constructed from small libraries of Java (for Android) or Objective C (for iOS) and included in a downloadable app. Once installed, the app is empowered to request a device ID from the mobile client. It is configured to gather user device information in the background and send it to server 128 for recognition and identification.

An unnoticeable web browser is launched in the background to gather data from various browser-specific fields. Running now as an application, all the system calls become available. These system calls can be used to retrieve the peculiar mobile user device's physical properties, e.g., the iOS/Android version, the size and resolution of the screen, the capabilities of the touchscreen, etc. The user's settings can also be accessed, as well as a list of all the apps then installed on this particular user device. All this information is useful in database 120 to characterize and distinguish the particular user device 120-122 from a million others.

Using IP addresses for geo-location is not entirely satisfactory, these can vary as a user moves around from one cell tower to the next or between WiFi routers. It's better to use the built-in GPS app if available. Most smartphones now include these in their standard kit.

A centralizing of the collecting and maintaining of a database of comprehensive dossiers of user device ID's allows for a much larger population to be obtained from countless user-device visits to numerous webpages maintained by many unrelated websites. The otherwise independent and unrelated websites each forward user device activity reports in real-time as they occur to a single centralized server 1528 that solely controls and maintains database 1520. Fraud scores are reported back to the corresponding websites, e.g., over the Internet. Such service can be by paid subscription. Embodiments of the present invention would be useful in commercial payment systems, peer-to-peer money transactions, physical access controls to buildings and other facilities, communication-command-control applications, and in sensitive document control.

In general, embodiments of the present invention protect websites from fraudsters by analyzing webpage click navigation behaviors each of device visiting their webpages, and by collecting and maintaining comprehensive dossiers of device ID's, and by producing a fraud score in real-time to assist the website in deciding whether to allow a proposed transaction to be concluded.

Figure 17:
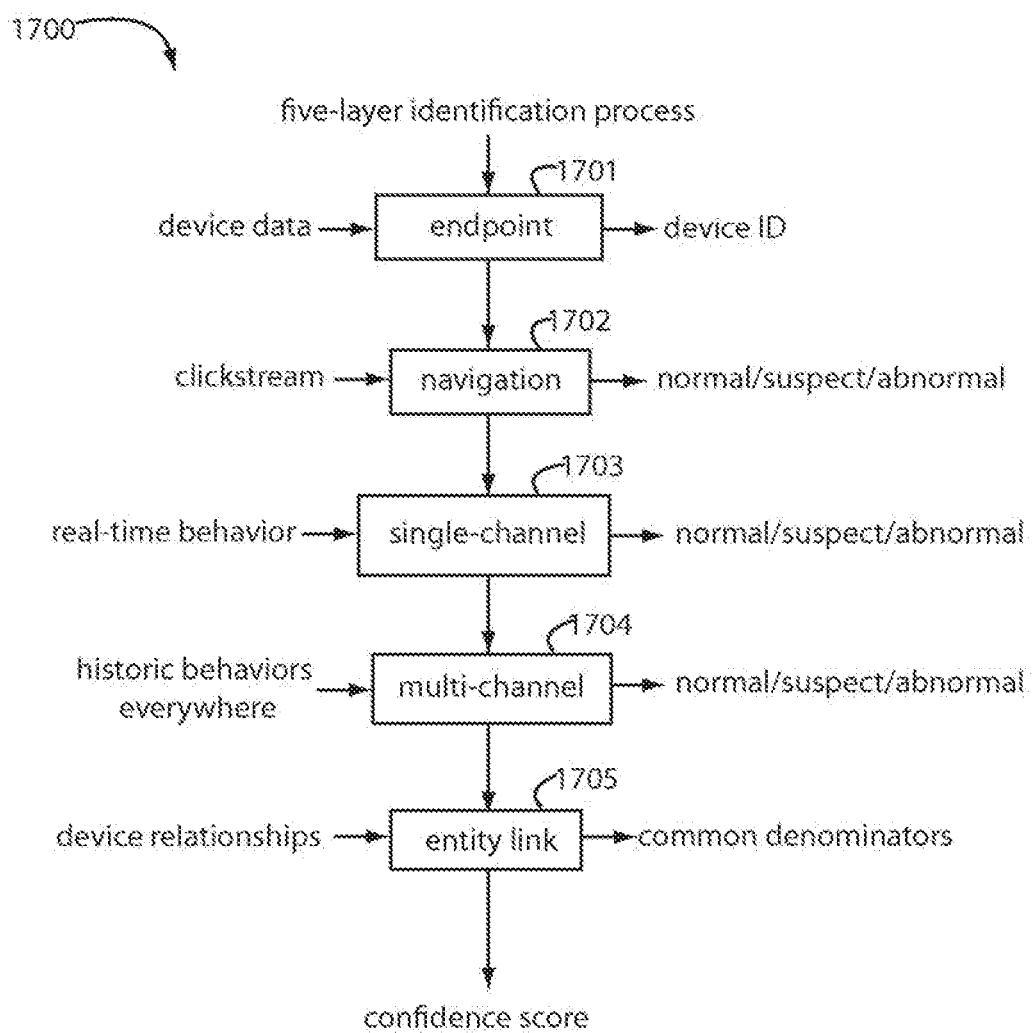
FIG. 17 is a flowchart diagram of how user devices can be accurately categorized by a five-layer identification process that includes endpoint, navigation, single-channel, multi-channel, and entity link analyses.

FIG. 17 represents how user devices can be accurately classified and categorized by a five-layer identification process 1700 that includes endpoint 1701, navigation 1702, single-channel 1703, multi-channel 1704, and entity link 1705 analyses. The first classification layer 1701 is endpoint-centric, it identifies users by their behaviors and by the attribute signatures of their particular devices. Such attribute signatures can be extracted by their browsers and the information obtained used in the identification.

An endpoint client is embedded in a web page provided by a website server so it can be carried back to the user device by its browser and run in background to gather data. When the data collection is completed, the endpoint client automatically delivers the collected data up to the website server for immediate use in identifying this user device.

Smart-agent technology, data-mining, a decision tree, and case-based reasoning are all used to find candidate matches in a large, server-side database. Such will either find a matching device or the collected data will be used to create a new device dossier. If the user device was recognized, the data fields in its dossier are updated as needed.

Mobile devices have a variety of ID's built-in, some incidentally and others unintended. For example, the Android ID is randomly generated and will persist across phone resets. The SIM cards used universally by mobile providers in their phones provide unique identifiers, but these cards can be freely removed and plugged into another phone by any user. There are other inherent ID's that are less reliable for our purposes, but these nevertheless can be helpful to build confidence.

The navigation-centric layer is the second layer mentioned. It is used to track session activities and do a clickstream analysis in real-time. The user's clickstream behaviors are compared to previously observed patterns of normal, suspect, abnormal, and malware attack activities for this particular user and the population in general. Smart-Agents are used in these categorizations.

Clickstreams are the navigation pathways users follow through web pages and can be tracked by the webpage servers. The order of the pages a user views can be and which pages they visit can be quite telling and uncover their true motivations in the visit. An important conclusion can be made as to whether this is a real customer legitimately engaged in shopping or a fraudster bouncing around looking for a point of entry. Once the current user has been identified, a record of their navigation clicks is constructed and used in a behavior study to build a confidence score.

One way to follow a user's path through a web site is to look first at the Referrer header for each page, e.g., to see where they came from. It can be informative to know if they arrived here from a search engine, from a competitor, from another one of the server's pages, or if they just typed the URL straight into their browser.

A "site depth" is assigned to each web page to represent how far or how many clicks away it is from the home page. These statistics can be used to see if the visitor is convincingly browsing around and up/down a product tree like a real user would.

Velocity counters track how fast a visitor is moving around in several dimensions, such as their reputed location, times of day, clickstreams, items added to carts, number and length of browsing sessions, click rates and quantities, category changes, reviews read, etc. For example, if a review is read for a product before buying it. Another important visitor attribute to recognize is the number of category changes they make as they navigate. Typical users usually have a single product goal in mind, they don't bounce randomly between categories nor shop for two or more items simultaneously.

Suspicious browsing patterns are often generated by automated site-crawling scripts. Long-term profiling counters are useful to track the number of different products users have viewed or purchased in each category. The average prices and numbers of items per order are also useful points to remember. Big ticket buyers don't randomly drop from the sky unannounced. Tracking what cities and countries a user logs in from, and what local times of day they have been active can be used to distinguish legitimate users. A lot of fraud is generated from Eastern Europe, Asia, and Africa, and so those sources deserve extra scrutiny and wariness.

Any new behavior raises a red-flag and can be used to match the historical actions on file. If a legitimate user were to leave their account logged in and a stranger sat down, or if an account is stolen with fraud or malware, the new behavior outside historical actions would be an early warning of fraud.

The third layer, is account-centric for a specific channel, such as online sales. It monitors transactions, creates profiles associated with each user device and analyzes real-time behavior. A combination of technologies are employed, e.g., smart-agent, real-time profiling, geo-profiling, recursive profiling, long-term profiling, neural networks, data mining, data quality engine, fuzzy logic, business rules, and case-based reasoning.

The fourth layer is device-centric, with behavioral perspectives taken across multiple channels of user device contact with independent merchant servers. The device-centric layer correlates alerts and activities for each device/user obtained from more than one channel.

Layer five includes entity link analysis, it searches for relationships among the devices they encounter and the channels they employ. The entity link analysis layer inspects users and machines in an effort designed to detect organized criminal activities and misuse. For example, all devices of a device or type should be or could expected to be similarly affected by WINDOWS, ANDROID, or iOS system updates, patches, and new versions that occur in public and more or less around the same time. These broad transformations in the population can be used in the scoring of changes as normal/abnormal when identifying a particular user device.

Each of the five layers 1701-1705 can by implemented with Smart-Agents that interact and negotiate with each other in order to reach their individual and collective goals. Algorithmic systems are very different and produce less reliable results in fraud risk assessments. Smart-Agents determine how to find a solution by providing each agent with goal information, e.g., situations that are desirable or undesirable.

Smart-Agents solve problems without needing extensive programming or sets of specific rules to be predefined that make for inflexibilities common to neural networks and genetic programming. Smart-Agents are able to effectuate runtime changes and adapt as needed.

Algorithmic programs follow successive operations applied in a fixed order. Algorithms enable computers to repeat long suites of logical operations tirelessly and accurately, which is great if the algorithm is fundamentally correct. Algorithmic programs are not equipped to take any initiative, and cannot stray even a little bit from each fixed line of code. It falls on the programmer to dictate, and spell out a precise succession of acts that the machine should follow. Often, there are just too many variables to code and too many decisions that can each be wrong. Business problems requiring even a minimum amount of reasoning are impossible to transcribe into algorithmic forms. Business decisions often require complex integration efforts involving large numbers of dynamic variables. And, having an algorithm available doesn't guarantee its practicality. Modest complexities can make it unwieldy.

Neural networks are not much better, they need to be trained, and many samples are needed in order to have a satisfactory result. Object-oriented languages require one to foresee, know, and program all the possible methods.

Smart-Agents can get past algorithmic limitations, and it is possible to design applications for them even when a suitable algorithm is unknown. Smart-Agents can adapt as the data they process changes. Each Smart-Agent is instructed to recognize information that favors the goals and is therefore "good", and information that disfavors the goals and is therefore "bad". Such instructions enable each Smart-Agent to automatically and autonomously make the "right" decision. This right-decision is referred to as the "THEN STATEMENT", as in a classic IF-THEN programming statement. An optimum THEN STATEMENT is relatively easy for a programmer to coin and get right.

The intelligence in the program springs from what the programmer embeds in each THEN STATEMENT. Smart-Agents can exist in a community of agents collected together to share a particular expertise, mimicking human society as they do. Smart-Agents can simulate human reasoning. Each Smart-Agent is able to operate independently according to its assigned functions, goals, representations of their environments, their runtime observations, acquired knowledge and interactions with other Smart-Agents. Systems of Smart-Agents marshal together many autonomous agents to interact and negotiate with one another.

An application's overall solution builds from the interactions as each Smart-Agent moves toward their respective goals.

Collections of Smart-Agents will appear to interact and negotiate to resolve complex and unpredictable problems, without any procedural programming or definition of rules. Each Smart-Agent is independent of the others, since each one of them only affects the others by the fact that they are in favor or disfavor of a specific goal. Smart-Agents are reusable in other applications.

Goal-satisfaction mechanisms direct Smart-Agents to accept or reject one incoming message over another. Every message is evaluated in terms of its being in favor of, in disfavor with, or neutral to reaching of a goal. For example, a private goal, a sending agent's goal, an organization's goal, or a system's goal. The Smart-Agents depend on each goal's opinion with respect to the current situation, the goal justifies the means. Smart-Agents can refuse messages, because they can charge messages as being favorable, unfavorable or neutral.

A bottom-line in fraud prevention systems is to decide how a particular transaction should be categorized. Every transaction is accepted by either a bad (fraud) agent or a good (normal) agent.

Other technologies can be usefully combined with Smart-Agents to produce even better results. Neural networks are a kind of algorithmic system that can interpret historical data and help identify trends and patterns against which to compare subject cases. Neural networks have the remarkable ability to solve problems related to detecting trends and patterns that humans or other computer techniques are unable to solve.

An Artificial Neural Network (ANN) models the ways in which biological nervous systems process information. The brain, e.g., consists of billions of processors, which process a large number of tasks concurrently. Neurons work collaboratively to solve the defined problem. Neural networks can resemble human reasoning, making them well suited to solve pattern recognition and forecasting problems.

ANN's have two primary parts, neurons, represented by neural units; and, synapses, connections between the neurons, which send signals from neuron to neuron. Those synapses can be excited (positive weight), or inhibited (negative weight). Most known neural networks have input layers for the agent to receive data from the environment, and output layers for the agent's potential actions. Others (like Back Propagation) have one or more intermediate layers between these two layers. These layers are massively interconnected, as the units on one layer are connected to those in the next layer. Just like the factors that shape a human, the factors that shape a neural network are its environment and its genetic makeup. Both its initial state and its training play a role in the ANN's development. It is through the critical training process that ANN's are taught how to arrive at the correct answer. A well-trained neural network will be more successful than a poorly trained neural network. The training refers to its environment and the experiences and samples that help shape it. The more samples and experience a neural network receives has a direct correlation with its likelihood of its success.

Case-based reasoning (CBR) can use past experiences or cases to solve new problems. Each "case" is translated into a list of steps to lead to a desirable outcome. The cases are stored and organized in a database, and used as an index for similar situations later. Solutions to complex problems can be found very quickly and accurately this way.

Being able to retrieve and manipulate past problem-solving examples accurately is important. Case-based systems search their case memories for an existing cases that match the input "specifications". As new cases are solved, the solutions are added to the case memory. Such will continue to grow the database of cases solved and increase the likelihood of success.

The goal is to find a case that matches the input problem and that proceeds directly to a solution. Thus making it possible to provide solutions to potentially complex problems quickly. If, on the other hand, an exact match cannot be found, the case-based system look for a similar one to the input situation, and then offer it as a potential solution.

How the system learns is when a nonperfect match is found that nevertheless solves the problem, the case is added to the systems case memory for future use. Each case is a recipe of steps that will lead to a particular outcome. A case is a connected set of subcases that form the problem-solving task's structure.

One of the key differences between rule-based and case-based knowledge engineering is that automatic case-indexing techniques drastically reduce the need to extract and structure specific rule-like knowledge from an expert. CBR systems retrieve relevant cases quickly and accurately from its memory. When a case should be selected for retrieval in similar future situations is the goal of case-indexing processes. As cases accumulate, case generalizations can be used to define prototypical cases that can be stored with the specific cases, improving the accuracy of the system in the long run.

The inductive-indexing capabilities in CBR systems provide several major advantages over neural networks and pattern-recognition techniques. Inductive systems can represent and learn from a wider range of feature types than either neural networks or pattern recognition. The ability to use richer feature sets for describing examples makes them at least as accurate and many time more precise. Case-Based Reasoning solves complex problems like planning, scheduling, and design by finding a similar, successful past plan, schedule, or design, and modifying it to meet the current problem's needs.

Another technology that can be added in a combinational approach is Fuzzy Logic. Fuzzy logic is able to account for areas that are not clearly defined. The logic can be extended to handle partial truths in situations where the answer lies somewhere in between what is true and what is false. Many of the big problems in organizations cannot be solved by simple yes/no or black/white programming answers. Sometimes answers come in shades of gray, where fuzzy logic proves useful. Fuzzy logic handles imprecision or uncertainty by attaching various measures of credibility to propositions. Fuzzy technology enables clear definition of problems where imperfect or partial knowledge exists, such as when the goal is "about 12 years old" or between "all" and "nothing". Traditional and classical logic typically categorize information into binary patterns such as: black/white, yes/no, true/false, or day/night.

The power of fuzzy logic is exponential when it is combined with other technologies like genetic algorithms, neural networks, and business rules. Many of the big problems in organizations cannot be solved by simple yes/no or black/white programming answers. Sometimes answers come in shades of gray, this is where fuzzy logic proves useful. Fuzzy logic handles imprecision or uncertainty by attaching various measures of credibility to propositions.

Genetic algorithms are able to address complicated problems with many variables and a large number of possible outcomes, by simulating the evolutionary process of "survival of the fittest" to reach a defined goal. They operate by generating many random answers to a problem, eliminating the worst and cross-pollinating the better answers. Repeating this elimination and regeneration process gradually improves the quality of the answers to an optimal or near-optimal condition. In computing terms, a genetic algorithm is a population of individuals represented by chromosomes, a set of character strings.

Genetic algorithms include three stages: building and maintaining a population of solutions to a problem, choosing the better solutions for recombination with each other, and using their offspring to replace poorer solutions. Each stage produces a new generation of possible solutions for a given problem.

In the first stage, an initial population of potential solutions is created as a starting point for the search process, each element of the population is encoded into a string (the chromosome), to be manipulated by the genetic operators. In the next stage, the performance (or fitness) of each individual of the population is evaluated with respect to the constraints imposed by the problem. Each individual of a population represents a possible solution to a given problem. Each individual is assigned a "fitness score" according to how good a solution to the problem it is. A potential solution to a problem may be represented as a set of parameters.

Business Rules, or Expert Systems are the most widely used commercial applications developed using artificial intelligence (AI). Many use expert systems to solve business problems. Expert systems model information at a higher level of abstraction. When these systems are implemented well they closely resemble human logic and become more reliable and easier to maintain. The goal is for the expert system to apply heuristic knowledge to give advice or make recommendations just like a human expert. Rules are used to represent a rule-of-thumb to specify a group of actions performed for a given situation. Rules are composed of if-then statements that comprise the necessary solution. An inference engine automatically matches facts against patterns and automatically determines which rules are applicable. This process of selecting rules against historical patterns will continue to repeat itself until no applicable rules remain. It is critical that the knowledge source is reliable, because the system is only as good the knowledge assimilated into the rules. One of the most difficult tasks in developing an expert system is extracting the knowledge from an expert so the rules can be written. The most widely known algorithms for compiling rules are RETE and TREAT.

Data mining, or knowledge discovery, in databases is the nontrivial extraction of implicit, previously unknown and potentially useful information from data. It is the search for relationships and global patterns that exist in large databases but are hidden among the vast amount of data. Using particular classifications, association rules and analyzing sequences; data is extracted, analyzed and presented graphically. Data mining, or knowledge discovery in databases is the nontrivial extraction of implicit, previously unknown and potentially useful information from data. It is the search for relationships and global patterns that exist in large databases but are hidden among the vast amount of data. Using particular classifications, association rules and analyzing sequences, data is extracted, analyzed and presented graphically.

Data mining algorithms always requires a number of different technical approaches to address data cleaning, sampling, clustering, learning classification rules, analyzing changes and detecting anomalies.

Descriptive Statistics is the process of obtaining meaningful information from sets of numbers that are often too large to deal with directly. While it is often impossible to calculate scores for all models when searching a large model space, it is often feasible to describe and calculate scores for a few equivalent classes of models receiving the highest scores. Prediction methods for this sort of problem always assume some regularity in the probability distribution.

Real-time profiling keeps track of activities over windows time spanning seconds, minutes, hours, days, months or even years. These profiles can highlight suspicious changes in device activities, by looking at the number of transactions from a device over a window of time, histories of payment methods, typical purchasing from the device, patterns and clickstreams of the device at the merchant's site, e-mail address activity from the device, ship-to and bill-to activity, etc.

Modern inventory control and retail checkout systems are capable of producing a lot of statistics about purchase behaviors of single individuals on a single visit and group behaviors over an hour, day, week, month, etc. These statistics can provide important insights into what consumers buy, what they buy in combination, and any correlations to time of day, day of week, month or year. They can also provide statistics on how a particular transaction fits within a larger group of transactions.

The place of purchase will be inherent in the statistics that can be collected. People tend not to venture very far from home or world and a retail merchant offering incentives would do well to offer their incentives in the neighborhoods where the targeted consumers are active. The widespread use of credit cards, payment cards, loyalty cards, and personal mobile devices allows a payments processor to tie seemingly unrelated purchase transactions together by the behavior of the consumer and even the device ID information obtainable from their browsings and log ons.

For example, payments transaction records can show where a particular consumer has been shopping and when they most frequently shop, and what they shop for, e.g., groceries, gasoline, clothes, cars, etc. Patterns will often emerge that can be analyzed to forecast when and where the next shopping trip will be and what for. An enrolled merchant can benefit from the SaaS product services described herein by being able to send the consumer a coupon or message that the consumer would find of interest and timely.

Smart analytics embodiments of the present invention analyze consumer transaction data to help merchants deliver productive messages to their customers and prospects according to their particular, life stages, interests, geography, spending patterns, seasonal, culture, and other differentiating characteristics that can influence what they buy.

FIG. 15 illustrates a payment processor 1502 and Internet web portal connected to service routine transactions coming from thousands of merchants and millions of shoppers. A software-as-a-service (SaaS) 1500 is used to augment and enhance the consumer transaction services, it is used to sign up merchants. SaaS 1500 controls what features these merchants will have access to. For example, the merchants access the portal to collect insights into their customers' motivations and identify potential new customers from database 1520. A principal goal is to help merchant computers artificially "understand" their customers as non-homogenous individuals. This enables the merchants to make smarter decision about customer needs and future behaviors to proactively formulate attractive and personalized commercial offers.

SaaS 1500 helps merchants identify where their best customers will spend their money, and then assist in directing their efforts accordingly.

Given the perspective SaaS 1500 would have in servicing thousands of independent merchants, it could effectively provide useful peer view analyses. E.g., to provide marketing awareness and assistance for comparable merchants within a local geographic area.

As each consumer user shops in real-time and adds to their shopping carts it becomes possible to execute a Market Basket Analysis to spot further revenue optimization opportunities. For example, Up-sell and cross-sell offers by creating a group of items often bought together, e.g., bagels, cream cheese, cumber, onion, smoked salmon, and capers. Or things bought sequentially over days or weeks, e.g., engagement ring, wedding ring, wedding arrangements, honeymoon vacation spots. Loyalty programs can be based on advanced association methods. Such as to reward new and loyal customer with offers that they want and will redeem at the point-of-sale in real-time.

The spending habits of customers can be followed in each individual store, across a chain, and the user specific advertisement data can then be customized and adjusted based on user profiles and/or the current clickstreams.

Horizontal/Vertical Browsing

Real-time coupon redemption can be offered at the point of interaction. Offers can be limited to those with a short distance to the point-of-service. Clickstream analysis for Card Not Present transaction can help to understand how online shoppers navigate through a web site. The information can be used to customize and adjust user-specific advertisement data. Recommendation can be made by SaaS 100 on how to best optimize the merchant websites' workflows.

SaaS 1500 can help with Inventory Management/Supply Chain disruptions. E.g., to eliminate the expense of stockouts and overstocks. Weather, season, weekend, before and after taxes, events, etc., can all play a role that are predictable by analyzing user behaviors. SaaS 100 is useful in Store Operation and Store Organizations to monitor: Product, Placement, Pricing and Promotion and to understand how they impact volume growth or decline within a brand or category. Seasonal Product Placement requires putting the right product in the right place at the right price at the right time.

Conventional marketing strategies can therefore be applied in very practical ways with very affordable computer tools and systems. For example using, demographic baskets (clustering, family), competitor stores, comparative store sales, front store sales, inventory turnover, labor cost analysis register usage analysis, cross-selling, location-based marketing, in-store behavior analysis, customer micro-segmentation, leverage, if available, data in social media to drive effective promotions, collaborative filtering to generate "you might also want" prompts for each product bought or visited, behavioral device identification for security, and offers based on behavioral device activities and shopping patterns of a specific device.

Individual words collected in the clickstreams flowing back to SaaS 1500 can often be highly ambiguous, and specific meanings for them need to calculated. This can be done by a computer by analyzing the contexts in which the words exist. Context vectors and weights are assigned by the computer to artificially resolve word ambiguities. The points of interest for the consumer are revealed, and are used as a template to screen through appropriate commercial messages given the individual consumers' apparent shopping interests.

A diverse kit of commercial messages are sold to and subscribed by a wide variety of commercial producers of products and services. These commercial producers will pay a premium for SaaS services that can effectively deliver a relevant audience. Such is therefore a principal object of the present invention, to profit by selling such a service.

What a user is looking for can be artificially understood by a computing machine using context information. The context a user is working from or into can be engaged to tune or filter the offers an artificial intelligence machine makes to end users. The context can be gleaned from the way the users are navigating webpages. Clues are hinted their search keywords as to their particular culture, geography, age, preferences, and sensibilities. Understanding the context of the users' search keywords and items the users click on can work like constraints to display increasingly more appropriate content.

It seems as though all words are ambiguous in that they have many different meanings and even products can have many different uses and purposes. A computing machine cannot naturally resolve such ambiguities, but humans do it instantly and effortlessly. Consider the words, "apple", "attack" and movie, and the corresponding contexts each can employ.

| WORD | CONTEXTS POSSIBLE |
|---|---|
| apple | computer, hardware, software, laptop, servers, PowerBook, iMac, iBook, ClarisWorks, AppleWorks, PowerMac, Steve Jobs, acquisitions, alliances, New York Times, TheStreet.com, Adam's apple, Fruit, New York, Computer, Red, Green, Delicious, Apple Custard, Apple Sauce, Crab Apple, Apple Butter, Apple Pie, Apple chips, Apple juice, Apple cider, industry analysis, price, or volume movement |
| attack | violence, sports, heart, war, game, illness, chemical, or agent |
| movie | fun, film, cinema, cinematic, cinematograph, feature, flick, motion picture, moving picture, photoplay, screenplay, show, silent, silver screen, talkie, talking picture, videotape, theater, or entertainment |

Similarly, things, items, services, and products can have several purposes, only one of which the user will put it to. Consider the following for "kerosene", and "acetone".

| ITEM | PURPOSES POSSIBLE |
|---|---|
| kerosene | engine fuel, jet fuel, lighting, heating, cleaning, dissolving, reducing, or low volatility fire |
| acetone | nail polish remover, paint cleaner, solvent, paint thinner, or as in a acetone cyanohydrin precursor to methyl methacrylate |

A method embodiment of the present invention parses each webpage or URL into its relevant words. Contextual weights are assigned to each extracted word according to how each is displayed in the electronic document. A context vector is created for each extracted word and the contexts taken from a thesaurus database. A weight vector is associated with a context vector for each relevant word. The highest weighted vectors point to the most important contexts. A check is made to see if the current interests of the user are in line with a stored profile for them. If not, a new profile is created. If so, then the users'; "likes" are reinforced. Both are then used to constrain the launching any ads to just the ones that target the current profile.

Sample Webpage

Breast Cancer Symptoms

Early breast cancer usually does not cause pain. In fact, when breast cancer first develops, there may be no symptoms at all. But as the cancer grows, it can cause changes that women -continued

```
should watch for:
A lump or thickening in or near the breast or in the
underarm area.
A change in the size or shape of the breast.
A discharge from the nipple.
A change in the color or feel of the skin of the
breast, areola, or nipple (dimpled, puckered, or scaly).
A woman should see her doctor if she notices any of
these changes. Most often, they are not cancer, but only a
doctor can tell for sure.
```

The relevant words are "breast", "cancer", "doctor", and "symptoms".

Relevant Words Assigned Context Vectors and Weighted

| WORD | CONTEXT VECTOR | WEIGHT VECTOR |
|---|---|---|
| breast | (mammary, glands, nipple, cancer) | (1, 1, 4, 10) |
| cancer | (disease, doctor, breast cancer) | (1, 2, 5) |
| doctor | (physician, hospital, patient, disease) | (1, 1, 1, 1) |
| symptoms | (disease, doctor, patient) | (1, 1, 1) |

So, "breast" has a vector weighted most toward "cancer". "Cancer" has a vector weighted most toward "breast cancer". And "doctor" and "symptoms" have no obvious preferred context.

Limiting marketing efforts to those that are audience appropriate will optimize the experience and the benefits for both the company making the offers and the user/buyer. Ads that are relevant to the users seeing them are more likely to generate sales.

Figure 18:
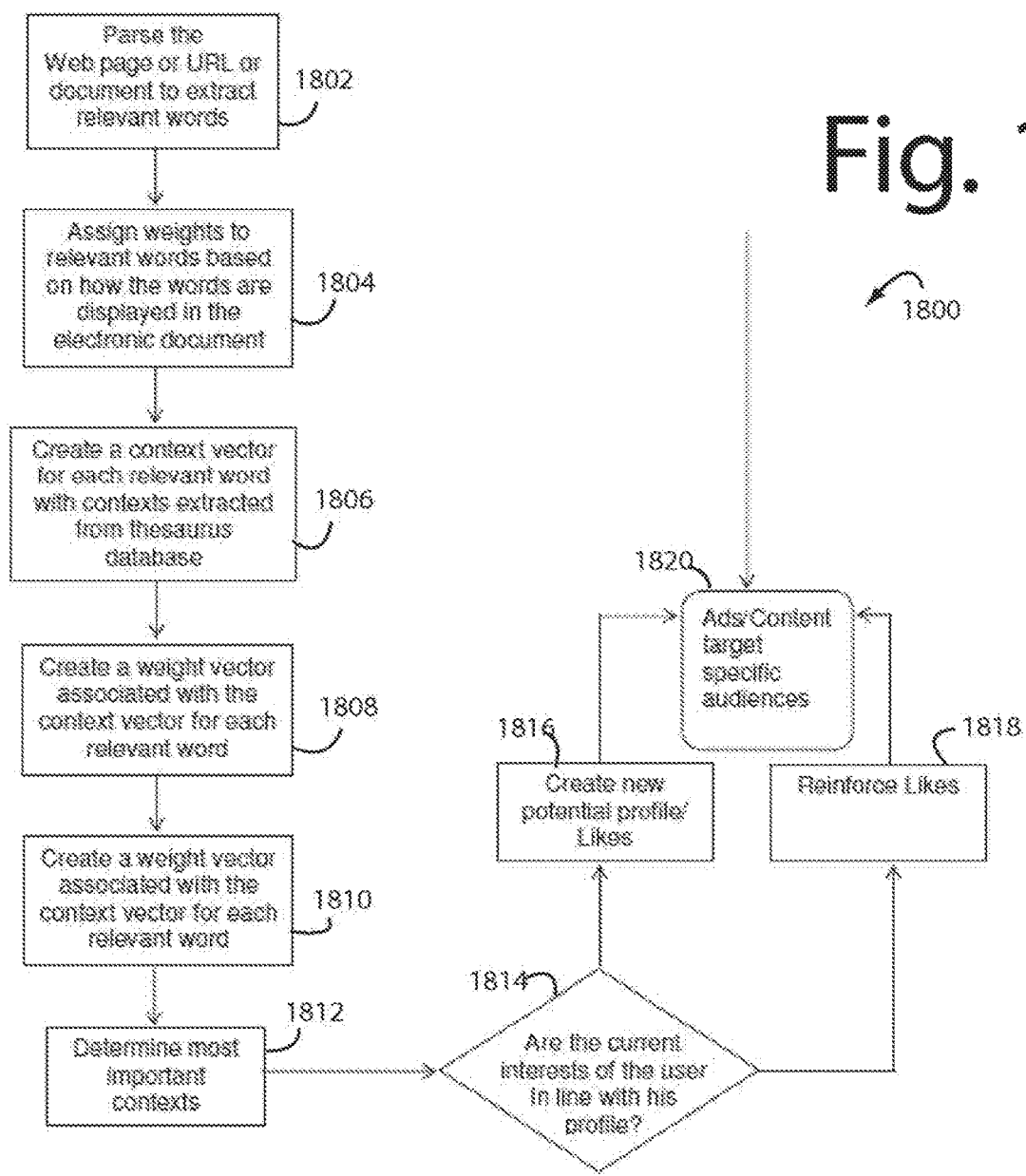
FIG. 18 is a flowchart diagram of how the word contexts in webpages can be artificially understood and worked with by a computing machine.

FIG. 18 represents a method 1800 for artificial understanding of webpage content. A step 1802 parses a Web page, URL, or document to extract its significant, relevant words. A step 1804 assigns weights to these words based on how the words are arranged in the electronic document. A step 1806 creates a context vector for each selected word with their contexts extracted from a thesaurus database. A step 1808 creates weight vectors that are associated with the corresponding context vectors for each relevant word. A step 1810 creates a weight vector associated with the context vector for each relevant word. A step 1812 determines which contexts appear to be the most important. A step 1814 asks if the current interests of the user appear to be in-line with their current profile? If not, a step 1816 creates new potential profile of "likes" and preferences. If so, a step 1818 reinforces the likes and preferences already on file. A step 1820 formulates productive ads and content designed to target specific, identified audiences.

Artificial Perception of Message Big Data

Consumer and user behaviors can have multi-dimensional ranges that can be quantified and contributed to a database to identify them as individuals and to follow their interests, preferences, travel, spending, shopping, seasonal, event related, and "likes".

Here, this Application concerns the machine reading of messages to discern what the context is. If the context is one preselected to be of interest, the messages are further analyzed to get a finer more accurate impression of the purpose and context of the message.

Every word in a sentence serves a specific purpose within the structure of that particular sentence. Sentence structures can sometimes be very complicated.

Words, when taken alone, are often ambiguous (two or more meanings or definitions), even in proper formal dictionaries. Slang and jargon only add to the possible ambiguities of single-words. For example, the word "slack" can be an adjective, a noun, a verb, and an adverb. Sentence parsing methods for detecting the particular syntactic roles of the words can help decide which meaning is the intended one.

Slack, when used as an adjective, can mean "a slack rope" or "business was rather slack". As a noun, "the rope had some slack in it". As a verb, it means to loosen. As an adverb, its meaning is as in "their heads were hanging slack in attitudes of despair". In slang, "slack" can be anything you get or enjoy out of life that you don't have to work for or pay for, an approach where one stops trying to make things happen or exert control, and instead simply "allows" or "lets" favorable events to occur. In project management jargon, "float" is sometimes called slack, and is the amount of time an activity, network path, or project can be delayed from the early start without changing the completion date of the project. Getting the intended meaning right is obviously critical when trying to understand the context of the message.

Particular senders may express their peculiar proclivities in the ways they use ambiguous words in repeated and recognizable ways. A smart agent, like those described above, assigned to a particular sender can be employed to track that sender's behavior. Thereafter, the words used in messages from senders with known proclivities in their word choices will be that much quicker and easier to disambiguate.

In one stretch of imagination, foreign words can be thought of as no more than a synonym for a corresponding English word. For example, the English word "money" would have the following extended synonyms: "bread" or "cabbage" (slang), деньги "den'gi" (Russian), "dinero" (Spanish), 钱 "Qian" (Chinese Mandarin), and "argent" (French). Like English, foreign words can each have multiple meanings, and machine translators that don't harmonize the meanings of the translated words very often produce bizarre results that can innocently be funny or insulting.

So, a machine intelligence encountering the word "slack" in a sentence and attempting to discern the context of the sentence, paragraph, and missive, would need to determine the syntactic role that "slack" has in each sentence. Smart agents can therefore be assigned to operate for each of the eight parts of speech: verbs, nouns, pronouns, adverbs, adjectives, prepositions, conjunctions, and interjections. For example, a smart agent for the general class of verbs would have attributes listing the dictionary words that can operate as verbs in a sentence. A smart agent for the word "slack" would also exist, of course, with attributes listing the parts of speech it can play, their context, and the synonyms that exist for it.

Verbs can be single words or can have "helpers" such as: has, have, had, is, am, was, or were. Verbs can be accompanied by modals such as: could, would, might, or may. Phrasal verbs, look like verbs with prepositions (or adverbs) attached, such as: hand-in, break-up, fill-out, run-into, come-up-with, and check-up-on.

Every sentence contains a subject and a predicate.

---

1. Subject: the noun or noun phrase that tells whom or what the sentence addresses.

2. Predicate: a verb or verb phrase telling what the subject does or is.
3. Clause: a part of a sentence that contains its own subject and predicate.
4. Phrase: a group of related words without a subject or predicate.
5. Modifier: a word or phrase that modifies or adds information to other parts of a sentence. Adjectives, adverbs, and many phrases and clauses are modifiers.

---

1. Sentences can be defined according to their content or intention:
Declarative sentence: a sentence that states a fact or an idea.
Interrogative sentence: a sentence that asks a question and ends in a question mark.
Imperative sentence: a sentence that issues a command or makes a request.
Exclamatory sentence: a sentence that issues a command or makes a dramatic observation. Exclamation points should not punctuate declarative sentences.

---

2. Sentences also can be defined according to their structure:
Simple sentence: a sentence made up of a single independent clause.
Compound sentence: a sentence made up of two independent clauses connected by a conjunction.
Complex sentence: a sentence made up of one or more dependent clauses connected to an independent clause.
Compound-complex sentence: a sentence made up of multiple independent clauses and at least one dependent clause.

---

Figure 19:
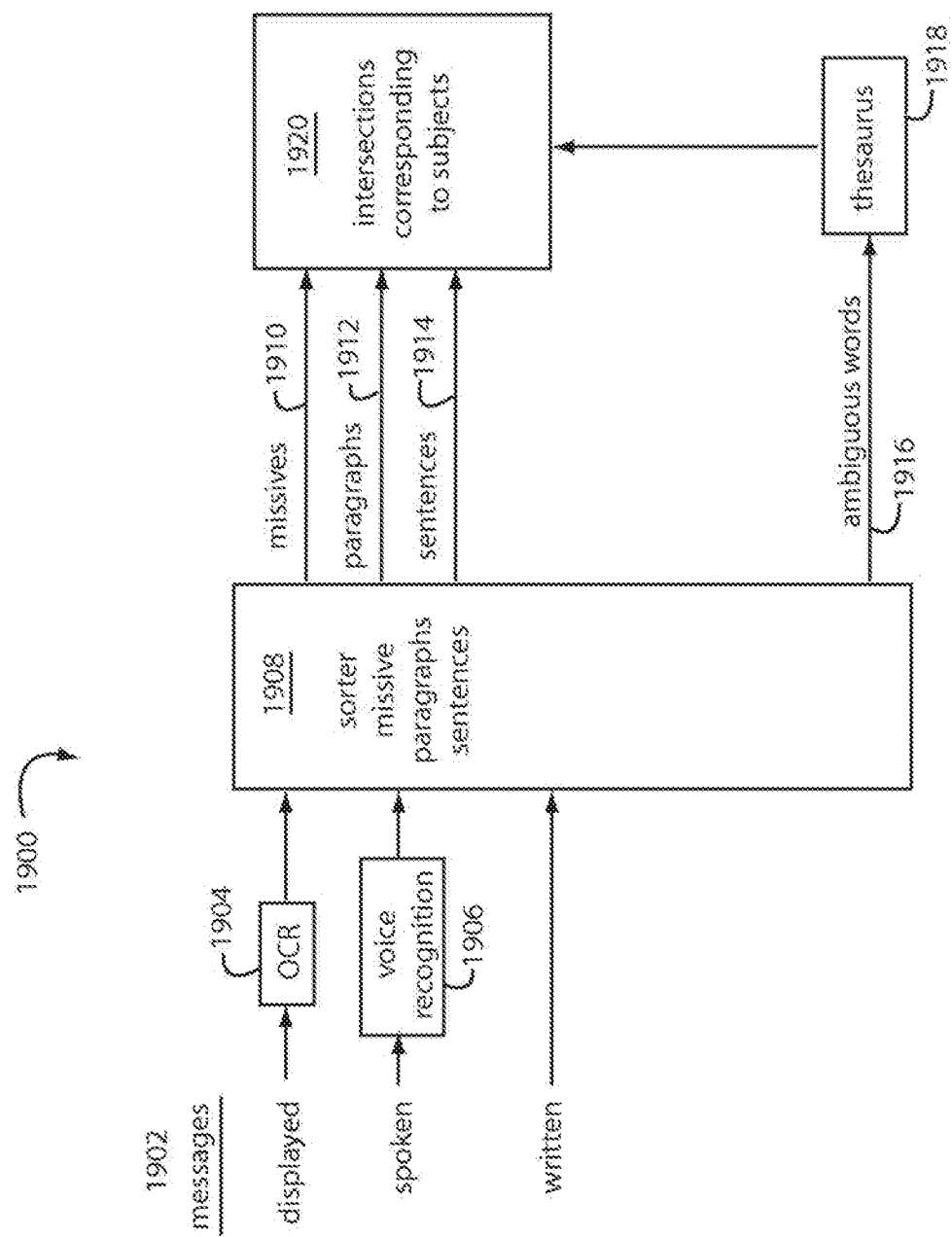
FIG. 19 is a diagram of an artificial intelligence method for enabling a computer network server to seemingly understand the underlying thoughts, intentions, motives, feelings, opinions, information, purposes, and aims in written and spoken messages.

FIG. 19 represents an artificial intelligence and machine learning method for enabling a computer network server to seemingly understand the underlying thoughts, intentions, motives, feelings, opinions, information, purposes, and aims in written and spoken messages, and is referred to herein by general reference numeral 1900. Incoming messages 1902 are converted to text by an optical character recognition (OCR) 1904 if the messages are displayed, or by a voice recognition unit 1906 if they are audio and spoken, or directly if already in text string form to a sorter 1908.

Sorter 1908 detaches discrete missives 1910 from the stream of incoming messages 1902. Constituent paragraphs 1912 are separated from the individual missive 1910 they each belong to. Component sentences 1914 are parted from the disconnected paragraphs 1912 they each belong to. Then keywords 1916 are identified in each constituent sentence 1914. A custom lexicon or thesaurus 1918 expands each keyword 1916 into its several alternative definitions and uses.

Although thesaurus are in wide use in book-published form and on the Internet in connection with spelling checkers, a commercial one suitable for use as suitable thesaurus 1920 seems to be unavailable for purchase and must therefore be custom built. When a writer of a message 1902 uses a keyword 1916, they know what they meant and it is the job of method 1900 to discern it. Unfortunately, most words have different meanings and definitions and the differences are subtle. Thesaurus 1918 generates all the possible candidates. It would be helpful to order the candidates according to their probability of use, given some hints derived from similar messages from particular writers, corresponding keyword definitions found in the other sentences and paragraphs in the same missive, etc. The keywords will usually have some intersection 1920.

For example, if a lot of the keywords in a particular missive 1910 have definitions and meanings that intersect in automotive attributes, the subject of the missive could be interpreted to be about cars. (And new incoming keywords in the missive or from the same sender in later missives are likely to be in reference to cars as well.) If some keywords 1916 included prices, then that missive could further be understood to be an advertisement for a car. Any dates included could signal if it was a new car ad or a used car ad. If car ads were of particular interest to the user, then more tests and color on the subject can be developed. And then appropriate action or response.

Method 1900 is in its most practical embodiments limited to narrow areas of interest or focus. One that could operate freestyle and understand any subject or meaning in any message 1902 would be vast and near impractical to implement. Fortunately, most if not all users will have specific interests and attentions. The intended users are challenged with sifting through millions or billions of messages 1902 in realtime to find those few missives 1910 that deal with the focus. Those few missives 1910 culled are then more susceptible to human scrutiny and action.

In fraud management systems, the transactions are analyzed and classified in one dimension for their probability of being fraudulent in light of past behavior of the cardholder identified by the account number.

In machine reading, the missives received in the message streams are the transactions that are analyzed and classifiable in any of a number of different dimensions, although a particular user will be focused on only one dimension that interests them and supports the expenses and costs of the system. Each source or sender is tracked the way that cardholders are in the fraud management systems.

Spam filters are a type of single-dimension classification. Most blacklist particular senders, others will look for and trigger rejections based on keywords. Porno site filters are similar. We filed a type of porno filter that was published as US Patent Publication . . . .

When a missive is received the first question to be answered is "what is the missive about?", what's its purpose? The sender's smart agent is fetched to contrast this missive with previous ones. The words the sender uses can be used to expose the context. Humans will understand the context almost naturally, but machines will need to do an analysis of the words used.

Sentences can be diagramed for their objects, subjects, verbs, and adjectives. See, Reed-Kellogg sentencing diagramming. For example, diagramming the following complex sentence: "The federal government and many of the nation's leading telephone companies announced yesterday an agreement for a reshuffling of phone rates that would reduce the bills of tens of millions of less affluent consumers and lead to less significant cuts for other consumers and businesses."

Each who, what, when, what, where, and why can be isolated without too much effort. "Announced" is the key verb. This missive tells of an announcement. What is announced is an agreement. Who announced it was the federal government and leading phone companies. The agreement is to reshuffle phone rates. The effects of the agreement are to reduce bills and lead to other cuts. Sentencing diagramming can therefore be used to pull an otherwise homogeneous jumble of undifferentiated words out of a pile to make sense of how they are grammatically used.

Dependency parsing is related to dependency grammar. It's very flexible and often used in segmentation in NLP (Natural Language Processing) research. It's also used in Word Grammar. It also works better with Japanese than something like phrase structure grammar, as Japanese has more freedom with word order, and often omits sentence elements. Basically, if you have a sentence like "John loves Mary," it will indicate that "loves" is the root, or head word of the pairs "John" and "loves" and "Mary" and "loves," as it governs both "John" and "Mary." They depend on "loves" in this sentence—"loves" is also the root of the sentence as a whole, it's not governed by anything. The notation for it can have arrows pointing to the heads/roots, or pointing away from them. In Langrid's notation, the arrows point to the head words, and the root of the sentence has the most arrows pointing to it.

"Violence" is an important context in applications of embodiments of the present invention, and missives that use words-of-violence are more likely to receive higher violence context scores in classification for violence. We therefore construct dictionaries or thesaurus that list words that could signal a form of violence. The same can be done for missives in other areas-of-interest like advertising, military, insider trading, spam, pornography

| Context | words-in-context |
|---|---|
| Violence | kill, hurt, stab, shoot, explode, poison, attack, suicide, weapons, explosives, ammunition, targets, methods, places, people, reasons, jihad, martyr, Muslim, Al Qaeda, terrorist, scud, rocket, RPG, tank, bleed, wound, die, dead, bury, burn, maim, protection, bodyguard, armor, vest, helmet, rape, pillage, invade, |
| advertising | sale, discount, price, features, limited time, financing, coupon, store, 800-number, chose now, |
| Military | fighter, bomber, bomb, warship, missile, bullet, ammunition, stockpile, warhead, rank, maneuvers, missions, objectives, |
| Insider confidential | merger, acquisition, stock, shares, price, votes, classified, secret, eyes-only, SRD, sensitive, confidential, project/program names, employee/management names, account numbers, passwords, card-verification-value (CVV), |
| Spam | special gift, products, show, deal, percentage off, register, coupon, today only, preview, enroll, subscribe, |
| pornography | vulgar words, sexual terms, slang, women, girls, body features, anatomy words, genitalia, bodily fluids, fetishes, |
| Sport | baseball, basketball, soccer, tennis, golf, home-run, touch-down, goal, goalie, quarterback, pitcher, runner, athlete, bat, ball, club, racket, first-down, strike, split, score, scorecard, scoreboard, scoring, scored, shut-out, perfect-game, Olympics, Sochi, Squaw Valley, skiing, skis, Lillehammer, sailing, sailor, sailboat, sail, scull boat, sculling, crew, track, marathon, biking, racing, finish time, record, scuba |
| Drugs | medical and slang terms, chemicals used, ingredients, delivery, precursors, effects, uses, consequences, addictions, cautions, prescriptions, government controls, security measures, supply organizations, |

Figure 20:
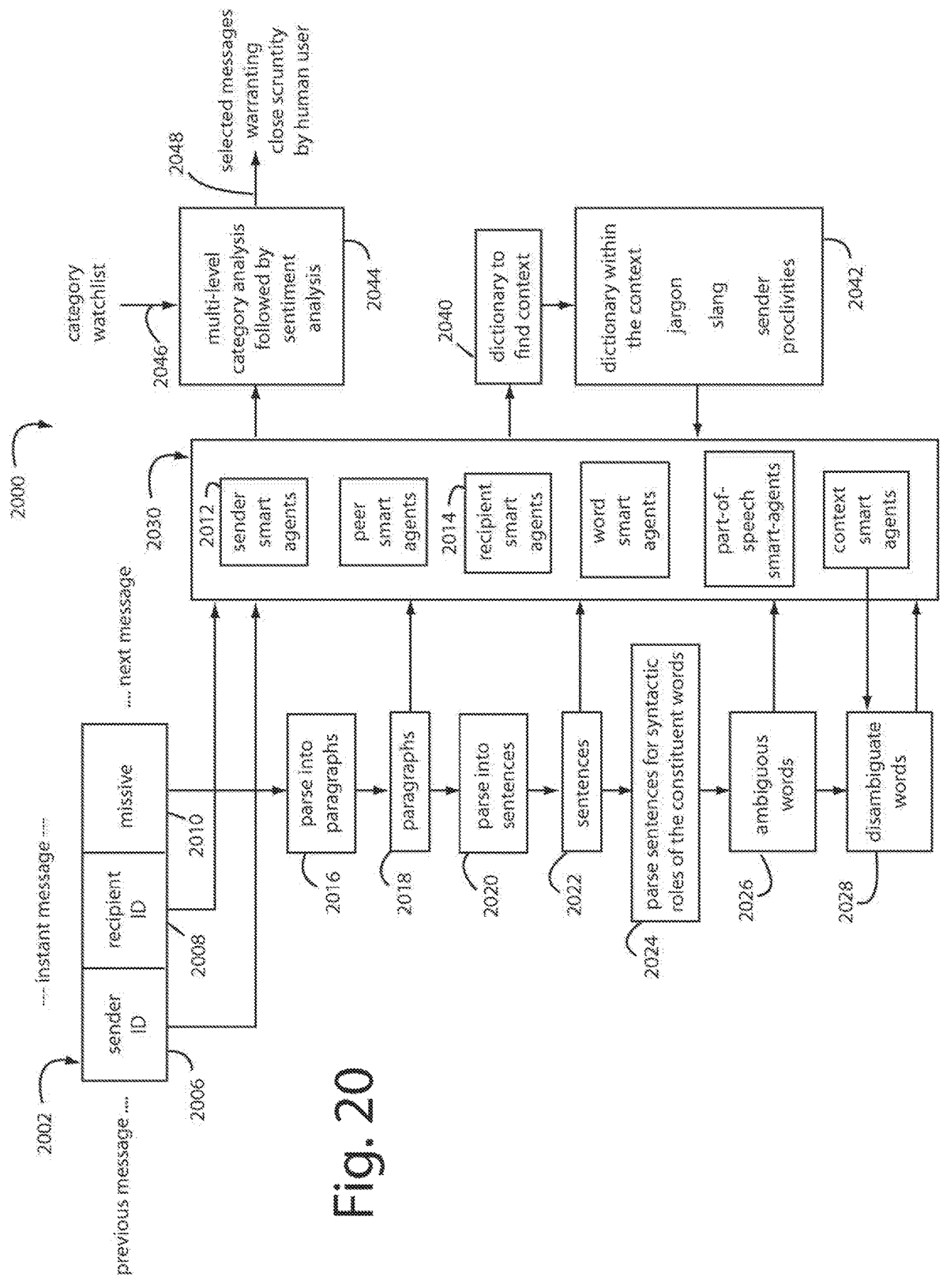
FIG. 20 is a functional block diagram of a machine reader method embodiment of the present invention for screening millions of electronic messages per second for their context, content, and sentiments.

FIG. 20 represents a machine reader method 2000 for screening millions of electronic messages 2002 per second for their subject context, content, and sentiments. Each message 2002 includes a sender-ID 2006, a recipient-ID 2008, and a missive 2010 in the payload. The sender ID 2006 will always be known or recognizable, the recipient ID 2008 may be unknown or merely assumed, and the message's payload, the missive 2010 will be known letter-by-letter, word-by-word, but what their meaning is will be the principal unknown to be determined. For example, message 2002 could be a letter from a father to his son about a future career in the US Army. The sender-ID 2006 and recipient-ID 2008 are used to trigger corresponding sender smart agents 2012 and corresponding recipient smart agents 2014.

Particular senders may come to the attention of a human user of machine reader method 2000 in a number of ways. The connection and input of messages 2002 to method 2000 may have been accidental, coincidental, deliberate, or unavoidable. In every case the flow of messages 2002 will be electronic and involve millions of messages per second, far too much for conventional methods and systems to screen and analyze.

A particular sender (identified by a sender ID 2006) may come to attention for the first time by virtue of a high score against a context-of-interest. (E.g., violence, hate, military secrets, insider information, sensitive technical details, etc.) Every sender with a message 2002 that passes through machine reader method 2000 will generate an assignment of sender ID 2006 the first time they are seen, and then that sender ID 2006 will be used subsequently as a file index with which to profile all their previous message behaviors, compare those with a current message 2002, and to receive an update that will migrate the behavior profile. This technique is described extensively above in connection with smart agents applied to payment fraud.

Missives 2010 are parsed, in a process 2016, into paragraphs 2018. Sometimes that's easy to do when the paragraphs are plainly formatted. Paragraphs 2018 are multi-dimensionally scorable as to context, meaning some paragraphs will score high or low in parallel in each of several categories. An other way to say this is they are given weights.

Paragraphs 2018, in turn, are parsed by a process 2020 into sentences 2022. That too can be easy if the sentences always end with a period and begin with a capital letter. If not, there are conventional methods available to help. Sentences 2022 are also multi-dimensionally scored as to context, meaning some sentences will score high or low in parallel in each of several predefined categories. In general, the context scores of each sentence in a paragraph need to be obtained so an amalgamation of them can be assembled to context-score their host paragraph.

Sentences 2022, in turn, are parsed by a process 2024 into their constituent words and organized by their respective syntactic roles. Ambiguous words 2026 will be extracted whose intended meanings can be limited by their syntactic roles in the sentences to which they belong. A process 2028 disambiguates the words by finding intersections of meaning with other words in other sentences 2022.

In general, missives 2010 will comprise paragraphs 2018 that each contribute to the overall purpose in the communication. In turn, sentences 2022 will provide details in support of their respective paragraphs 2018. Some writings and writers don't follow these grammatical rules, and variations must be accommodated.

Smart agents have attributes and pointers to other agents of use. For example, a word smart agent will include attributes for each of its synonyms or meanings. Each of the synonyms and meanings are themselves words with smart agents.

Machines cannot really understand the context of messages, they can only appear to do so. If a machine is allowed to pose questions to a human, it can set the agenda and steer the context of the "conversation". For example, if a machine is allowed to ask, "Are you tired?", the answers can be assumed to be responsive to the context of being tired. The machine can then pose deeper questions on the subject of "tired" that will amaze the average person, e.g., "Did you have a late night or been working too hard?" But is only a superficial appearance of understanding and intelligence that can be frightening or disarming.

Here with regard to FIG. 20, the possible contexts and sentiments in a message 2002 can be without limits, unless the particular sender has already demonstrated some narrow interest or single-track behaviors. For example, messages from Jehovah's Witness Organizations could be expected to be limited to Religious discussions and follow well worn patterns. Those sender proclivities can be used to give weight in a present analysis of "what is the context?" or subject, or sentiment. But method 2000 still needs to base its results on the instant message 2002 if it is to be useful.

Ambiguous words 2026 will include some words that have a very limited number of contexts, or even reasonably just one context of use. All words 2026 can be initially assumed to have some common denominator in a unifying context. Failing that, maybe most of the words 2026 will have some common denominator in a unifying context. And failing that, many of the words 2026 can be tested to see if they have some common denominator in a unifying context.

Those contexts that seem to be common denominators are given weights in embodiments of the present invention. Ambiguous words 2026 that are known to have a very limited number of contexts contribute to a higher confidence score or weighting. Such weights are useful to find disambiguate words 2028. Disambiguated words 2028 and nearly unambiguous words in words 2026 then will all "vote" for a particular context taking place. Just as in an election, there can be runner-ups. Here, we can infer the runner-ups to be details or methods embraced by the main context.

For example, suppose a message 2002 includes a single occurrence of "lawyer" in ambiguous words 2026. The context could be a particular person who happens to be a lawyer, or a legal issue in which a lawyer is involved. Other words 2026 and how they are used will help point to which is right. Furthering this example, if the word "weapon" occurs as a word 2026 it, by itself, can have several contexts.

| word/context | violence | legal-law | technology | porno | spam |
|---|---|---|---|---|---|
| Lawyer | | x | | | |
| Perry Mason | | x | | | |
| verdict | | x | | | |
| based | | | | | |
| finding | | | | | |
| murder | x | x | | | |
| weapon | x | x | x | | |
| | 2 | 5 | 1 | | |

So, given a message 2002: "Lawyer Perry Mason said the verdict was based on finding the murder weapon." The question is, what is the top-level context? The possible top-level contexts for each word are aligned and scores added, legal/law=5, violence=2, technology=1. Porno and spam are scored zero. Given this, the main context could be about the law or legal process, with a sub-context of violence. If these contexts are on a watchlist for method 2000, then this message 2002 is flagged.

A population of smart agents 2030 are interactively employed to reduce word ambiguities and uncertainties about the contexts and sentiments in the messages received. In a very simple understanding, a dictionary 2040 is used to find the correct or most probable message context. A refinement 2042 will provide specialized words, terms-of-art, jargon, slang and sender proclivities and idiosyncrasies in their use of language. The objective is a multi-level category analysis followed by sentiment analysis 2044 that is guided by a user provided category watchlist 2046.

Figure 21:
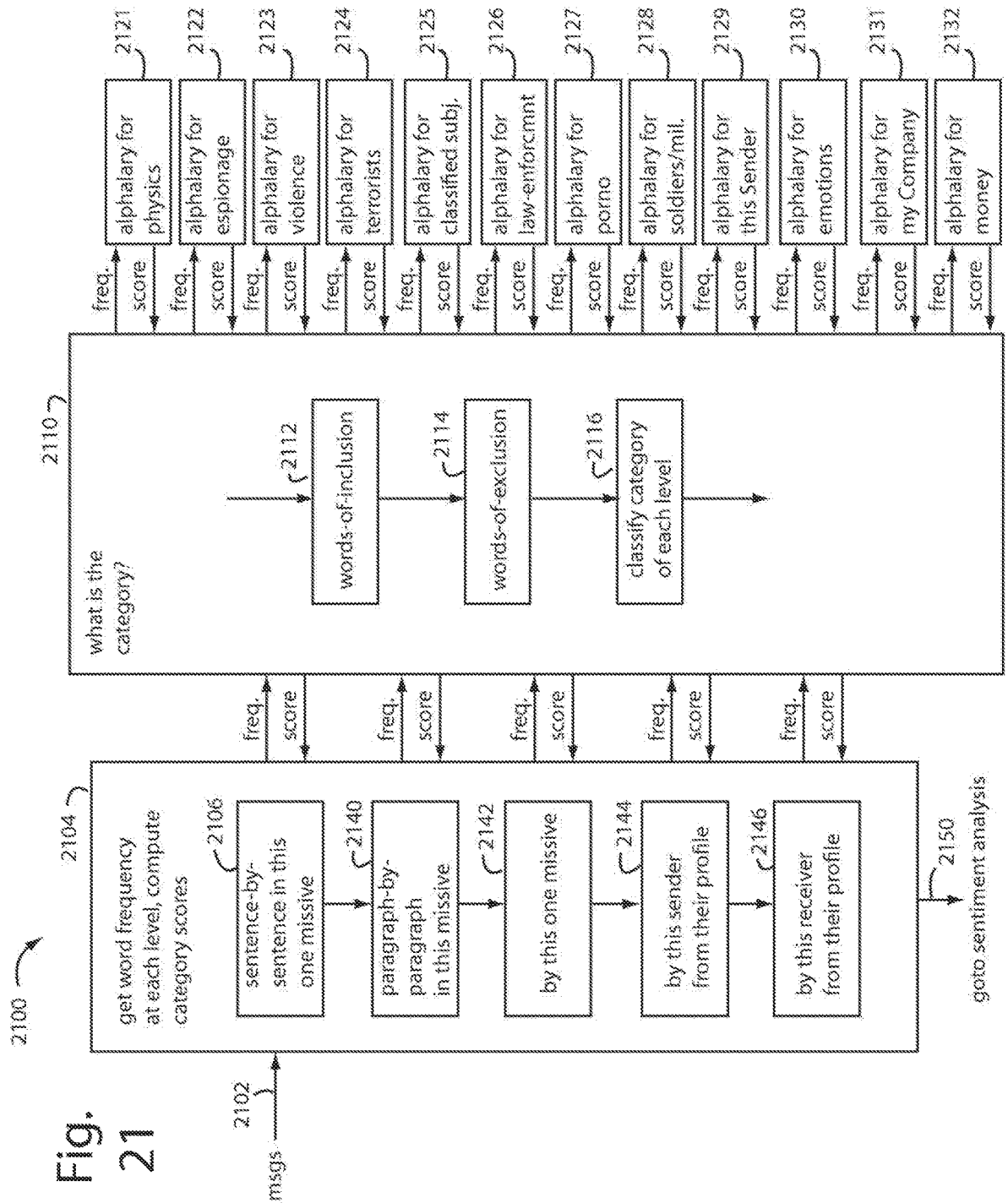
FIG. 21 is a functional block diagram of an exemplary part of the machine reader method embodiment of FIG. 20 for screening millions of electronic messages per second for their context, content, and sentiments.

The whole point is to highlight those few messages 2048 (in the millions of messages 2002) that appear to the machine intelligence to discuss the subjects and sentiments defined by input 2046. FIG. 21 describes the functioning and a possible construction for item 2040-2048.

In general, an artificial intelligence system will comprise a computer network server connected to receive and analyze millions of simultaneous text and/or voice messages written by humans to be read and understood by humans. Key, or otherwise important words in sentences are recognized and arrayed. Each such word is contributed to a qualia generator that spawns the word into its possible contexts, themes, or other reasonable ambiguities that can exist at the level of sentences, paragraphs, and missives. A thesaurus-like table can be employed to expand each word into a spread of discrete definitions.

Several such spreads are used as templates on the others to find petals that exhibit a convergence of meaning. Once the context of a whole missive has been predicted, each paragraph is deconstructed into sub-contexts that are appropriate within the overall theme. Particular contexts identified are then useful to trigger an actionable output.

Messages generally can be about taking, giving, asking, offering, acknowledging, ordering, informing, accepting, or denying and involve strangers, celebrities, leaders, authority figures, followers, teachers, audiences, acquaintances, co-workers, employers, employees, secret agents, colleagues, family, enemies, lovers, etc. An understanding of the parties involved in the sending and receiving of the message and its general purpose will go a long way to discerning the underlying thought, information, or feeling. Humans often already know these particulars, but such information is lost on conventional machines as meaningless.

For example, a yet-to-be-identified missive from one federal judge to another would have a whole different consequence and meaning than if it were a missive from either of the same federal judges to an FBI agent or a defendant in a criminal case. Even if all the key words parsed seemed superficially to coincide. Going further, once the parties were correctly understood, it could be further developed to analyze the missive to see if its contents were illegal, inappropriate, laudable, expected, unwanted, ordinary business, etc.

Incoming messages have a mix of missives, and senders who send them, and recipients who receive them, and paragraphs that comprise each missive, and sentences that comprise each paragraph, and words that comprise each sentence. So after parsing in the preceding processes of FIG. 20, the category at each of these levels is estimated.

Most English speakers, for example, need only a vocabulary of about 1,500 different words when communicating with others. Highly skilled persons will frequently employ jargon and terms-of-art. Non-native speakers will use words from foreign languages, especially if the sender and recipient have a particular foreign language in common. Some of these words will be used by them more frequently than others. The subject or the context of the communication will strongly influence which words are used and affect which are used more often. The statistics for these specialty field uses have been compiled and published by many sources for many reasons over a hundred years.

So, a first step in a method embodiment of the present invention is to gather, parse, and place in order a count of the words present in a message. One way to do that has been described here with FIG. 20.

Each user will have at least one category-of-interest that is justifying the expense of operating the system. Each category-of-interest will employ words that are frequently used, commonly used, rarely used, and never used. Words that are never used in a category serve herein to eliminate candidate categories, something not seemingly done in conventional machine intelligence context classifiers.

For example, medicine as a category could be expected to use words related to genitalia and sex, but would rarely use slang words for these terms and never use vulgarities. Certainly not scholarly and professional articles. By the same token, porno as a category would be expected to use words related to genitalia and sex, but would rarely or never use proper scientific words for these terms and instead frequently use vulgarities and street language. So, when confronted with a single sentence that includes words related to genitalia and sex, some category alphalaries (dictionaries of common use) would return higher scores than others, and some categories may be excluded altogether by the words encountered, thus reducing the context and category uncertainty. At the next level up, the paragraph level, the words in one or more constituent sentences of the paragraph may further influence category inclusion probabilities and exclusions. It would be worthwhile to try both ways.

Thereafter, at the next level up, the missive level, the words in one or more constituent paragraphs of the instant missive may further influence category inclusion probabilities and exclusions. At the still further next level up, the sender level, the words or category scores in previous messages from this same sender (or their peers), and previously analyzed, may further influence category inclusion probabilities and exclusions in this missive. Similarly, at the recipient level, the words or category scores in previous messages sent to this same receiver (or their peers), and previously analyzed, may be useful to further weight category inclusion probabilities and exclusions in the instant missive.

With this understanding and now referring to FIG. 21, a process 2100 receives a high volume stream of messages 2102 that have already been parsed into words, sentences, paragraphs, missives, senders, recipients, and peers. E.g., by the method of FIG. 20. A category estimator 2104 begins with an analysis 2106 for each sentence in the missive, sentence-by-sentence. The constituent words appearing in the sentence are ordered by their frequency of use and forwarded to a category sorter 2110.

Category sorter 2110 includes a words-of-inclusion scorer 2112, a words-of-exclusion scorer 2114, and a level-by-level category classifier 2116. Each is able to consult a category alphalary 2121-2132 for a word lookup. Words can be scored by their usage in the particular category, e.g., always, usually, commonly, rarely, and never. Or given a numerical score like a statistic of usage, e.g., 0-100 percent. These scores are returned to category estimator 2104 level-by-level and registered.

The category alphalaries 2121-2132 given here are examples, each application will have to construct their own sets according to the message traffic they are reading and the categories of interest and that are being monitored by the particular user. For example, some message traffic will be from the public at large and only child pornography is the single subject category of interest to a law enforcement user. Samples of simple (words-of-inclusion) alphalaries found on the Internet follow:

https://myvocabulary.com/word-list/

Alphalary for Violence (473)

A) Acid, Aggressor, Agitator, Aim, Alert, Ambush, Ammunition, Anarchy, Anguish, Annihilate, Apartheid, Arms, Arsenal, Artillery, Assassin, Assassinate, Assault, Atrocity, Attack, Authority, Automatic

B) Barrage, Barricade, Battle, Battlefield, Belligerent, Betrayal, Blast, Blindside, Blood, Bloody, Bomb, Bombardment, Booby trap, Breach, Break, Brutal, Brutality, Brute, Bullet, Bully, Burn

C) Cadaver, Camouflage, Campaign, Captive, Capture, Careen, Carnage, Casualties, Cataclysm, Causes, Chaos, Charge, Charred, Checking, Clandestine, Clash, Coalition, Collapse, Combat, Commandos, Concentration, Concussion, Conflagration, Conflict, Confrontation, Conquer, Consequences, Consolidate, Conspiracy, Conspire, Control, Coordinates, Corpse, Counterattack, Countermand, Crash, Crime, Crisis, Cross-hairs, Culpability

D) Damage, Danger, Dangerous, Dash, Dead, Deadly, Death, Debacle, Deception, Deliberate, Demolish, Demoralize, Despot, Destroy, Destruction, Detect, Detection, Devastation, Device, Dictator, Dictatorship, Die, Disarmament, Disaster, Disastrous, Discipline, Disease, Dispute, Disruption, Dissonance, Division, Domination, Doom, Downfall, Drama, Dread

E) Encounter, Enemy, Enforce, Engagement, Epithet, Escalate, Excess, Execute, Execution, Expectations, Explode, Exploitation, Explosion, Explosive, Expunge, Extremism

F) Faction, Fanatic, Fatal, Fear, Fearful, Felon, Ferment, Ferocious, Feud, Fierce, Fiery, Fight, Fighter, Force, Forceful, Forces, Fray, Frenzy, Front lines, Fuel, Fugitive, Furtive

G) Gang, Gang up on, Gas, Genocide, Germ warfare, Grave, Grenade, Grievous, Groans, Guard, Guerrillas, Guided bombs, Guns, Gunship

H) Hammering, Harass, Harsh, Hatch, Hate, Hatred, Hazard, Hiding, Hijack, Hijacker, Hit, Hit-and-run, Holocaust, Horror, Hostility, Howitzer, Hurt

I) Ignite, Impact, Improvise, Incident, Incite, Incontrovertible, Infanticide, Infiltrate, Inflame, Informant, Injuries, Inmate, Insurgent, Insurrection, Intense, Intercept, Interdiction, International, Interrogation, Intervene, Intimidate, Invasion, Investigate, Investigations, Involvement, Ire

J) Jail, Jeer, Jets, Join

K) Kamikaze, Keen, Kidnap, Killing, Knife, Knock-out

L) Land mines, Laser-activated, Launch, Launcher, Loathsome

M) Machine guns, Maim, Malevolent, Malicious, Maraud, March, Massacre, Mayhem, Megalomania, Menace, Militancy, Militant, Militaristic, Military, Militia, Mines, Missile, Mission, Mistreatment, Mob, Mobile, Mobilization, Momentum, Mortars, Munitions, Murder, Muscle

N) Nationalist, Neutralize, Nightmare, Nitrate, Notorious

O) Offensive, Officials, Onerous, Operation, Opposition, Order, Out of control, Outbreak, Overrun, Overthrow

P) Pacify, Partisan, Patrol, Penetrate, Perform, Persecute, Petrify, Photos, Pilot, Pistol, Planes, Plunder, Position, Post-traumatic, Potent, Pound, Powder, Power, Powerful, Preemptive, Premeditate, Prey, Prison, Prisoner, Proliferation, Provocation, Prowl, Pugnacious, Pulverize, Pushing

Q) Quail, Quarrel, Quell, Quiver

R) Radiation, Radical, Rage, Ravage, Ravish, Rebel, Rebellion, Reconnaissance, Recovery, Recruit, Refugee, Regime, Regiment, Reinforcements, Relentless, Reparation, Reprisal, Reputation, Resistance, Retaliation, Retreat, Retribution, Revenge, Revolution, Ricochet, Rifle, Rift, Riot, Rival, Rocket, Rot, Rounds, Rule, Ruthless

S) Sabotage, Sacrifice, Salvage, Sanction, Savage, Scare, Score, Scramble, Secrecy, Secret, Sedition, Seize, Seizure, Sensor, Setback, Shelling, Shells, Shock, Shoot, Shot, Showdown, Siege, Skirmish, Slaughter, Smash, Smuggle, Soldier, Special-ops, Specialized, Spy, Spy satellite, Squad, Stalk, Stash, Stealth, Storm, Straggler, Strangle, Strategic, Strategist, Strategy, Strength, Strife, Strike, Strip, Stronghold, Struggle, Subversive, Suffering, Superstition, Supplies, Support, Suppression, Surprise, Surrender, Survival, Survivor, Suspect

T) Tactics, Tank, Target, Tension, Terror, Terrorism, Terrorist, Terrorize, Threaten, Thug, Thwart, Topple, Torch, Tornado, Torpedo, Tourniquet, Tragic, Training, Trample, Trap, Trauma, Treachery, Trench, Trigger, Triumph, Tsunami, Turbulent

U) Unbelievable, Unconventional, Unleash, Unruly, Uprising, Urgency

V) Vagrant, Vanguard, Vanish, Vehicle, Vehicular, Vendetta, Venomous, Vicious, Victory, Vile, Vilify, Violation, Violence, Virulence, Vital, Vitriol, Vociferous, Void, Vow, Vulnerability

W) Wage, War, Warheads, Warplane, Warrant, Warrior, Watchdog, Watchful, Weapon, Weather, Well-trained, Wisdom, Worldwide, Wound, Wreckage

X) X-ray

Y) Yearn, Yelling

Z) Zeal, Zealot, Zigzag, Zone

Alphalary for Depression (820)

A) Ability, Abnormal, Abuse, Adolescents, Affect, Agency, Aid, Alarm, Alienation, All ages, Alone, Anger, Anguish, Antidepressant, Anxiety, Anxious, Attempt, Attention, Attitude, Awareness B) Bipolar, Blasé, Blue, Brain C) Caregiver, Certify, Child, Clarity, Clinical, Communication, Concern, Conclude, Condition, Confide, Confusion, Cooperative, Cope, Counsel, Courage, Cruel, Cure, Cycle D) Data, Death, Debilitating, Defeated, Degree, Depressed, Depression, Descent, Despair, Detriment, Diagnosis, Die, Discrimination, Disease, Disinterest, Disorder, Disorder, Distracted, Doctor, Dog days, Down, Drugs E) Education, Effect, Endure, Esteem, Evaluation F) Family, Fatigued, Fear, Feelings, Fight, Finality, Friends G) Gain, Grief, Grieving, Guideline H) Hard work, Heal, Health, Help, Helpless, Hereditary, Hopelessness, Hot-line, Hurt I) Immune, Improvement, Inability, Inactivity, Indicator, Insecure, Interested, Interfere, Involvement, Irritable, Isolation, Issues J) Jeer, Joking K) Kill, Knowledge, Knowledgeable L) Label, Lack, Level, Level, Listening M) Media, Medication, Medicine, Melancholia, Mental, Mental health, Misunderstanding, Monitor N) Necessary, Need, Negative, Normal, Nothing O) Observation, Oncoming, Opinion, Option, Organize, Overcome, Overwhelmed P) Pain, Panic, Parents, Patience, Patient, Pattern, Pay attention, Peers, Personal, Physician, Pills, Prescription, Prevent, Prevention, Programs, Progress, Progressive, Protect, Psychiatrist Q) Quality, Quantity, Query, Quest R) Reality, Report, Requirement, Resulting, Review S) Sadness, Scared, Security, Separation, Seriousness, Siblings, Signs, Skills, Sleep, Sleep pattern, Solitary, Sorrow, Source, Statistics, Stigma, Strength, Struggle, Studies, Substance abuse, Succor, Suffer, Suicide, Sympathetic, Symptoms T) Tack, Talk, Talking, Teenagers, Tentative, Terrified, Therapy, Thoughts, Time, Tired, Tragedy, Tragic, Trajectory, Treat, Treatment, Treatment, Treatment, Triumph, Troubled U) Uncertain, Uncomfortable, Understanding, Unfulfilled, Unique, Unsettling, Unusual V) Validation, Victim W) Warning, Watch, Withdrawal, World Health Organization, Worry, Worthless

X)

Y) Youth

Z) Zero

Alphalary for Cocaine (132)

A) Acres, Agony, Airborne, Ambivalence, Amounts, Anti-drug, Arrest, Aspects

B) Battle, Bolivia, Boom

C) Capture, Carrier, Cartel, Cato, Challenge, Change, Cocaine, Cocaleros, Columbia, Combatting, Commitment, Condone, Consequences, Control, Controversial, Critic, Crop, Culture, Czar D) Damage, Danger, Dealer, Demand, Demonstrate, Drug E) Economics, Ecuador, Environment, Eradicate, Estimate, Expense, Extraction F) Facility, Failure, Farmer, Field, Find, Flatland, Frontier G) Gang, Global, Guerrilla, Guilty H) Happen, Harvest, Helicopter I) Ingredients, Intelligence

J)

K) Kill, Kingpin

L) Law, Law-enforcement, Leafy, Legal, Locals

M) Material, Migration, Mislead, Monitor, Movement, Murder

N) Nation, National, Nee

O) Out of control, Outfit

P) Package, Paste, Peru, Plantings, Plentiful, Police, Policy, Politics, Pounds, Prison, Processing, Production Q) Questionable, Quit R) Raid, Raw, Recovery, Region, Rehabilitation, Relationship, Remote, Roadblock, Ruin S) Scientist, Semi-refined, Sentence, Ship, Shipments, Sick, Skirmish, Smuggling, Source, Spending, Stimulant, Storage, Streets, Success, Surge, Swath T) Technique, Thwart, Ton, Trade, Traffic, Trafficker, Trend, Tropics, Trouble

U)

V) Value, Venture

W) Worth, Wrongdoing

X)

Y) Yield

Z) Zone

Alphalary for Law Enforcement (539)

A) Abide, Abuse, Accessory, Accidental, Accomplice, Accord, Accused, Accuser, Action, Administer, Admission, Adopt, Adversary, Affect, Affidavit, Against, Agency, Agent, Agreement, Alias, Alibi, Alienate, Allegation, Ammunition, APB, Appeal, Appoint, Appraisal, Armed, Armor, Arraignment, Arrest, Arsenal, Arson, Aspect, Assailant, Assault, Assignment, Assistance, Attachment, Attack, Attitude, Authority, Authorize, Autopsy B) Background check, Backup, Badge, Bail, Ballistics, Bankruptcy, Bargain, Base, Basis, Battery, Beat, Behavior, Behind bars, Belief, Blackmail, Bloodstain, Bobby, Bomb squad, Bond, Branch, Breach, Bribery, Briefing, Brutal, Buccal swab, Burden, Burglary C) Capability, Captain, Capture, Case, Caution, Cease fire, Challenge, Character, Cheat, Chief, Circumstances, Citizen, Civil, Claim, Code, Coerce, Collusion, Command, Commission, Commissioner, Commit, Common-law, Community property, Community relations, Community service, Complaint, Complication, Conduct, Confession, Connection, Consent, Consideration, Conspiracy, Constable, Constitution, Contact, Contempt, Control, Controversial, Convict, Conviction, Cooperation, Cop, Coroner, Corruption, Counterfeit, Court, Credit theft, Crime, Criminal, Criminal justice system, Criminology, Cuffs, Custody D) Damage, Danger, Dangerous, Data base, Deadly, Deal, Dealings, Decision, Dedication, Deed, Defendant, Defense, Deliberate, Delinquency, Democratic, Denial, Department, Deputy, Detail, Detain, Detection, Detective, Deter, Determination, Deviant, Dignity, Direct, Discovery, Disobedience, Dispatch, Disregard, District attorney, DNA, Documentation, Documents, Domestic, Drill, Drugs, Duty E) Educate, Education, Effect, Embezzle, Emergency, Emphasis, Enable, Encumber, Enforce, Entail, Equality, Equipment, Escape, Ethical, Eviction, Evidence, Examination, Execute, Exonerate, Expert, Expunge, Extort, Extradition, Extreme F) Failure, Fairness, Family, Fatality, Fault, FBI, Federal, Felony, Fight, Fine, Fingerprint, First-degree, Footprints, Force, Forgery, Formal charge, Forswear, Frantic, Fraud, Freedom, Friend, Full-scale, Fundamental G) Glimpse, Good guys, Government, Grief, Grievance, Guarantee, Guard, Guilty, Gun H) Handle, Harassment, Harmful, Headquarters, Heinous, Helicopter, Helpful, High-powered rifle, High-profile, Hijack, Hire, Holding cell, Holster, Homicide, Honesty, Honor, Hostage, Humanity I) Identification, Illegal, Immoral, Immunity, Impeach, Impression, Imprison, Improper, Inappropriate, Incompetent, Incriminating, Indictment, Influence, Informant, Information, Initiative, Injury, Innocent, Inquest, Instruct, Integrity, Intelligence, Interests, Interference, Interpol, Interpretation, Interrogate, Interstate, Intervention, Interview, Invasive, Investigate, Investigation, Involvement, Irregular, Issue J) Jail, John Doe, Judge, Judgment, Judicial, Judiciary, Jurisdiction, Jury, Justice, Juvenile K) Kidnapping, Kin L) Laboratory, Larceny, Law, Law-abiding, Lawfully, Lawsuit, Leaks, Lease, Legacy, Legal, Legitimate, Lethal, Libel, Liberty, License, Lie detector, Lien, Lieutenant, Limits, Long hours, Lowlife, Loyalty, Lynch M) Mace, Maintain, Majority, Malice, Malpractice, Manacled, Manslaughter, Mayhem, Mentor, Metal detector, Minority, Miscreant, Misdemeanor, Missing person, Mission, Model, Moratorium, Motorist, Murder, Murderer N) Negligent, Negotiable, Negotiate, Neighborhood, Notation, Notification, Nuisance O) Oath, Obedience, Obey, Obligation, Offender, Offense, Officer, Official, Ongoing, Open case, Opinion, Opportunity, Order, Organize, Outage, Ownership P) Partner, Partnership, Patrol, Pattern, Pedestrian, Penalize, Penalty, Perjury, Perpetrator, Petition, Petty theft, Phony, Plainclothes officer, Plead, Police, Police academy, Power, Precedent, Precinct, Preliminary findings, Prevaricate, Prevention, Previous, Principle, Prior, Prison, Private, Probable cause, Probation officer, Procedure, Professional, Profile, Proof, Property, Prosecute, Prosecutor, Protection, Protocol, Provision, Public, Punishment Q) Qualification, Quality, Quantify, Quantity, Quarrel, Quell, Question, Quickly, Quirk R) Radar, Raid, Rank, Rap sheet, Reason, Record, Recovery, Recruit, Redress, Reduction, Referendum, Refute, Regulations, Reinforcement, Reject, Repeal, Reported, Reports, Reprobate, Reputation, Requirement, Resist, Responsibility, Restraining order, Restriction, Revenge, Rights, Riot, Robbery, Rogue, Rules, Rulings S) Sabotage, Safeguard, Sanction, Scene, Sealed record, Search and rescue team, Secret, Seize, Selection, Sentence, Sergeant, Seriousness, Services, Sheriff, Shyster, Sighting, Situation, Skillful, Slander, Slaying, Smuggling, Speculation, Squad, Statute, Statute of limitation, Stipulation, Subdue, Subpoena, Successful, Summons, Supervise, Suppress, Surveillance, Survivor, Suspect, Suspected, Suspicion, Suspicious, Sworn, System T) Tactic, Tantamount, Task force, Technique, Testify, Testimony, Threatening, Thwart, Toxicology, Traffic, Transfer, Trauma, Treatment, Trespass, Trial, Trooper, Trust U) Unacceptable, Unauthorized, Unclaimed, Unconstitutional, Undercover, Underpaid, Understaffed, Unexpected, Uniform, Unintentional, Unit, Unjust, Unknown, Unlawful, Unsolved, Uphold V) Vagrancy, Vandalism, Viable, Vice, Victim, Victimize, Victory, Vigilante, Violate, Violation, Violence, Volume, Volunteer, Vow, Vulnerable W) Wanted poster, Ward, Warning, Warrant, Weapon, Will, Wiretap, Wisdom, Witness, Worse, Wrong X) X-ray Y) Youth Z) Zeal, Zealous Alphabetry for Police/Law Enforcement (S37)

A) Abide, Abuse, Accessory, Accidental, Accomplice, Accord, Accused, Accuser, Action, Administer, Admission, Adopt, Adversary, Affect, Affidavit, Against, Agency, Agent, Agreement, Alias, Alibi, Alienate, Allegation, Ammunition, APB, Appeal, Appoint, Appraisal, Armed, Armor, Arraignment, Arrest, Arsenal, Arson, Aspect, Assailant, Assault, Assignment, Assistance, Attachment, Attack, Attitude, Authority, Authorize, Autopsy B) Background check, Backup, Badge, Bail, Ballistics, Bankruptcy, Bargain, Base, Basis, Battery, Beat, Behavior, Behind bars, Belief, Blackmail, Bloodstain, Bobby, Bomb squad, Bond, Branch, Breach, Bribery, Briefing, Brutal, Buccal swab, Burden, Burglary C) Capability, Captain, Capture, Case, Caution, Cease fire, Challenge, Character, Cheat, Chief, Circumstances, Citizen, Civil, Claim, Code, Coerce, Collusion, Command, Commission, Commissioner, Commit, Common-law, Community property, Community relations, Community service, Complaint, Complication, Conduct, Confession, Connection, Consent, Consideration, Conspiracy, Constable, Constitution, Contact, Contempt, Control, Controversial, Convict, Conviction, Cooperation, Cop, Coroner, Corruption, Counterfeit, Court, Credit theft, Crime, Criminal, Criminal justice system, Criminology, Cuffs, Custody D) Damage, Danger, Dangerous, Dark side, Data base, Deadly, Deal, Dealings, Decision, Dedication, Deed, Defendant, Defense, Deliberate, Delinquency, Democratic, Denial, Department, Deputy, Detail, Detain, Detection, Detective, Deter, Determination, Deviant, Dignity, Direct, Discovery, Disobedience, Dispatch, Disregard, District attorney, DNA, Documentation, Documents, Domestic, Drill, Drugs, Duty E) Educate, Education, Effect, Embezzle, Emergency, Emphasis, Enable, Encumber, Enforce, Entail, Equality, Equipment, Escape, Ethical, Eviction, Evidence, Examination, Execute, Exonerate, Expert, Expunge, Extort, Extradition, Extreme F) Failure, Fairness, Family, Fatality, Fault, FBI, Federal, Felony, Fight, Fine, Fingerprint, First-degree, Footprints, Force, Forgery, Formal charge, Frantic, Fraud, Freedom, Friend, Full-scale, Fundamental G) Glimpse, Good guys, Government, Grief, Grievance, Guarantee, Guard, Guilty, Gun H) Handle, Harassment, Harmful, Headquarters, Heinous, Helicopter, Helpful, High-powered rifle, High-profile, Hijack, Hire, Holding cell, Holster, Homicide, Honesty, Honor, Hostage, Humanity I) Identification, Illegal, Immoral, Immunity, Impeach, Impression, Imprison, Improper, Inappropriate, Incompetent, Incriminating, Indictment, Influence, Informant, Information, Initiative, Injury, Innocent, Inquest, Instruct, Integrity, Intelligence, Interests, Interference, Interpol, Interpretation, Interrogate, Interstate, Intervention, Interview, Invasive, Investigate, Investigation, Involvement, Irregular, Issue J) Jail, John Doe, Judge, Judgment, Judicial, Judiciary, Jurisdiction, Jury, Justice, Juvenile K) Kidnapping, Kin L) Laboratory, Larceny, Law, Law-abiding, Lawfully, Lawsuit, Leaks, Lease, Legacy, Legal, Legitimate, Lethal, Libel, Liberty, License, Lie detector, Lien, Lieutenant, Limits, Long hours, Lowlife, Loyalty, Lynch M) Mace, Maintain, Majority, Malice, Malpractice, Manacled, Manslaughter, Mayhem, Mentor, Metal detector, Minority, Miscreant, Misdemeanor, Missing person, Mission, Model, Moratorium, Motorist, Murder, Murderer N) Negligent, Negotiable, Negotiate, Neighborhood, Notation, Notification, Nuisance O) Oath, Obedience, Obey, Obligation, Offender, Offense, Officer, Official, Ongoing, Open case, Opinion, Opportunity, Order, Organize, Outage, Ownership P) Partner, Partnership, Patrol, Pattern, Pedestrian, Penalize, Penalty, Perjury, Perpetrator, Petition, Petty theft, Phony, Plainclothes officer, Plead, Police, Police academy, Power, Precedent, Precinct, Preliminary findings, Prevention, Previous, Principle, Prior, Prison, Private, Probable cause, Probation officer, Procedure, Professional, Profile, Proof, Property, Prosecute, Prosecutor, Protection, Protocol, Provision, Public, Punishment Q) Qualification, Quality, Quantify, Quantity, Quarrel, Quell, Question, Quickly, Quirk R) Radar, Raid, Rank, Rap sheet, Reason, Record, Recovery, Recruit, Redress, Reduction, Referendum, Refute, Regulations, Reinforcement, Reject, Repeal, Reported, Reports, Reprobate, Reputation, Requirement, Resist, Responsibility, Restraining order, Restriction, Revenge, Rights, Riot, Robbery, Rogue, Rules, Rulings S) Sabotage, Safeguard, Sanction, Scene, Sealed record, Search and rescue team, Secret, Seize, Selection, Sentence, Sergeant, Seriousness, Services, Sheriff, Shyster, Sighting, Situation, Skillful, Slander, Slaying, Smuggling, Speculation, Squad, Statute, Statute of limitation, Stipulation, Subdue, Subpoena, Successful, Summons, Supervise, Suppress, Surveillance, Survivor, Suspect, Suspected, Suspicion, Suspicious, Sworn, System T) Tactic, Tantamount, Task force, Technique, Testify, Testimony, Threatening, Thwart, Toxicology, Traffic, Transfer, Trauma, Treatment, Trespass, Trial, Trooper, Trust U) Unacceptable, Unauthorized, Unclaimed, Unconstitutional, Undercover, Underpaid, Understaffed, Unexpected, Uniform, Unintentional, Unit, Unjust, Unknown, Unlawful, Unsolved, Uphold V) Vagrancy, Vandalism, Viable, Vice, Victim, Victimize, Victory, Vigilante, Violate, Violation, Violence, Volume, Volunteer, Vow, Vulnerable W) Wanted poster, Ward, Warning, Warrant, Weapon, Will, Wiretap, Wisdom, Witness, Worse, Wrong

X)

Y) Youth

Z) Zeal, Zealous

Alphalary for Spies (385)

A) Account, Action, Affect, Agent, Agitator, Aim, Alerts, Alliance, Allies, Anguish, Appeasing, Arrest, Assets, Atrocity, Attrition, Authority B) Battle, Belligerence, Betray, Blindside, Bloody, Breach, Brutal, Brutality, Bullet C) Cadaver, Captive, Capture, Careen, Carrier, Casualty, Caution, Cautious, Chaos, Charges, Civilian, Clandestine, Clash, Coalition, Collaborate, Collapse, Compassion, Compliance, Comrades, Concentration, Conciliatory, Conflict, Confrontation, Confusion, Consequences, Conspiracy, Conspire, Contact, Control, Coordinate, Coordinates, Corps, Counterespionage, Courageous, Courier, Covert, Crime, Crisis, Cross-hairs, Culpability, Cunning D) Damage, Danger, Dangerous, Dash, Dead, Deadly, Death, Debacle, Defect, Defend, Demoralize, Destroy, Destruction, Detect, Detection, Devastation, Device, Die, Disarray, Disaster, Disastrous, Discipline, Dispatch, Disperse, Dispute, Disrupt, Doomed, Drama, Dread, Duck, Duplicity, Duty E) Effect, Effective, Efforts, Elite, Encounters, Endure, Enemy, Engage, Escape, Espionage, Evacuate, Execute, Execution, Expectations, Exploit, Explosive, Expunge, Exterminate, Extreme F) Factions, Fanatic, Fatal, Fear, Fearless, Fierce, Flee, Force, Forceful, Fray, Frenzy, Fright, Fugitive, Furtive G) Government, Grave, Grenade, Grievous, Groans, Guard, Guerrilla, Guides, Guile, Guns H) Harsh, Hatch, Hate, Hatred, Hazards, Heroic, Heroism, Hide, Hijack, History, Hit, Hit-and-run, Holocaust, Hospitalize, Hostility I) Ignite, Impact, Improvise, Incident, Infer, Infiltrate, Informant, Injuries, Instructions, Intelligence, Intense, Intercept, Interdict, International, Interrogation, Intervene, Intimidate, Invade, Investigate, Investigations, Involvement, Ire J) Join K) Kidnap, Kill, Knock-out L) Lament, Land, Launch, Legacy, Liaison, Liberate, Loathsome, Loyalty M) Maim, Malevolent, Maraud, Massacre, Mayhem, Menace, Military, Mission, Mistreatment, Momentum, Murder, Muscle N) Nationalism, Negotiation, Neutralize, Nightmare, Notorious O) Offensive, Officials, Onerous, Operation, Opposition, Options, Order, Outbreak, Overrun P) Pacify, Paratrooper, Partisan, Patriot, Patriotism, Patrol, Penetrate, Perform, Persecute, Petrify, Photos, Pistol, Position, Potent, Power, Powerful, Preemptive, Premeditated, Pretend, Prison, Prisoner, Provoke, Prowl, Pugnacious Q) Quail, Quarrel, Queasy, Quest, Questions, Quiver R) Rage, Rally, Ready, Reconnaissance, Recover, Recruit, Regime, Reinforces, Relentless, Reprisal, Reputation, Rescue, Resistance, Retaliation, Retribution, Revenge, Revolts, Rift, Rivals, Rot, Ruthless S) Sabotage, Sacrifice, Salvage, Sanction, Savage, Scare, Score, Scramble, Secrecy, Secret, Security, Seize, Seizure, Sense, Setback, Shock, Shoot, Shot, Showdown, Soldiers, Special, Spot, Spy, Stash, Stealth, Storm, Straggler, Strangle, Strategic, Strategy, Strike, Strip, Stronghold, Struggle, Subversive, Suffer, Supplies, Support, Suppress, Surprise, Surrender, Survival, Survivor, Suspect T) Tactics, Target, Tension, Terrain, Terror, Terrorism, Terrorist, Terrorize, Threaten, Thwart, Topple, Torch, Torture, Tourniquet, Tragic, Training, Trampling, Transport, Trap, Trap, Trauma, Trauma, Treachery, Trigger, Triumph U) Unbelievable, Unconventional, Underground, Uniform, Unify, Unite, Unleash, Uprising, Urgency

V) Valiant, Valor, Vanish, Vehicle, Vendetta, Venomous, Versatile, Veteran, Vicious, Victory, Vile, Vilify, Violation, Violence, Virulence, Visionary, Vital, Vitriol, Vow, Vulnerability

W) Wage, War, Warrant, Watch, Watchful, Weapon, Well-trained, Whiz, Wince, Wisdom, Worldwide, Wounds, Wreckage

X) X-ray

Y) Yearn, Yelling

Z) Zealot, Zigzag, Zone

Alphalary for Espionage (268)

A) Ability, Accuracy, Accuse, Action, Adaptation, Agent, Ally, Analysis, Anxiety, Appearance, Apprehend, Approach, Assassinate, Assault, Asset, Award

B) Belief, Betrayal, Bluff, Bodyguard, Bold, Bravery, Breach, Briefing, Bulletproof

C) Cameras, Capture, Caught, Caution, Chances, Chase, Children, Choice, Circumstances, Claim, Clandestine, Clever, Commit, Commitment, Communication, Complications, Concern, Conclusion, Confession, Confide, Confrontation, Connections, Consensus, Consequence, Consider, Conviction, Convincing, Cooperation, Coordination, Counterespionage, Country, Court, Covert

D) Damage, Darkness, Deal, Debrief, Deception, Decode, Deep cover, Details, Discipline, Discovery, Distraction, Double agent, Dramatic, Duplicity, Duress

E) Effective, Elite, Enemy, Enforcement, Equipment, Errors, Espionage, Espy, Estimate, Event, Explosion, Exposure, Exposure

F) Fabricate, Factors, Fear, Feign, Focus, Fool, Force, Forgettable

G) Gamble, Global, Go dark, Goal, Government

H) Hand-picked, Handler, Harm, Hasty, Headquarters, Hidden, High-tech, Honor, Hurt

I) Ideals, Immediate, Impending, Implication, Impregnable, In place, Incident, Independent, Inform, Innocent, Innuendo, Instinct, Insurgent, Intelligence, Intent, Intercept, International, Interrogate, Intrepid, Intrigue, Investigation, Involvement, Issue

J) Jealousy, Judgments, Jury

K) Kidnap, Kill, Knowledge

L) Leak, Leverage, Listen, Location, Loyalty, Lurk

M) Men, Mercy, Microphone, Military, Misleading, Mission, Mistake, Motivation

N) Nasty, Nation, Nefarious, Negotiate, Network, Notorious

O) Objective, Odds, Operation, Opinion, Opportunity, Options, Outrage

P) Patience, Patriot, Patriotism, Penetration, Planning, Plot, Posthumous, Precaution, Priority, Problems, Proceed, Profile, Protection, Protocol, Punishment

Q) Quality, Query, Quest, Questions

R) Raid, Ramification, Ransom, Recourse, Reinforcement, Reports, Reputation, Results, Retreat, Risk, Rumblings, Rumors, Run, Ruthless

S) Scare, Scheme, Scouting, Secret, Security, Seize, Shadows, Shame, Shooting, Situation, Sneaky, Solitary, Solo, Sources, Specifics, Speculation, Spies, Spook, Stalk, State department, Strategy, Strength, Stymied, Success, Surveillance, Survival

T) Target, Team, Testify, Theory, Threats, Torture, Tough, Trade, Trade off, Training, Traitor, Trick, Trouble, Trust

U) Uncover, Underestimate, Understanding, Unexpected, Unique, Unknown, Unleash, Unpleasant, Unsuccessful, Unsure, Useful

V) Value, Verification, Victory, Vigilant, Vulnerable

W) War, Warnings, Warrant, Wireless, Withdraw, Women, Worry, Wrestle

X) X-ray

Y) Years, Young, Youth

Z) Zealous

Alphalary for Terrorists (119)

A) Activity, Agency, Ammunition, Arm supplier, Armed, Arrest, Arson, Audacious, Authorities B) Ballistics, Beliefs, Believe, Belligerent, Bent, Blast, Bloodbath, Bomb maker, Bullets C) Capture, Care, Catch, Caught, Caution, Chase, CIA, Claim, Clandestine, Closed, Clue, Concern, Cover, Criminal, Custody D) Dangerous, Death, Deceive, Deception, Destruction, Detect, Detective, Disappearance, Disclaimer, Discontent, Duplicity E) Enlist F) FBI, Federal, Fight to the death, Forgery

G)

H) Headquarters, Hint

I) Identification, Identify, Illegal, Incendiary, Incident, Innocent, Innuendo, Interest, Interrogation

J)

K) Killing, Known

L) Leanings, Life-threatening, Line-up, Local

M) Marshall, Murder

N) Nation, Network, Notorious

O) Observe, Official, Open, Opportunity

P) Phobia, Poison, Position, Precinct

Q)

R) Rebel, Recruit, Region, Reinforcement, Reward, Rights, Run

S) Safe house, Secret, Security, Shot, State, Stipulation, Surprise, Surrender, Surveillance, Suspect, Suspect, Suspicion T) Tactics, Tattoos, Terrorism, Trail U) Underground, Unknown, Unofficial, Unscrupulous V) Violation, Violence, Vow W) Wanted, Wanted, Warrants, Weapons, Whacked, Worry, Wounds X) X-ray

Y)

Z) Zone

Alphalary for Physics (Science) (281)

A) Absolute zero, Acceleration, Accuracy, Acoustics, Action, Adhesion, Affect, Alteration, Amplitude, Angular, Antiproton, Apparent, Applied, Apply, Aptitude, Aristotle, Aspect, Atmosphere, Atom, Atomic, Attenuate, Attraction, Aviation, Axis B) Bachelor's degree, Balance, Basic, Bodies, Boson, Branch C) Calculus, Capacity, Centrifugal, Changes, Chaos, Charge, Chemical, Chromatics, Circular, Collide, Component, Compression, Condensation, Conductivity, Conservation, Constant, Control, Conversion, Copernicus, Cosmology, Curie D) Damping, Decibel, Density, Dependence, Deposits, Design, Development, Deviation, Diode, Direction, Discipline, Displacement, Distance, Distortion, Disturbance, Doctorate, Drag, Dynamics E) Effect, Einstein, Elasticity, Electricity, Electromagnetic, Electron, Electronics, Emission, Energy, Engine, Engineer, Entropy, Equation, Equilibrium, Equivalent, Evaporation, Expansion, Experiment, Explosion, External F) Factor, Fission, Flight, Flow, Fluid, Flying, Focus, Force, Form, Formula, Frequency, Friction, Fulcrum, Fundamental force G) Galileo, Gas, Generate, Geophysics, Gilbert, Graph, Gravitation, Gravity, Guide, Gyroscope H) Half-life, Harness, Heat, Hertz, Hold, Hydraulics I) Identical, Impact, Impulse, Incandescent, Inertia, Influence, Innovate, Inquiry, Interaction, Intervening, Invention, Inverse, Investigation, Invisible, Irradiate, Isotope J) Joule K) Kaon, Kinetics L) Laser, Laws, Level, Lift, Light, Liquids, Loft, Lumen M) Machinery, Magnet, Magnetism, Magnitude, Mass, Mathematics, Matter, Measure, Mechanics, Meteorology, Metrics, Modulate, Molecule, Motion, Movement N) Navigation, Negative, Newton, Nuclear, Nucleus O) Objects, Optics, Oscillation, Overload P) Parallax, Parity, Particle, Performance, Phenomenon, Photon, Piston, Pitch, Plasma, Position, Prediction, Pressure, Principal, Projectile, Propagation, Properties, Proportion, Psi, Pulse Q) Quality, Quandary, Quanta, Quantitative, Quantity, Quantum jump, Quantum leap, Quark R) Radiation, Radioactivity, Reception, Relationship, Relative, Relativity, Repulsion, Research, Resistance, Resolution, Resonance, Rest, Reversal, Robotic, Rotation S) Saturation, Scalar, Science, Scientific, Seismology, Semiconductor, Shape, Shift, Sir Isaac Newton, Solid, Sonic, Sound, Space, Spectrum, Speed, Standing, Stationary, Statistics, Strain, Stress, Structure, Study, Sublimation, Substance, Surface, Suspension, Symmetry, System T) Temperature, Tensile, Tension, Theoretical, Theory, Thermal, Thermodynamics, Thrust, Torque, Training, Trajectory, Transformation, Transistor, Transition, Trough, Turning U) Ultrasonic, Uncertainty, Uniform, Unify, Unique, Unit, Universal, University V) Vacuum, Value, Vapor, Variable, Variation, Vector, Velocity, Viscosity, Volatile, Voltage, Volume W) Wave, Weight, White noise X) X-ray

Y)

Z) Zone

Alphalary for Soldiers and Military (S76)

A) Account, Advance, Aerial, Afloat, Aggressor, Agitator, Aim, Aircraft, Airfield, Airplane, Alert, Alliance, Allies, Ambush, Ammunition, Anarchy, Anguish, Annihilate, Apartheid, Appeasement, Armament, Armed forces, Armory, Arms, Arsenal, Artillery, Ashore, Assassin, Assassinate, Assault, Atrocity, Attack, Attrition, Authority, Automatic, Award B) Barrage, Barricade, Battalion, Batter, Battle, Battlefield, Bayonet, Belligerent, Betray, Blast, Blindside, Blood, Bloody, Bomb, Bombardment, Booby trap, Breach, Brigade, Brutal, Brutality, Bullet, Bulletproof, Bunker, Burn, Bury C) Cadaver, Camouflage, Campaign, Cannon, Captive, Captive, Capture, Carbine, Carcass, Careen, Cargo, Carnage, Carrier, Casualties, Cataclysm, Caution(ary), Cautious, Chaos, Charge, Charred, Checkpoint, Chief, Chopper, Civilian, Clandestine, Clash, Coalition, Collapse, Combat, Combat, Command(or), Commandos, Compassion, Compliance, Concentration, Conciliatory, Concussion, Confident, Conflagration, Conflict, Confrontation, Confusion, Conquer, Conscript, Conscription, Consequences, Consolidate, Conspiracy, Conspire, Control, Convoy, Coordinate, Coordinates, Corps, Corpse, Counter-mine, Counterattack, Countermand, Courageous, Crisis, Cross-hairs, Culpability D) Damage, Danger, Dangerous, Dash, Dead, Deadly, Death, Debacle, Debris, Decline, Defect, Defend, Defense, Defensive, Demolish, Demoralization, Deploy, Desertion, Despot, Destroy, Destruction, Detect, Detection, Detente, Devastation, Device, Dictator, Die, Disarmament, Disarray, Disaster, Disastrous, Discipline, Dismantle, Dispatch, Disperse, Dispute, Disruption, Dissonance, Dominate, Doomed, Downfall, Drama, Dread, Drone, Duck, Duty E) Education, Elite, Encounter, Endurance, Endure, Enemy, Enforcement, Engagement, Enlist, Escalation, Escape, Evacuate, Evacuee, Excess, Execute, Execution, Exercise, Expectations, Explode, Exploitation, Explosion, Explosive, Expunge, Extremism F) Faction, Fanatic, Fatal, Fear, Fearless, Ferment, Ferocious, Feud, Fierce, Fiery, Fight, Fighter, Flank, Flee, Flight, Force, Forceful, Forces, Fortification, Foxhole, Fray, Frenzy, Fright, Front lines, Fuel, Fugitive, Furtive, Fusillade G) Garrison, Gas, Generator, Genocide, Germ warfare, Government, Grave, Grenade, Grievous, Groans, Guard, Guerilla, Guided bombs, Guns, Gunship H) Hammering, Harsh, Hatch, Hate, Hatred, Hazards, Helicopter, Hero, Heroic, Heroism, Hide, Hijack, Hijacker, Hit, Hit-and-Run, Holocaust, Horses, Hostility, Howitzer I) Ignite, Impact, Improvise, Incident, Incite, Incontrovertible, Infantry, Inferred, Infiltrate, Inflame, Informant, Injuries, Instructions, Insurgent, Insurrection, Intelligence, Intense, Intercept, Interdiction, International, Interrogation, Intervene, Intimidate, Invasion, Investigate, Investigations, Involvement, Ire J) Jeer, Jets, Join K) Keening, Kidnap, Kill, Knives, Knock-out L) Lamentation, Land mines, Laser-activated, Launch, Launcher, Legacy, Liaison, Liberate, Liberation, Liberators, Loathsome, Loss, Loyalty M) Machine guns, Machines, Maim, Malevolent, Malicious, Maraud, March, Massacre, Mayhem, Medal, Megalomania, Menacing, Militancy, Militant, Militaristic, Military, Militia, Mines, Missile, Mission, Mistreatment, Mobile, Mobilization, Momentum, Mortars, Munitions, Murder, Muscle, Musket, Mustard gas N) Nationalist, Negotiation, Neutralize, Nightmare, Nitrate, Notorious O) Offensive, Officials, Onerous, Operation, Opposition, Order, Outbreak, Overrun, Overthrow P) Pacifist, Parade, Paramedics, Partisan, Patriot, Patriotism, Patrol, Peacekeeping, Penetration, Performance, Persecute, Petrify, Photos, Pilot, Pistol, Planes, Platoon, Plunder, Position, Post-traumatic, Potent, Pounds, Powder, Power, Powerful, Preemptive, Premeditate, Prey, Prison, Prisoner, Proliferation, Protection, Provocation, Prowl, Pugnacious, Pulverize

Q) Quail, Quake, Queasy, Quell, Quiver

R) Radiation, Radical, Rage, Rally, Ravage, Ravish, Readiness, Rebel, Rebellion, Reconnaissance, Recovery, Recruitment, Red Cross, Reform, Refugee, Regime, Regiment, Reinforcements, Relentless, Reparation, Reprisal, Reputation, Rescue, Resistance, Retaliation, Retreat, Retribution, Revenge, Revolution, Ricochet, Rifle, Rift, Rival, Rocket, Rot, Rounds, Rule, Ruthless

S) Sabotage, Sacrifice, Salvage, Sanction, Savage, Scare, Score, Scramble, Secrecy, Secret, Security, Sedition, Seize, Seizure, Sensors, Setback, Shelling, Shells, Shock, Shoot, Shot, Showdown, Siege, Skirmish, Slaughter, Smuggle, Soldier, Special-ops, Specialized, Spokesman, Spotter, Spy, Spy satellite, Squad, Stash, Stealth, Storage, Storm, Straggler, Strangle, Strategic, Strategist, Strategy, Strife, Strike, Strip, Stronghold, Struggle, Submarine, Subversive, Suffering, Superstition, Supplies, Support, Suppression, Surprise, Surrender, Survival, Survivor, Suspect, Sword

T) Tactics, Tank, Target, Tension, Terrain, Terror, Terrorism, Terrorist, Terrorize, Threaten, Thwart, Tolerate, Topple, Torch, Torpedo, Tourniquet, Tragic, Training, Trampling, Transportation, Trap, Trauma, Treachery, Trench, Trigger, Triumph, Troops, Turbulent

U) Ultimate, Unbelievable, Unconventional, Uniform, Unify, Unit, Unite, Universal, Unleash, Uprising, Urgency

V) Valiant, Valor, Vanguard, Vanish, Vehicle, Vehicular, Vendetta, Venomous, Versatile, Veteran, Vicious, Victory, Vile, Vilify, Violation, Violence, Virulence, Vision, Visionary, Vital, Vitriol, Vociferous, Void, Vow, Vulnerability

W) Wage, War, Warheads, Warplane, Warrant, Warrior, Watchdog, Watchful, Weapon, Well-trained, Whiz, Wince, Wisdom, Worldwide, Wounds, Wreckage

X) X-ray

Y) Yearn, Yelling

Z) Zealot, Zeppelin, Zigzag, Zone

Alphalary for Legal terms (359)

A) Abandonment, Abolish, Abridge, Accessory, Accomplice, Accord, Accused, Acquisitions, Acquittal, Action, Adjournment, Administer, Adoption, Affect, Affidavit, Agency, Agent, Agreement, Alias, Alibi, Alienation, Alimony, Amend, Amendment, Annulment, Appeal, Appoint, Appraisal, Arraignment, Arson, Aspect, Assault, Assembly, Assistance, Attachment, Attitude, Authorize, Autopsy B) Bail, Bankrupt, Basis, Battery, Before the bar, Belief, Bench, Bill, Blackmail, Bond, Branch, Breach, Bribery, Brief, Burden, Burglary, Business law C) Case number, Challenge, Civil, Civil action, Claim, Code, Codicil, Coercion, Collusion, Commercial, Commission, Committal, Common-law, Community property, Compensation, Complainant, Complication, Conduct, Confession, Conglomerate, Consent, Consideration, Conspiracy, Constitution, Contempt, Contract, Copyright, Coroner, Corporate, Corporation, Costly, Counsel, Counterfeit, Court, Credit, Crime, Criminal D) Damages, Deal, Dealings, Debt, Decision, Decree, Deed, Defendant, Defense, Deliberate, Democratic, Denial, Deposition, Desertion, Determination, Disobedience, Disregard, Divorce, Document, Documentation, Draft, Due process E) Easement, Edict, Educate, Effect, Embezzle, Eminent domain, Emphasis, Enable, Encumber, Enforce, Entail, Equality, Escrow, Estate, Ethics, Eviction, Evidence, Examination, Excessive, Executor, Expert, Extort, Extradition, Extreme F) Failure, Fairness, Family, Federal, Fee, Felony, Fines, Forgery, Fraud, Freedom, Fundamental, Funds G) Garnishment, Govern, Guarantee, Guaranty, Guardian, Guilty H) Habeas corpus, Harmful, Heir, High-ranking, Hijack, Homicide, Honor I) Impartial, Imprison, Incompetent, Indictment, Influence, Inform, Inheritance, Initiative, Injunction, Injury, Inquest, Interests, Interference, Interpretation, Interstate, Issue J) Jeopardy, John Doe, Joint tenancy, Judge, Judgment, Judicial, Jurisprudence, Jury, Justice, Juvenile K) Kidnapping, Kin L) Larceny, Law, Lawfully, Lawsuit, Lease, Legacy, Legal, Legal assistance, Legislation, Liability, Libel, Liberty, License, Lien, Limits, Litigation, Loan, Lynch M) Majority, Malice, Malpractice, Manslaughter, Mayhem, Merger, Minority, Misdemeanor, Moratorium, Mortgage, Murder N) Natural law, Negligent, Negotiable, Notation, Notice, Nuisance O) Oath, Obedience, Obey, Obligation, Offense, Official, Opinion, Organize, Out-dated, Overturn, Ownership P) Paralegal, Partnership, Patent, Penalize, Penalty, People, Perjury, Petition, Power, Power of attorney, Practice, Pre-law, Precedent, Press, Previous, Principle, Prior, Prison, Private, Probable cause, Probate, Probate, Professional, Prohibit, Proof, Property, Prosecute, Prosecutor, Protection, Provision, Public, Punishment Q) Qualification, Quality, Quantify, Quantity, Question, Quirk, Quorum R) Rate, Reasoning, Receiver, Redress, Reduction, Referendum, Refute, Regulate, Rejection, Religion, Repeal, Reputation, Resist, Responsibility, Restriction, Reverse, Rights, Robbery, Rules, Rulings S) Sabotage, Safeguard, Sanction, Sealed record, Security, Selection, Seriousness, Services, Skillful, Slander, Smuggling, Special-interest, Standard, Statute, Statute of limitation, Subpoena, Suit, Summons, System T) Tenant, Testament, Testimony, Title, Tort, Trademark, Tradition, Transfer, Treason, Treatment, Treaty, Trespass, Trial, Trial by jury, Trust, Trustee U) Unalienable, Unauthorized, Unclaimed, Unconstitutional, Unintentional, Unjust, Unlawful, Uphold, Usury V) Vagrancy, Vandalism, Verdict, Veto, Victim, Victimize, Violate, Violation, Volume W) Ward, Well-developed, Will, Wisdom, Witness, Writ, Wrong

X)

Y) Youth

Z) Zeal

Alphalary for Crime (888)

A) Abuse, Accessory, Accomplice, Accused, Accuser, Activists, Adversary, Affect, AFIS, Against, Agency, Aggravated assault, Alarm, Alcohol, Alert, Alias, Alibi, Alienate, Allegation, Ammunition, APB, Appeal, Armed, Arraignment, Arrest, Arsenal, Arson, Art forgery, Assailant, Assault, Attack, Authority, Autopsy B) Background check, Backup, Bail, Ballistics, Battery, Beat, Behavior, Behind bars, Belligerence, Big house, Blackmail, Bloodstain, Bombing, Brawl, Breach, Break-in, Breaking and entering, Bribery, Brutality, Bullying, Burden of proof, Burglary, Bystander C) Capture, Case, Caution, Chase, Cheat, Civil, Claim, Coercion, Collusion, Combat, Commission, Commit, Complaint, Complication, Conduct, Confession, Connection, Conspiracy, Contact, Contacts, Contempt, Control, Controversial, Conviction, Cops, Coroner, Corruption, Counsel, Counterfeit, Court, Credit theft, Crime, Criminal, Criminal justice system, Criminology, Cuffs, Custody D) Damage, Danger, Dangerous, Dark side, Data base, Deadly, Deal, Dealings, Death, Deed, Defendant, Defense, Deliberate, Delinquency, Democratic, Denial, Department, Deputy, Detail, Detain, Detection, Detective, Deter, Determination, Deviant, Direct, Discovery, Dismember, Disobedience, Disorderly, Dispatch, Disregard, Disruption, District attorney, DNA, Documentation, Documents, Domestic, Dossier, Drill, Drugs, Duty E) Educate, Education, Effect, Elusive, Embezzle, Emergency, Enable, Encumber, Enforce, Entail, Equality, Escape, Ethical, Evasive, Eviction, Evidence, Evil, Examination, Execute, Exonerate, Expert, Explosives, Expunge, Extort, Extradition, Extreme F) Failure, Fairness, Family, Fatality, Fault, FBI, Federal, Felony, Ferocity, Fight, Fighting, Fine, Fingerprint, Firebombing, First-degree, Flee, Footprints, Forbidden, Force, Forensics, Forgery, Formal charge, Frantic, Fraud, Freedom, Full-scale, Fundamental, Furtive G) Good guys, Gory, Government, Grief, Grievance, Guarantee, Guard, Guilty, Gun, Gunrunning H) Hand-to-hand, Handcuffs, Handle, Harassment, Harm, Harmful, Headquarters, Heinous, Helicopter, Help, Helpful, High-powered rifle, High-profile, Hijack, Hire, Holding cell, Holster, Homicide, Honesty, Honor, Hostage, Hot-line, Humanity I) Identification, Illegal, Immoral, Immunity, Impeach, Impression, Imprison, Improper, Incarceration, Incompetent, Incriminating, Indictment, Influence, Informant, Information, Initiative, Injury, Inmate, Innocence, Innocent, Inquest, Instruct, Integrity, Intelligence, Interests, Interference, International, Interpol, Interpretation, Interrogate, Interrogate, Interstate, Intervention, Interview, Intrastate, Intruder, Invasive, Investigate, Investigation, Irregular, Irresponsible, Issue J) Jail, John Doe, Judge, Judgment, Judicial, Judiciary, Jurisdiction, Jury, Justice, Juvenile K) Kidnapping, Kill, Killer, Kin L) Laboratory, Larceny, Law, Law-abiding, Lawfully, Lawsuit, Lawyer, Leaks, Lease, Legal, Legislation, Legitimate, Lethal, Libel, Liberty, License, Lie detector, Lien, Lieutenant, Limits, Long hours, Lowlife, Loyalty, Lynch M) Mace, Maintain, Majority, Malice, Malpractice, Manacled, Manslaughter, Marshal, Mayhem, Metal detector, Minor, Minority, Miscreant, Misdemeanor, Missing person, Mission, Model, Money laundering, Moratorium, Motorist, Murder, Murderer N) National, Negligent, Negotiable, Negotiate, Neighborhood, Network, Nine-one-one, Notation, Notification, Nuisance O) Oath, Obey, Obligation, Offender, Offense, Officer, Official, On-going, Open case, Opinion, Opportunity, Order, Organize, Ownership P) Partner, Partnership, Pathology, Patrol, Pattern, Pedestrian, Peeping Tom, Penalize, Penalty, Perjury, Perpetrator, Petition, Petty theft, Phony, Plainclothes officer, Plea, Plead, Police, Policy, Power, Precedent, Precinct, Preliminary findings, Prevention, Principle, Prior, Prison, Private, Probable cause, Probation, Probation officer, Procedure, Professional, Profile, Prohibit, Proof, Property, Prosecute, Prosecutor, Prostitution, Protection, Protocol, Provision, Public, Punishment Q) Quake, Qualification, Quality, Quantify, Quantity, Quarrel, Quell, Question, Quickly, Quirk, Quiver R) Radar, Raid, Rank, Rap sheet, Rape, Reason, Reckless endangerment, Record, Recovery, Recruit, Redress, Reduction, Refute, Register, Regulations, Reinforcement, Reject, Release, Repeal, Reported, Reports, Reprobate, Reputation, Requirement, Resist, Responsibility, Restitution, Restraining order, Restriction, Revenge, Rights, Riot, Robbery, Rogue, Rough, Rules, Rulings S) Sabotage, Safeguard, Sanction, Scene, Sealed record, Search and rescue team, Secret, Seize, Seizure, Selection, Sentence, Sergeant, Serial killer, Seriousness, Services, Sex crimes, Shackles, Sheriff, Shooting, Shyster, Sighting, Situation, Skillful, Slander, Slashing, Slaying, Smuggling, Sorrow, Speculation, Spying, Squad, Stabbing, Stalking, Statute, Statute of limitation, Stigma, Stipulation, Subdue, Subpoena, Successful, Summons, Supervise, Suppress, Surveillance, Survivor, Suspect, Suspected, Suspicion, Suspicious, Sworn, System T) Tactic, Task force, Terrorism, Testify, Testimony, Theft, Threatening, Three-strikes law, Thwart, Tire-slashing, Torture, Toxicology, Trace, Traffic, Trafficking, Tragedy, Transfer, Trauma, Treatment, Trespass, Trial, Trooper, Trust U) Unacceptable, Unauthorized, Unclaimed, Unconstitutional, Undercover, Underpaid, Understaffed, Unexpected, Unharmed, Uniform, Unintentional, Unit, Unjust, Unknown, Unlawful, Unsolved, Uphold V) Vagrancy, Vandalism, Viable, Vice, Victim, Victimize, Victory, Vigilance, Vigilante, Violate, Violation, Violence, Volunteer, Vow, Voyeurism, Vulnerable W) Wanted poster, Ward, Warning, Warped, Warrant, Watch, Weapon, Will, Wiretap, Wisdom, Witness, Worse, Wrong

X)

Y) Youth

Z) Zeal, Zealous

Alphalary for Emotions, Feelings, Mood (209)

A) Abandonment, Adaptable, Addictive, Admiration, Adorable, Affectionate, Aggravate, Aggressive, Agitated, Alive, Angry, Angst, Annoyed, Anticipate, Anxiety, Appreciated, Arrogance, Ashamed, Authoritative, Awe, Awful

B) Belligerent, Bitter, Blue, Blunt, Bold, Bonding, Bored, Brilliant, Brutal, Bullying

C) Callous, Caring, Cautious, Cheerful, Clever, Cognizant, Combative, Comical, Compassionate, Conflicted, Contemptuous, Content, Contrary, Cool, Coping, Cordial, Covetous, Cranky, Creative, Cross, Cruelty, Curious

D) Dainty, Defeated, Defiant, Dejected, Delight, Dependent, Depressed, Despair, Devoted, Disagreeable, Disciplined, Discontent, Disgust, Disturbed, Doubtful, Driven, Dutiful, Dynamic

E) Elated, Enraged, Enthused, Enthusiastic, Envy, Evil, Excited, Exhausted

F) Fear, Fierce, Forgiving, Frustrated, Furious

G) Gay, Generous, Gentle, Grateful, Gratified, Greedy, Grieving

H) Happy, Harsh, Hatred, Haughty, Heroic, Honest, Hopeful, Horror, Hostile

I) Ignored, Impartial, Impatient, Impulsive, Inconsiderate, Innocent, Inquisitive, Insensitivity, Inspired, Instinctive, Intolerance, Intuitive, Irritate, Isolated

J) Jealous, Joyful

K) Kind

L) Lively, Lonely, Lost, Loving, Lucky

M) Mad, Malice, Mean, Meek, Mollified, Motivated

N) Nasty, Natural, Naughty, Negative, Nurturing

O) Obnoxious, Obstinate, Optimistic, Outraged, Outstanding

P) Pain, Panic, Patient, Perceptive, Perky, Perturb, Pessimistic, Pity, Positive, Powerful, Pride

Q) Quaking, Quirky, Quivering

R) Rage, Raw, Realistic, Relaxed, Reliable, Relief, Reluctant, Repentant, Repulsive, Resent, Resigned, Restrained, Reverent, Rough, Rude

S) Satisfy, Scornful, Sensitive, Sentimental, Severe, Shame, Sick, Silly, Skillful, Sorrow, Spite, Stubborn, Sure, Surprise, Sweet

T) Tame, Tempted, Tender, Tense, Terrified, Terse, Tired

U) Unbalanced, Uncertain, Understood, Unhappy

V) Valiant, Victorious, Vindictive, Violent, Vocal, Vociferous

W) Wary, Weary, Wicked, Wise, Wonder, Worrier, Worthy, Wrath youthful

X)

Y)

Z) Zeal

Alphalary for Technology Terms (320)

A) Access, Account, Activity, Administrative, Advantage, Advertisements, Animate, Applications, Art, Attachment, Audience B) Back up, Bandwidth, Banner, Basics, Benefit, Blog, Blue tooth, Bookmarks, Boot up, Broadband, Browser, Bugs, Bytes C) CAD, CAM, Camcorder, Camera, Capabilities, Capacity, Capture, Careers, CD, Cellular phone, Challenges, Chips, Click, Clip art, Codes, Compilation, Complex, Computer, Concerns, Connection, Connectivity, Cookies, Copyright, Crash, Curriculum, Cursor, Cyberspace D) Daemon, Data, Database, Debug, Decipher, Default, Delivery, Dependency, Design, Designation, Desktop, Develop, Digital, Direction, Disadvantage, Disk, Display, Distance learning, Domain name, Download, Drag, Drive E) E-mail, Edit, Educate, Effective, Efficiency, Efficient, Electronic, Electronics, Elements, Emerging, Encapsulate, Engage, Enhancement, Enrichment, Escape, Ethernet, Evaluate, Exact, Execute, Exemplary, Explore, Exposure F) Face Book, Fax, Fiber optic, Field, File, Film, Firewalls, Flexibility, Floppy disk, Focus, Font, Format, Freeware, Function key G) Geek Squad, Generate, GIF, Gradual, Graphics, Grid H) Hackers, Hand-held, Hard disk, Hard drive, Hardware, Help desk, History, Hits, Home page, Host, House, Hypertext I) Icons, Infiltrate, Information, Informative, Innovation, Innovative, Input, Instant messaging, Instruction, Integrate, Interface, Internet, Intranet, Investigate, Involve, IPAD, Issues J) Job, Join, Journalism, Journalist, Joystick, JPEG, Junk mail K) Keep track of, Keyboard, Keypad, Keyword, Kind, Knowledge L) Landscape, Laptop, Laser, Layout, Learning, Link, Listserv, Literate, Load, Log in, Log off M) Mainframe, Market, Material, Matrix, Measurement, Media, Media specialist, Megabyte, Memory, Message, Method, Misuse, Modem, Monitor, Mouse, Movie, Multi-tasking N) Navigate, Networks, New, Newsgroup, Newspaper O) Obsession, Off-line, On line, Operate, Operating system, Operation, Opportunity, Opt out, Option, Output, Overall, Overhead P) Password, Performance, Personal, Phishing, Photography, Pixel, Popularity, Positive, Printer, Privacy, Problems, Processor, Product, Program, Programmer, Project, Projector, Promote, Protocol, Public domain, Purge Q) Quality, Quantity, Query, Questions, Queue, Quick R) Radio, Random, Ranking, Rate, Record, Refer, Reference, Registry, Regulate, Relevancy, Remote, Repair, Reproduce, Research, Reserve, Resolution, Resource, Retrieval, Return to sender, Revenue, Review, Rom S) Safety, Satellite, Save, Scan, Screen, Screen saver, Script, Search, Search engine, Security, Select, Share, Skills, Software, Source, Spam, Speed, Spy-ware, Statistics, Store, Support, Surf, Symbol, System T) Tech, Technology, Technophobic, Telecommunication, Telemarketer, Telephone, Television, Terminal, Terms, Tools, Topic, Trackball, Trivia U) U Tube, Uncover, Understanding, Unusual, Update, Upload, User ID, User name, User-friendly, Usual V) Value, Variety, Various, Video, Video conference, Virtual, Virus, Vision, Visual W) Warranty, Wave, Web master, Web page, Web site, Windows, Wireless, Word, World Wide Web, Worldwide

X)
Y) Youth
Z) Zealous, Zoom

Alphalary for Money terms commonly used (307)

A) Account, Accounting, Accrue, Accumulate, Advance, Asset, Assist, Authorization, Automated, Average

B) Balance, Balloon payment, Bank, Bankrupt, Barter, Bear market, Bearer, Beneficiary, Bills, Bonds, Borrow, Broker, Bull market, Buy

C) Calculate, Capital, Cashier, Changes, Checking account, Checks, Circulate, Coin, Collateral, Collect, Compensate, Compound, Consumer, Convert, Correct, Cost, Counter, Countersign, Crash, Credit, Currency

D) Debit, Debt, Deduct, Delinquent, Demand, Deposit, Discount, Diversify, Dividend, Dow Jones Average, Due, Duty

E) Earnings, Economy, Electronic, Embezzle, Endorse, Equity, Estimate, Evaluate, Exceed, Excise, Exempt, Expectation, Expenses

F) Federal, Fees, Fiduciary, Figures, Finance, Financing, Fiscal, Foreclosure, Fortune, Frugal, Funds

G) Gold, Government, Growth, Guarantee

H) Hiring

I) Identification, Illegal, Imprint, Income, Inflation, Insider information, Insolvent, Installment, Insufficient, Interest, Interest, Interest-bearing, Investment, IOU, IRA

J) Joint account

K) Keogh plan, Kiting

L) Lend, Lending rate, Liability, Lien, Liquidity, Loan, Long-term, Low risk

M) Maintain, Margin, Market, Money, Money laundering, Monopoly, Municipal bonds, Mutual funds

N) Negotiable, Net worth, Note, NYSE

O) Obligation, Officer, Online, OTC (over the counter), Oversight, Ownership

P) Payment, Percent, Planning, Points, Portfolio, Practice, Preferred stock, Premium, Prepayment penalty, Principal, Product, Profit, Promissory note

Q) Qualms, Quantity

R) Rate, Receipt, Recession, Records, Recourse, Redeem, Reduction, Regulations, Regulations, Reimburse, Reliability, Reserve, Retirement, Risks

S) Safety deposit box, Savings, Securities, Select, Sell, Shares, Shylock, Slump, Solvent, Speculate, Speculative, Split, Statement, Stock split, Stocks, Summary

T) Takeover, Tax shelter, Tax year, Tax-exempt bond, Taxes, Ticker tape, Trade, Transactions, Transfer, Treasury bill, Trends

U) Uncollected, Underwrite, Unofficial, Unregulated, Unsecured, Untaxed, Usury, Utilities

V) Valuable, Value, Value, Vault, Venture, Void, Voucher

W) Wage, Wide-ranging, Withdrawal

X)

Y) Yield

Z) Zero-coupon bond

Returning to FIG. 21, when the sentence-by-sentence analysis 2106 is completed for a missive, category estimator 2104 moves on to a paragraph-by-paragraph analysis 2140. When paragraph-by-paragraph analysis 2140 finishes for the missive, category estimator 2104 moves on to a missive analysis 2142. When missive analysis 2142 is complete, category estimator 2104 moves on to a sender (and their peers) analysis 2144. When the sender analysis 2144 is complete, category estimator 2104 concludes with a recipient (and their peers) analysis 2146. Smart agents are employed for each of the senders and recipients, e.g., to rate this message against past behaviors recorded in their respective profiles. In a so-called Bayesian Analysis, such is known as the "prior probability". Prior probabilities are usually based on previous experiences.

The products of category estimator 2104 are correlated to each sentence, each paragraph, each missive, each sender, and each recipient. From this, it could be correlated that a particular sender frequently or only communicates with particular recipients on selected categories, unrelated to what is communicated in other communications to other recipients. Or just the opposite, this sender communicates the same categories to all their recipients. Either result will be telling. The insights obtained could be used to flag an adjustment to the intensity of the scrutiny being applied. In other words, moved to a higher priority and cost level with benefits expected that would warrant the move.

Once the category of the message is estimated, a sentiment analysis 2150 has a much better opportunity to succeed. Conventional sentiment analysis machines often fail because the subject category is lost on them or otherwise not understandable. Here sentiment analysis 2150 will rate each sentence, paragraph, missive, and message sender as positive, neutral, or negative. (Some senders could spew only hate and violence in every communication to every recipient, thus resulting in them being placed on a watchlist or a blacklist.)

The basics described here make possible further more refined embodiments of the present invention that would be useful for applications in the following areas:

1. Insider Threats
2. identify reliable, relevant intelligence sources
3. classify text communications
4. Sharing confidential information
5. Protecting IP (Business) from getting sent out
6. Detecting spam email
7. Realtime one-to-one Advertising
8. Social Media (Facebook) . . . understanding sentiment of chats
9. Search engine (google) . . . better search engine
10. Adult Protection
11. Reputation
12. Assigning sentiment to themes
13. determining a meaning of a document to match the document to content
14. tuning of natural language interaction applications and voice recognition
15. Protecting the stealing, emailing of important documents
16. thematic clustering
17. semantic processing of text
18. Text segmentation Although particular embodiments of the present invention have been described and illustrated, such is not intended to limit the invention. Modifications and changes will no doubt become apparent to those skilled in the art, and it is intended that the invention only be limited by the scope of the appended claims.

What is claimed:

1. A computer network server for context analysis of a plurality of messages each having a sender and a recipient, the server comprising:
    one or more processors;
    non-transitory computer-readable storage media having computer-executable instructions stored thereon, wherein when executed by the one or more processors the computer-readable instructions cause the one or more processors to—
        automatically receive the plurality of messages, each of the plurality of messages including recipient-identifying information, sender-identifying information, and a payload comprising words;
        automatically perform an identification process for identification of the sender and the recipient for each of the plurality of messages based respectively on the corresponding sender-identifying information and recipient-identifying information;
        automatically retrieve a plurality of sender smart agents and a plurality of recipient smart agents corresponding respectively to each identified sender and recipient, said smart agents comprising behavior profiles including historical data derived respectively from prior messages of the corresponding sender and recipient and each of the sender behavior profiles defining at least one word choice proclivity of the corresponding sender based on the corresponding historical data derived from the respective prior messages of the sender;
        automatically identify a plurality of keywords within each of the plurality of messages;
        automatically generate metadata comprising a plurality of candidates for definitions and uses for each of the keywords of each of the plurality of messages;
        automatically analyze the metadata of the plurality of keywords for each of the plurality of messages with the retrieved pluralities of sender smart agents and recipient smart agents to identify a likely subject for each corresponding message, the metadata analysis for each of the plurality of messages including using the at least one word choice proclivity of the corresponding sender to evaluate the plurality of candidates for and to disambiguate at least one of the keywords in the message, the disambiguation for the at least one of the keywords including determining an increased confidence in one or more of the corresponding plurality of candidates relative to other of the corresponding plurality of candidates based on the at least one word choice proclivity of the corresponding sender;
        automatically determine a sentiment based at least in part on the likely subject of each corresponding message;
        automatically adjust priority levels respectively associated with at least some of the plurality of messages based at least in part on the corresponding identified likely subjects and determined sentiments.

2. The computer network server of claim 1, wherein the metadata analysis of each message includes automatically ordering the plurality of candidates for each of the plurality of keywords according to probability of use.

3. The computer network server of claim 2, wherein the automatic ordering of the plurality of candidates is based at least in part on the presence or absence of other keywords within the same message of the plurality of messages.

4. The computer network server of claim 1, wherein the identification of a likely subject of each message includes—
automatically comparing the corresponding plurality of keywords against a category alphalary corresponding to a potential subject category, the category alphalary including an exclusion word,
automatically eliminating the potential subject category from being considerable as the likely subject based on matching of one of the plurality of keywords to the exclusion word.

5. The computer network server of claim 1, wherein the identification of a likely subject of each message includes—
automatically comparing the corresponding plurality of keywords against a category alphalary corresponding to a potential subject category, the category alphalary including a high frequency use word,
automatically raising a ranking for consideration of the potential subject category as the likely subject based on matching of one of the plurality of keywords to the high frequency use word.

6. The computer network server of claim 1, wherein the plurality of candidates of a keyword of the plurality of keywords of one of the plurality of messages are retrieved by matching the keyword of the plurality of keywords to a corresponding smart agent, the corresponding smart agent being assigned to the keyword and including attributes describing alternative definitions and uses for the keyword of the plurality of keywords.

7. The computer network server of claim 1, wherein the computer-readable instructions, when executed by the one or more processors the computer-readable instructions, further cause the one or more processors to, for each of the plurality of messages—
automatically update the behavior profiles of the pluralities of smart agents of the identified sender and recipient based on the identified likely subject and the determined sentiment.

8. Non-transitory computer-readable storage media having computer-executable instructions for context analysis of a plurality of messages each having a sender and a recipient, wherein when executed by at least one processor the computer-readable instructions cause the at least one processor to:
automatically receive the plurality of messages, each of the plurality of messages including recipient-identifying information, sender-identifying information, and a payload comprising words;
automatically perform an identification process for identification of the sender and the recipient for each of the plurality of messages based respectively on the corresponding sender-identifying information and recipient-identifying information;
automatically retrieve a plurality of sender smart agents and a plurality of recipient smart agents corresponding respectively to each identified sender and recipient, said smart agents comprising behavior profiles including historical data derived respectively from prior messages of the corresponding sender and recipient and each of the sender behavior profiles defining at least one word choice proclivity of the corresponding sender based on the corresponding historical data derived from the respective prior messages of the sender;
automatically identify a plurality of keywords within each of the plurality of messages;
automatically generate metadata comprising a plurality of candidates for definitions and uses for each of the keywords of each of the plurality of messages;
automatically analyze the metadata of the plurality of keywords for each of the plurality of messages with the retrieved pluralities of sender smart agents and recipient smart agents to identify a likely subject for each corresponding message, the metadata analysis for each of the plurality of messages including using the at least one word choice proclivity of the corresponding sender to evaluate the plurality of candidates for and to disambiguate at least one of the keywords in the message the disambiguation for the at least one of the keywords including determining an increased confidence in one or more of the corresponding plurality of candidates relative to other of the corresponding plurality of candidates based on the at least one word choice proclivity of the corresponding sender;
automatically determine a sentiment based at least in part on the likely subject of each corresponding message;
automatically adjust priority levels respectively associated with at least some of the plurality of messages based at least in part on the corresponding identified likely subjects and determined sentiments.

9. The non-transitory computer-readable storage media of claim 8, wherein the metadata analysis of each message includes automatically ordering the plurality of candidates for each of the plurality of keywords according to probability of use.

10. The non-transitory computer-readable storage media of claim 9, wherein the automatic ordering of the plurality of candidates is based at least in part on the presence or absence of other keywords within the same message of the plurality of messages.

11. The non-transitory computer-readable storage media of claim 8, wherein the identification of a likely subject of each message includes—
automatically comparing the corresponding plurality of keywords against a category alphalary corresponding to a potential subject category, the category alphalary including an exclusion word,
automatically eliminating the potential subject category from being considerable as the likely subject based on matching of one of the plurality of keywords to the exclusion word.

12. The non-transitory computer-readable storage media of claim 8, wherein the identification of a likely subject of each message includes—
automatically comparing the corresponding plurality of keywords against a category alphalary corresponding to a potential subject category, the category alphalary including a high frequency use word,
automatically raising a ranking for consideration of the potential subject category as the likely subject based on matching of one of the plurality of keywords to the high frequency use word.

13. The non-transitory computer-readable storage media of claim 8, wherein the plurality of candidates of a keyword of the plurality of keywords of one of the plurality of messages are retrieved by matching the keyword of the plurality of keywords to a corresponding smart agent, the corresponding smart agent being assigned to the keyword and including attributes describing alternative definitions and uses for the keyword of the plurality of keywords.

14. The non-transitory computer-readable storage media of claim 8, wherein, when executed by the one or more processors, the computer-readable instructions further cause the one or more processors to, for each of the plurality of messages— automatically update the behavior profiles of the pluralities of smart agents of the identified sender and recipient based on the identified likely subject and the determined sentiment.

15. A computer-implemented method for context analysis of a plurality of messages each having a sender and a recipient comprising, via one or more transceivers and/or processors:
automatically receiving the plurality of messages, each of the plurality of messages including recipient-identifying information, sender-identifying information, and a payload comprising words;
automatically performing an identification process for identification of the sender and the recipient for each of the plurality of messages based respectively on the corresponding sender-identifying information and recipient-identifying information;
automatically retrieving a plurality of sender smart agents and a plurality of recipient smart agents corresponding respectively to each identified sender and recipient, said smart agents comprising behavior profiles including historical data derived respectively from prior messages of the corresponding sender and recipient and each of the sender behavior profiles defining at least one word choice proclivity of the corresponding sender based on the corresponding historical data derived from the respective prior messages of the sender;
automatically identifying a plurality of keywords within each of the plurality of messages;
automatically generating metadata comprising a plurality of candidates for definitions and uses for each of the keywords of each of the plurality of messages;
automatically analyzing the metadata of the plurality of keywords for each of the plurality of messages with the retrieved pluralities of sender smart agents and recipient smart agents to identify a likely subject for each corresponding message, the metadata analysis for each of the plurality of messages including using the at least one word choice proclivity of the corresponding sender to evaluate the plurality of candidates for and to disambiguate at least one of the keywords in the message, the disambiguation for the at least one of the keywords including determining an increased confidence in one or more of the corresponding plurality of candidates relative to other of the corresponding plurality of candidates based on the at least one word choice proclivity of the corresponding sender;
automatically determining a sentiment based at least in part on the likely subject of each corresponding message;
automatically adjusting priority levels respectively associated with at least some of the plurality of messages based at least in part on the corresponding identified likely subjects and determined sentiments.

16. The computer-implemented method of claim 15, wherein the metadata analysis of each message includes automatically ordering the plurality of candidates for each of the plurality of keywords according to probability of use.

17. The computer-implemented method of claim 16, wherein the automatic ordering of the plurality of candidates is based at least in part on the presence or absence of other keywords within the same message of the plurality of messages.

18. The computer-implemented method of claim 15, wherein the identification of a likely subject of each message includes—
automatically comparing the corresponding plurality of keywords against a category alphalary corresponding to a potential subject category, the category alphalary including an exclusion word,
automatically eliminating the potential subject category from being considerable as the likely subject based on matching of one of the plurality of keywords to the exclusion word.

19. The computer-implemented method of claim 15, wherein the identification of a likely subject of each message includes—
automatically comparing the corresponding plurality of keywords against a category alphalary corresponding to a potential subject category, the category alphalary including a high frequency use word,
automatically raising a ranking for consideration of the potential subject category as the likely subject based on matching of one of the plurality of keywords to the high frequency use word.

20. The computer-implemented method of claim 15, further comprising, via the one or more transceivers and/or processors, for each of the plurality of messages—
automatically updating the behavior profiles of the pluralities of smart agents of the identified sender and recipient based on the identified likely subject and the determined sentiment.

* * * * *